(12) United States Patent
Cochrane et al.

(10) Patent No.: US 6,847,962 B1
(45) Date of Patent: *Jan. 25, 2005

(54) ANALYZING, OPTIMIZING AND REWRITING QUERIES USING MATCHING AND COMPENSATION BETWEEN QUERY AND AUTOMATIC SUMMARY TABLES

(75) Inventors: Roberta Jo Cochrane, Los Gatos, CA (US); George Lapis, San Jose, CA (US); Ting Yu Leung, San Jose, CA (US); Mark A. Paskin, San Pablo, CA (US); Mir Hamid Pirahesh, San Jose, CA (US); Yang Sun, Sunnyvale, CA (US); Monica Sachiye Urata, Saratoga, CA (US); Markos Zaharioudakis, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 09/502,821
(22) Filed: Feb. 11, 2000

Related U.S. Application Data

(60) Provisional application No. 60/135,133, filed on May 20, 1999.

(51) Int. Cl.[7] .............................................. G06F 17/30
(52) U.S. Cl. ...................... 707/4; 707/2; 707/3; 707/5
(58) Field of Search .................. 707/1–10, 100–104.1, 707/200–206

(56) References Cited

U.S. PATENT DOCUMENTS

| | | | |
|---|---|---|---|
| 5,276,870 A | 1/1994 | Shan et al. | 707/2 |
| 5,367,675 A | 11/1994 | Cheng et al. | 707/2 |
| 5,659,725 A * | 8/1997 | Levy et al. | 707/3 |
| 5,682,535 A | 10/1997 | Knudsen | 717/117 |
| 5,737,591 A | 4/1998 | Kaplan et al. | 707/1 |
| 5,806,060 A * | 9/1998 | Borgida et al. | 707/3 |
| 5,848,406 A | 12/1998 | Mani et al. | 707/2 |

(List continued on next page.)

FOREIGN PATENT DOCUMENTS

| | | | | |
|---|---|---|---|---|
| EP | 0797160 | * | 9/1997 | 17/30 |

OTHER PUBLICATIONS

Markos Zaharioudakis, Roberta Cochrane, George Lapis, Hamid Pirahesh, Monica Urata: Answering Complex SQL Queries Using Automatic Summary Tables. SIGMOD Conference 2000: 105–116.*

(List continued on next page.)

*Primary Examiner*—Srirama Channavajjala
(74) *Attorney, Agent, or Firm*—Gates & Cooper LLP

(57) ABSTRACT

A method, apparatus, and article of manufacture for optimizing database queries using a derived summary table, wherein a definition of the summary table is based on a full select statement, including, but not limited to, a derived table involving nested GROUP BY operations and complex HAVING clauses with subqueries or joins, that is materialized in the table and describes how the summary table was derived. A query is analyzed using matching/compensation tests between the query and the definition of the summary table (that is, a query by itself) to determine whether expressions occurring anywhere in the query, but not in the summary table, can be derived using either the content in the summary table alone, or after combining (through some relational operator) the content of the summary table with other base tables, and hence the query is subsumed by or overlaps with the summary table definition.

198 Claims, 34 Drawing Sheets

U.S. PATENT DOCUMENTS

| | | | | |
|---|---|---|---|---|
| 5,864,842 | A | | 1/1999 | Pederson et al. ............... 707/3 |
| 5,884,299 | A | | 3/1999 | Ramesh et al. ................. 707/2 |
| 5,897,632 | A | * | 4/1999 | Dar et al. ....................... 707/2 |
| 6,023,695 | A | * | 2/2000 | Osborn et al. .................. 707/3 |
| 6,023,696 | A | * | 2/2000 | Osborn et al. .................. 707/3 |
| 6,088,524 | A | * | 7/2000 | Levy et al. ..................... 707/3 |
| 6,199,063 | B1 | * | 3/2001 | Colby et al. .................... 707/4 |
| 6,317,738 | B1 | * | 11/2001 | Lohman et al. ................. 707/3 |
| 6,339,768 | B1 | * | 1/2002 | Leung et al. ................... 707/2 |
| 6,341,281 | B1 | * | 1/2002 | MacNicol et al. ............. 707/3 |
| 6,411,951 | B1 | * | 6/2002 | Galindo-Legaria et al. .... 707/3 |
| 6,449,605 | B1 | * | 9/2002 | Witkowski ...................... 707/3 |
| 6,460,027 | B1 | * | 10/2002 | Cochrane et al. .............. 707/2 |

OTHER PUBLICATIONS

Lehner et al., Fast refresh using mass query optimization, Data engineering, Apr. 2001, proceedings 17 internatinal conference,391–398.*

Franz B et al., LTCS–report 98–06 computing the least common subsumer and the most specific concept in the presence of cyclic ALN–concept descriptionss, Aachen University of Technology research group for theoretical computer science, RWTH LTCS–Report 1–33.*

Michael E et al., Automated summary tables and aggregate navigation in DB2 universal database, solutions journal, The IDUG solutions Journal Fall 99–vol 6, No. 3, 1–5 pages.*

Bello et al., "Materialized Views in Oracle," Proceedings of the $24^{th}$ VLDB Conference, NY, USA, 1998, 659–664.

Colby et al., "Red Brick Vista™: Aggregate Computation and Management," Proceedings of the $14^{th}$ International Conference on Data Engineering, Orlando, Florida, 1998, 174–177.

Srivastava et al., "Answering Queries with Aggregation Using Views," Proceedings of the $22^{nd}$ VLDB Conference Mumbai, Bombay, India, 1996, 318–329.

* cited by examiner

ANALYZING, OPTIMIZING AND REWRITING QUERIES USING MATCHING AND COMPENSATION BETWEEN QUERY AND AUTOMATIC SUMMARY TABLES

CROSS-REFERENCE TO RELATED APPLICATIONS

This application claims the benefit under 35 U.S.C. §119(e) of and commonly-assigned U.S. Provisional application Ser. No. 60/135,133, entitled "OPTIMIZING QUERIES USING AUTOMATIC SUMMARY TABLES," filed on May 20, 1999, by Roberta J. Cochrane, George Lapis, Ting Y. Leung, Mark A Paskin, Mir H. Pirahesh, Yang Sun, Monica S. Urata, and Markos Zaharioudakis, which application is incorporated by reference herein.

BACKGROUND OF THE INVENTION

1. Field of the Invention.

This invention relates in general to database management systems performed by computers, and in particular, to the optimization of queries using automatic summary tables.

2. Description of Related Art.

Computer systems incorporating Relational DataBase Management System (RDBMS) software using a Structured Query Language (SQL) interface are well known in the art. The SQL interface has evolved into a standard language for RDBMS software and has been adopted as such by both the American National Standards Institute (ANSI) and the International Standards Organization (ISO).

For most RDBMS software, combinations of tables and views are used to access data stored in tables in the database. Indices are often used to improve the performance of retrieving data from tables. However, indices are generally limited to columns from base tables. Thus, indices are not seen as suitable for results of aggregations, and results of joins for commonly used subsets of the data.

A view definition includes a query that, if processed, provides a temporary result table based on the results of the query at that point in time. Using an INSERT statement and an appropriately defined table in the database, the temporary results table can be stored in the database. To refresh this table, the user would need to perform a DELETE from the table and then perform the INSERT again.

Users can directly query against the created table, provided that the users are aware how the results were derived. Generally, the RDBMS software is not aware that such a table is any different from any other table in the database. Moreover, this table cannot be used by an optimizer within the RDBMS software to improve performance, even though the table may contain data that would drastically improve the performance of other queries.

This leads to the notion of summary tables or materialized views as envisioned by the present invention. These tables are similar to the created table described above, except that the definition of the table is based on a "full select" (much like a view) that is materialized in the table. The columns of the table are based on the elements of the select list of the full select.

In the present invention, with properly defined summary tables, the RDBMS software is now aware how the result in the summary table was derived. When an arbitrarily complex query is submitted, an optimizer in the RDBMS software can now consider using the summary tables to answer the query, which is a technique that requires performing matching and compensation between the query and summary table definition.

There are extensive research activities and literature on this topic, as disclosed in the following publications, all of which are incorporated by reference herein:

1. L. S. Colby, R. L. Cole, E. Haslam, N. Jazaeri, G. Johnson, W. J. McKenna, L. Schumacher, D. Wilte. Red Brick Vista: Aggregate Computation and Management. Proceedings of the 14th Int'l. Conference on Data Engineering, Orlando, Fla., 1998.

2. R. Bello, K. Dias, A. Downing, J. Feenan, J. Finnerty, W. Norcott, H. Sun, A. Witkowski, M. Ziauddin. Materialized Views In Oracle. Proceedings of the 24th VLDB Conference, New York, 1998.

3. D. Srivastava, S. Dar, H. Jagadish, A. Levy. Answering Queries with Aggregation Using Views. Proceedings of the 22nd VLDB Conference, Mumbai, India, 1996.

However, the current state of the art is that only simple SQL statements with a single query block can be optimized using summary tables, and only simple expressions can be handled.

SUMMARY OF THE INVENTION

To overcome the limitations in the prior art described above, and to overcome other limitations that will become apparent upon reading and understanding the present specification, the present invention discloses a method, apparatus, and article of manufacture for optimizing database queries using a derived summary table, wherein a definition of the summary table is based on a full select statement, including, but not limited to, a derived table involving nested GROUP BY operations and complex HAVING clauses with subqueries or joins, that is materialized in the table and describes how the summary table was derived. A query is analyzed using matching/compensation tests between the query and the definition of the summary table (that is, a query by itself) to determine whether expressions occurring anywhere in the query, but not in the summary table, can be derived using either the content in the summary table alone, or after combining (through some relational operator) the content of the summary table with other base tables, and hence the query is subsumed by or overlaps with the summary table definition.

It is an object of the present invention to optimize queries using summary tables storing materialized views. More specifically, it is an object of the present invention to make RDBMS software aware how a result in a summary table was derived, so that an optimizer function of the RDBMS software can use the summary tables to respond to queries. The techniques presented in the present invention involve complex and yet efficient matching/compensation tests among queries, and are directly applicable to other areas such as multiple query optimization.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings, which form a part hereof, and in which is shown by way of illustration a specific embodiment in which the invention may be practiced. It is to be understood that other embodiments may be utilized and structural and functional changes may be made without departing from the scope of the present invention.

Hardware Environment

Figure 1:
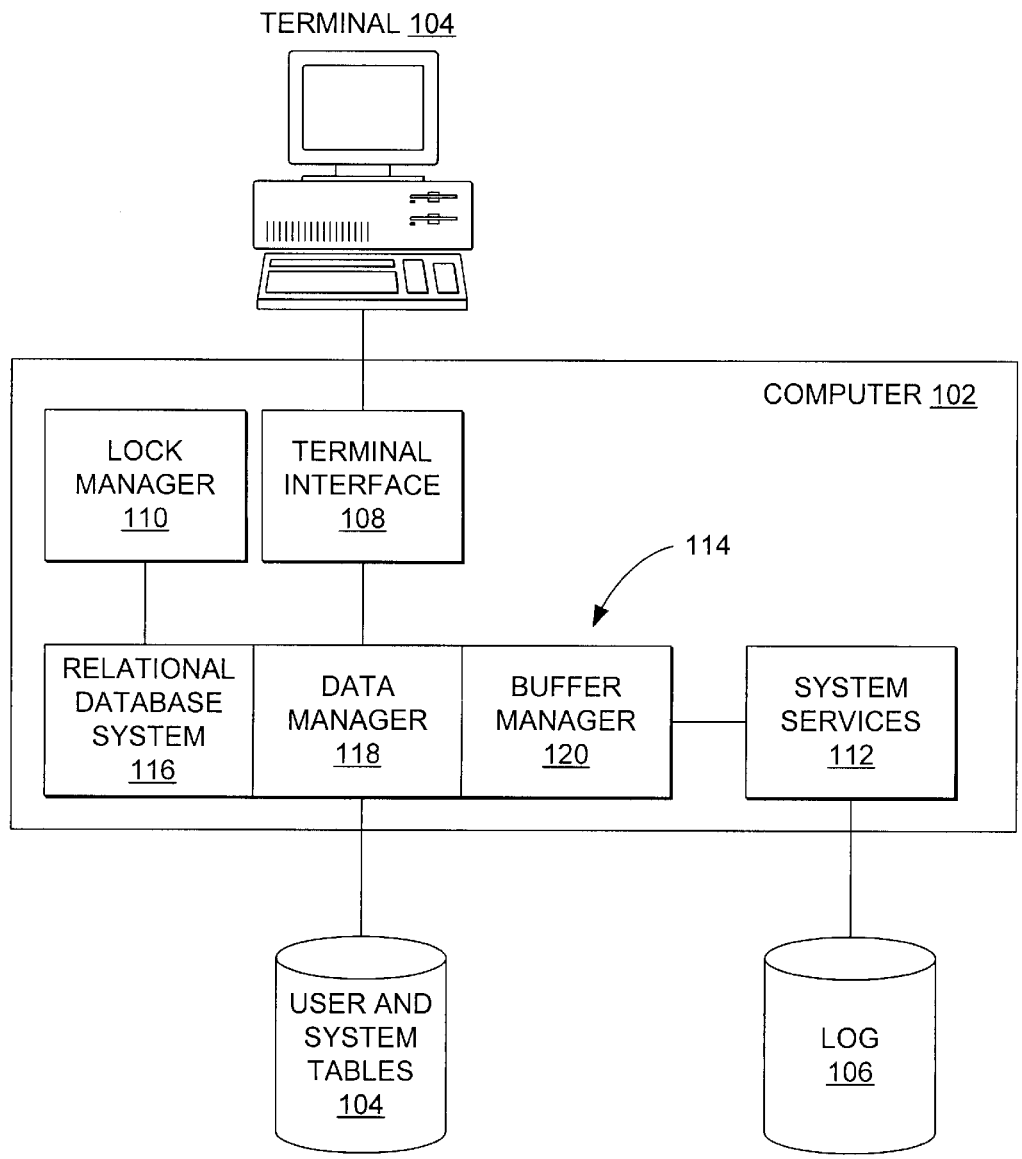
FIG. 1 illustrates the computer hardware environment of the present invention.

FIG. 1 illustrates an exemplary computer hardware environment that could be used with the present invention. In the exemplary environment, a computer system 102 is comprised of one or more processors connected to one or more data storage devices 104 and 106, such as disk drives, that store one or more relational databases.

Operators of the computer system 102 use a standard operator interface 108, such as IMS/DB/DC, CICS, TSO, OS/2 or other similar interface, to transmit electrical signals to and from the computer system 102 that represent commands for performing various search and retrieval functions, termed queries, against the databases. In the present invention, these queries conform to the Structured Query Language (SQL) standard, and invoke functions performed by Relational DataBase Management System (RDBMS) software. In the preferred embodiment of the present invention, the RDBMS software comprises the DB2 product offered by IBM for the MVS™, OS/2™, UNIX™, or WINDOWS NT™ operating systems. Those skilled in the art will recognize, however, that the present invention has application to any RDBMS software.

As illustrated in FIG. 1, the DB2 product includes three major components: the Resource Lock Manager (IRLM) 110, the Systems Services module 112, and the Database Services module 114. The IRLM 110 handles locking services, because DB2 treats data as a shared resource, thereby allowing any number of users to access the same data simultaneously, and thus concurrency control is required to isolate users and to maintain data integrity. The Systems Services module 112 controls the overall DB2 execution environment, including managing log data sets 106, gathering statistics, handling startup and shutdown, and providing management support.

At the heart of the DB2 architecture is the Database Services module 114. The Database Services module 114 contains several submodules, including the Relational Database System (RDS) 116, the Data Manager 118, and the Buffer Manager 120, as well as other elements such as an SQL compiler/interpreter. These submodules support the functions of the SQL language, i.e., definition, access control, retrieval, and update of user and system data.

Generally, each of the components, modules, and submodules of the RDBMS software comprise instructions and/or data, and are embodied in or retrievable from a computer-readable device, medium, or carrier, e.g., a memory, a data storage device, a remote device coupled to the computer 102 by a data communications device, etc. Moreover, these instructions and/or data, when read, executed, and/or interpreted by the computer 102, cause the computer 102 to perform the steps necessary to implement and/or use the present invention.

Thus, the present invention may be implemented as a method, apparatus, or article of manufacture using standard programming and/or engineering techniques to produce software, firmware, hardware, or any combination thereof. The term "article of manufacture", or alternatively, "computer program carrier", as used herein is intended to encompass a computer program accessible from any computer-readable device, carrier, or media. Of course, those skilled in the art will recognize many modifications may be made to this configuration without departing from the scope of the present invention.

Those skilled in the art will recognize that any combination of the above components, or any number of different components, including computer programs, peripherals, and other devices, may be used to implement the present invention, so long as similar functions are performed thereby.

Interactive SQL Execution

Figure 2:
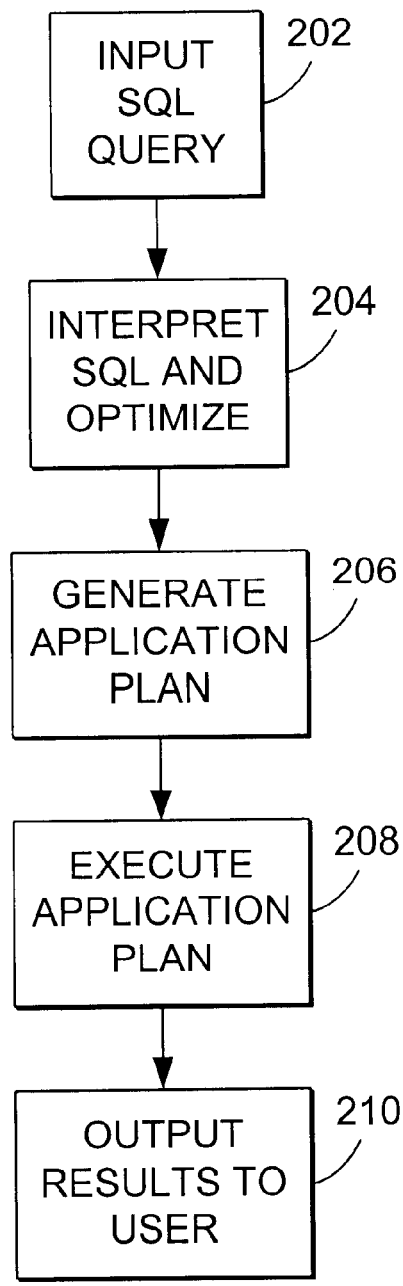
FIG. 2 is a flowchart illustrating the steps necessary for the interpretation and execution of SQL statements in an interactive environment according to the present invention.

FIG. 2 is a flowchart illustrating the steps necessary for the interpretation and execution of SQL statements in an interactive environment according to the present invention. Block 202 represents the input of SQL statements into the computer system 102. Block 204 represents the step of compiling or interpreting the SQL statements. An optimization function within block 204 may transform or optimize the SQL query in a manner described in more detail later in this specification. Block 206 represents the step of generating a compiled set of runtime structures called an application plan from the compiled SQL statements. Generally, the SQL statements received as input specify only the desired data, but not how to retrieve the data. This step considers both the available access paths (indexes, sequential reads, etc.) and system held statistics on the data to be accessed (the size of the table, the number of distinct values in a particular column, etc.), to choose what it considers to be the most efficient access path for the query. Block 208 represents the execution of the application plan and Block 210 represents the output of the results.

Embedded/Batch SQL Execution

Figure 3:
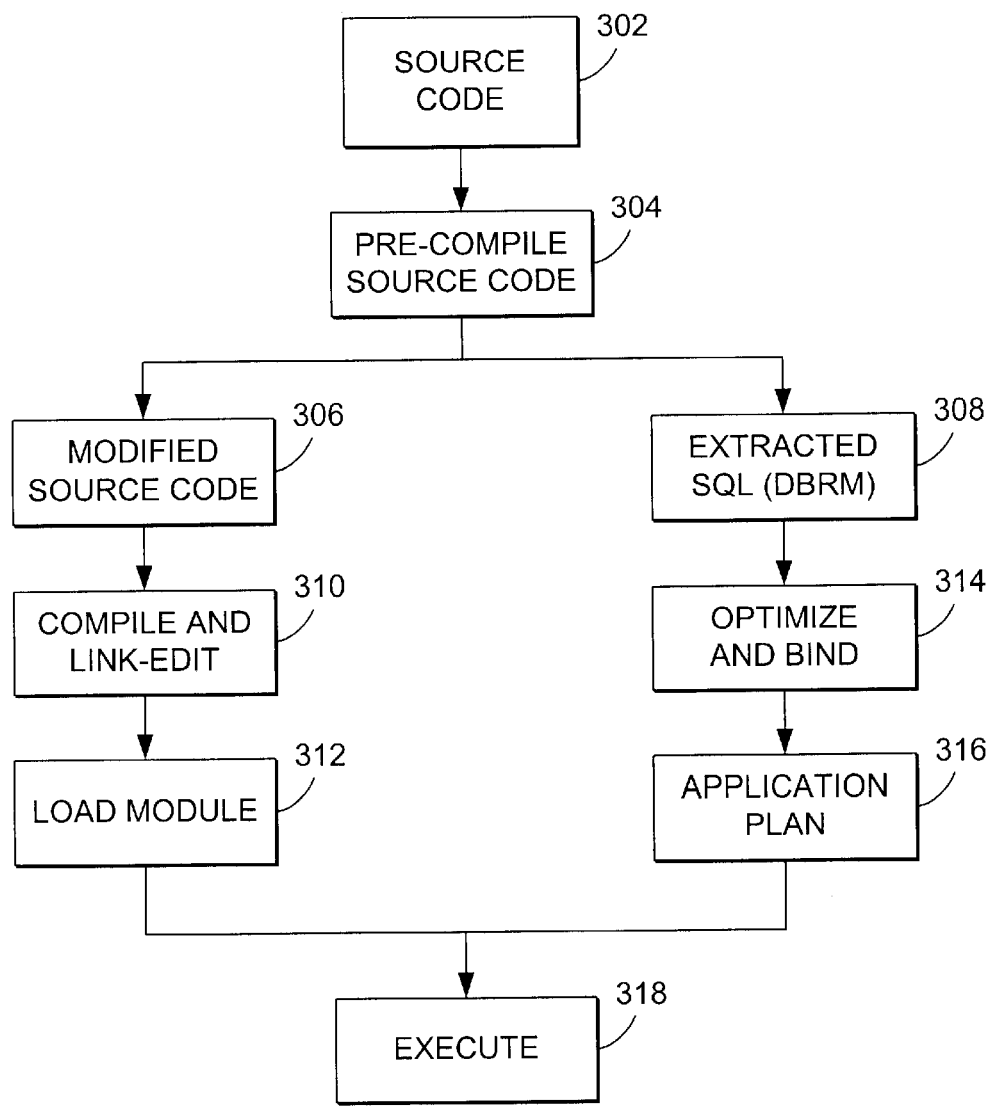
FIG. 3 is a flowchart illustrating the steps necessary for the interpretation and execution of SQL statements embedded in source code according to the present invention.

FIG. 3 is a flowchart illustrating the steps necessary for the interpretation and execution of SQL statements embedded in source code according to the present invention. Block 302 represents program source code containing a host language (such as COBOL or C) and embedded SQL statements. The program source code is then input to a pre-compile step 304. There are two outputs from the pre-compile step 304: a modified source module 306 and a Database Request Module (DBRM) 308. The modified source module 306 contains host language calls to DB2, which the pre-compile step 304 inserts in place of SQL statements. The DBRM 308 is comprised of the SQL statements from the program source code 302. A compile and link-edit step 310 uses the modified source module 306 to produce a load module 312, while an optimize and bind step 314 uses the DBRM 308 to produce a compiled set of runtime structures for the application plan 316. As indicated above in conjunction with FIG. 2, the SQL statements from the program source code 302 specify only the desired data, but not how to retrieve the data. The optimize and bind step 314 may optimize the SQL query in a manner described in more detail later in this specification. Thereafter, the optimize and bind step 314 considers both the available access paths (indexes, sequential reads, etc.) and system held statistics on the data to be accessed (the size of the table, the number of distinct values in a particular column, etc.), to choose what it considers to be the most efficient access path for the query. The load module 312 and application plan 316 are then executed together at step 318.

Description of the Optimization Technique

The present invention discloses an improved optimization technique that is typically performed at step 204 of FIG. 2 or step 314 of FIG. 3. Specifically, the present invention discloses an improved SQL query compilation and optimization technique using a Query Graph Model (QGM).

A QGM represents a semi-procedural dataflow graph of a query, wherein the QGM is basically a high-level, graphical representation of the query. Boxes are used to represent relational operations, while arcs between boxes are used to represent quantifiers, i.e., table references. Each box includes the input columns it consumes from its children, the predicates that it applies, the output columns it computes, and potentially other properties as well such as an order specification, a distinct flag, etc. The basic set of boxes include those for SELECT, GROUP BY, and UNION. SELECT boxes represent the select-project-join portions of SQL queries; they apply join predicates and selection predicates (WHERE or HAVING predicates), and compute any scalar expressions that may appear in a query. GROUP-BY boxes include a set of grouping columns (grouping set) by which grouping is performed and compute one or more aggregate functions. Many SQL query compilation and optimization techniques using the Query Graph Model (QGM) have been performed in the prior art, as disclosed in the publication, Harnid Pirahesh, Joseph Hellerstein, and Waqar Hasan, "Extensible/Rule Based QueryRewrite Optimization in STARBURST," Proceedings of ACM SIGMOD '92 International Conference on Management of Data, San Diego, Calif., 1992, which is incorporated by reference herein.

The operation of the present invention can best be understood in context, i.e., using a real-world example, such as a data warehouse application performed by the RDBMS software. Consider a credit card company storing credit card customer information, their credit card accounts, and transactions that customers made using credit cards for purchases.

A. Database Schema

Figure 4:
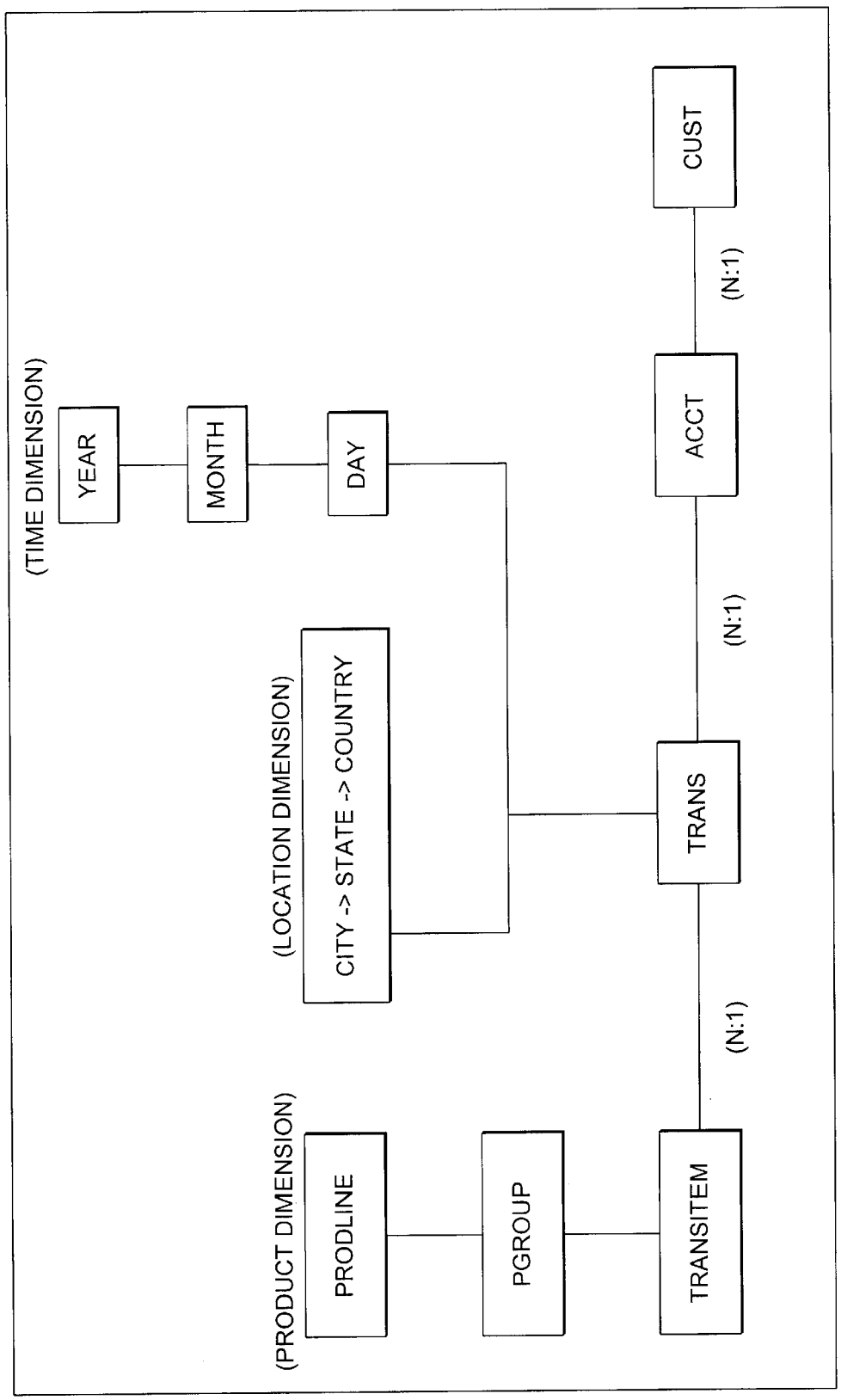
FIG. 4 is a block diagram that illustrates a star schema for a relational database.

A possible database schema, comprising a "star" schema, is illustrated by FIG. 4 and described below.

Table CUST contains customer information.

Table ACCT contains credit card account information. Each customer may have one or more credit cards (i.e., one or more accounts).

Table TRANS contains transaction information. A customer may make a number of purchases using a particular credit card, and the transaction information is stored in table TRANS. Each transaction was made at a particular time and in a particular store. The purchase time and location can be aggregated along time and location dimensions.

Table PRODLINE contains information about product lines and table PGROUP contains product category information.

Table TRANSITEM contains information about transactions on each item. In each transaction, any number of items may be purchased, and TRANSITEM stores this information and the product information can be aggregated along the product line hierarchy.

The database schema described above will be used as the basis for most of the examples presented in the rest of this document.

The following "CREATE TABLE" statements may be used to create the tables shown in FIG. 4.

```
CREATE TABLE CUST(
    ID INT NOT NULL PRIMARY KEY,
    MARITAL_STATUS CHAR(1),
    INCOME_RANGE INT NOT NULL,
    ZIPCODE INT,
    RESIDENCE VARCHAR(5));
CREATE TABLE ACCT(
    ID INT NOT NULL PRIMARY KEY,
    CUSTID INT NOT NULL,
    CONSTRAINT CUST_ACCT FOREIGN KEY (CUSTID)
    REFERENCES CUST);
CREATE TABLE LOC(
    ID INT NOT NULL PRIMARY KEY,
    CITY VARCHAR(10),
    STATE CHAR(2),
    COUNTRY VARCHAR(10));
CREATE TABLE TRANS(
    ID INT NOT NULL PRIMARY KEY,
    ACCTID INT NOT NULL,
    PDATE DATE NOT NULL,
    STATUS VARCHAR(15),
    LOCID INT NOT NULL,
    CONSTRAINT ACCT_TRANS FOREIGN KEY (ACCTID)
        REFERENCES ACCT,
    CONSTRAINT LOC_ACCT FOREIGN KEY (LOCID)
        REFERENCES LOC);
```

-continued

```
CREATE TABLE PRODLINE(
    ID INT NOT NULL PRIMARY KEY,
    NAME VARCHAR(20));
CREATE TABLE PGROUP(
    ID INT NOT NULL PRIMARY KEY,
    NAME VARCHAR(12),
    LINEID INT NOT NULL,
    CONSTRAINT PRODLINE_PGROUP FOREIGN KEY
    (LINEID)
        REFERENCES PRODLINE);
CREATE TABLE TRANSITEM (
    ID INT NOT NULL PRIMARY KEY,
    TRANSID INT NOT NULL,
    QUANTITY INT NOT NULL,
    PRICE DECIMAL(10,2) NOT NULL,
    DISCOUNT_RATE INT NOT NULL,
    PGID INT NOT NULL,
    CONSTRAINT TRANS_TRANSITEM
        FOREIGN KEY (TRANSID) REFERENCES TRANS,
    CONSTRAINT PGROUP_TRANSITEM
        FOREIGN KEY (PGID) REFERENCES PGROUP);
```

B. Definitions

1. The "Match" Relationship For QGM Boxes

Figure 5:
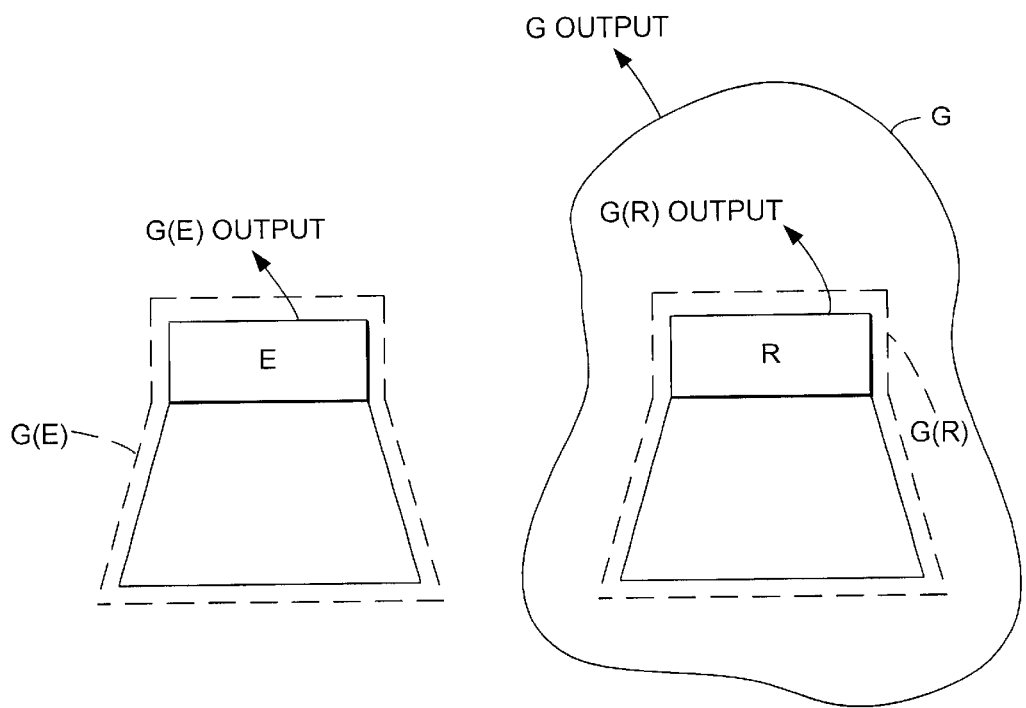
FIG. 5 is a block diagram of a Query Graph Model representation that illustrate various SQL statements.

FIG. 5 is a block diagram of the QGMS for various SQL statements. Given two QGM boxes E and R, let G(E) be the subgraph rooted at E, and G(R) be the subgraph rooted at R Then, it can be said that box E "matches" with box R, if there exists a connected QGM graph G such that G contains G(R), and G is semantically equivalent to G(E), i.e., G and G(E) always produce the same result.

The "match" relationship defined above is asymmetric (i.e., if E matches with R, R does not, in general, match with E). To distinguish the different roles of the two boxes in a match relationship, E is called the "subsumee" and R is called the "subsumer". This naming stems from the fact that if E matches with R, then it is often the case that the output of box E can be derived from the output of R alone, i.e., without using any other base tables, and hence R subsumes E. However, this is not true in general, as described below.

2. Compensation

If box E matches with box R, then G−G(R) is the "compensation", i.e., the set of boxes that describe the operations that have to be performed on the output of R in order to get the same output as E. As described below, the compensation usually consists of a stack of boxes, where the bottom box of the stack takes its input from the subsumer.

3. Exact Match

If the compensation is empty, then the match between E and R is exact.

4. Matching Between Query and Automatic Summary Table

Figure 6:
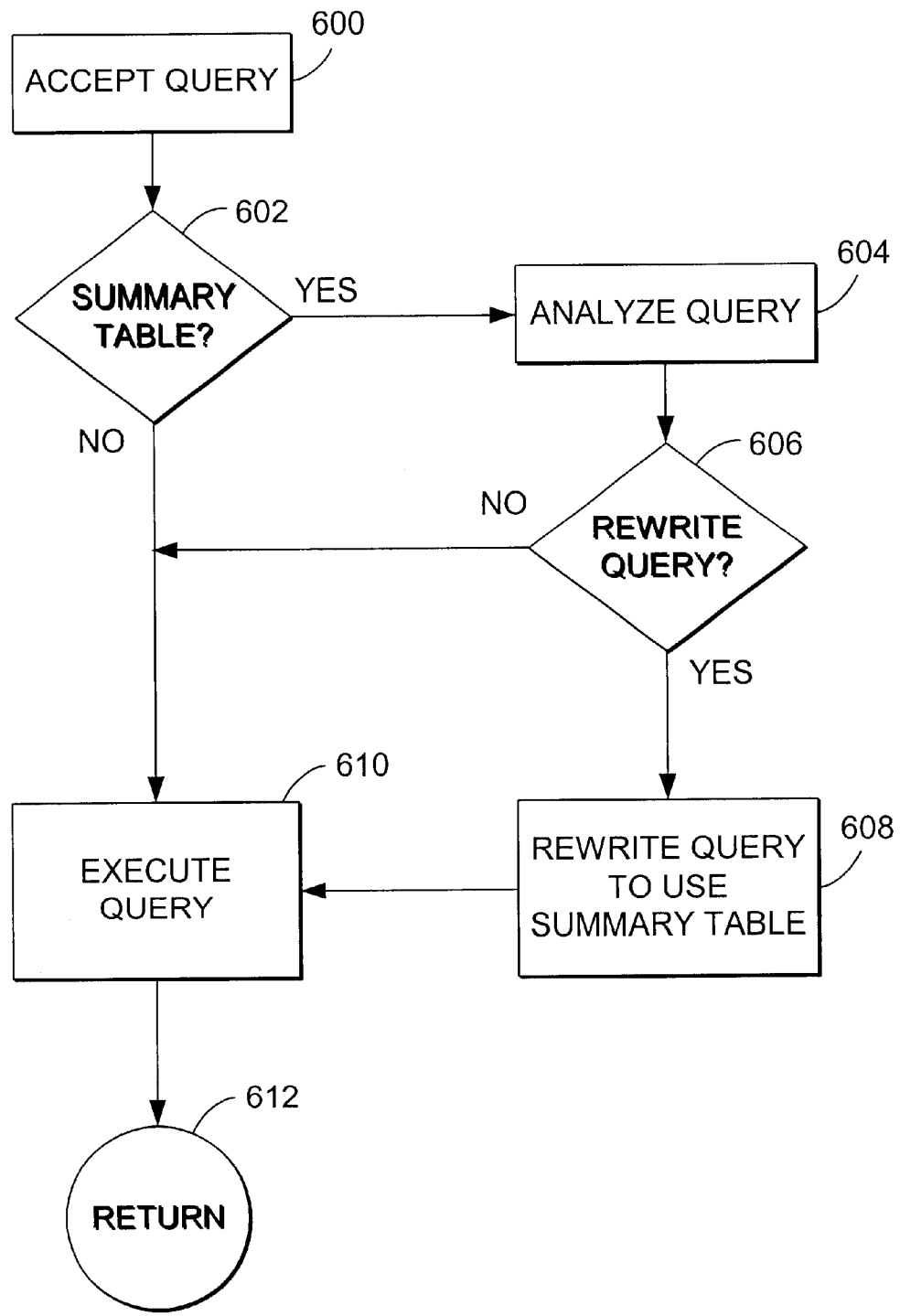
FIG. 6 is a flowchart illustrating the method of optimizing SQL queries according to the preferred embodiment of the present invention.

It can be said that a query "matches" with an automatic summary table (AST) if there is some box of the query QGM graph that "matches" with the top (root) box of the AST's QGM graph. If this is true, then the query can be optimized by re-writing it to use the AST. This is shown in FIG. 6, which is a flowchart illustrating the method of optimizing SQL queries in step 204 of FIG. 2 and step 314 of FIG. 3 according to the preferred embodiment of the present invention.

Block 600 represents the computer system 100, specifically an optimizer function of the RDBMS software 106, accepting a query.

Block 602 is a decision block that represents the computer system 100 determining whether there is one or more summary tables referencing one or more tables in the query. If so, control transfers to Block 604; otherwise, control transfers to Block 610.

Block 604 represents the computer system 100 analyzing whether a summary table can be used to answer the query. Specifically, this Block uses matching and subsumption between the query and definitions of one or more automatic summary tables to determine whether expressions occur in the query, but not in the automatic summary table, can be derived using the automatic summary table, wherein the automatic summary table is generated using a full SELECT statement involving one or more nested GROUP BY operations and HAVING clauses.

Block 606 is a decision block that represents the computer system 100 determining whether the query should be rewritten to take advantage of one or more of the summary tables. If so, control transfers to Block 608; otherwise, control transfers to Block 610.

Block 608 represents the computer system 100 rewriting the query to use the identified summary tables for answering the query when the expressions occur in the query, but not in the automatic summary tables, can be derived using the automatic summary tables. Specifically, this Block compensates complex expressions using the summary table as they are identified in Block 604, wherein the expressions can be rederived from one or more of the columns of the summary table.

Block 610 represents the computer system 100 executing the query.

After these query transformation steps are performed, block 612 returns control to block 204 in FIG. 2 or block 314 in FIG. 3 for subsequent processing steps, including the execution of the SQL query against the relational database and the output of the result set.

5. Examples

Consider the following example:

```
AST1:
CREATE TABLE AST1 As (
    SELECT acctid, locid, count(*) as cnt
    FROM TRANS
    GROUP BY acctid, locid);
Q1:
    SELECT t.acctid, l.state, COUNT(*) as cnt
    FROM TRANS t, LOCl
    WHERE t.locid = l.id AND l.country = 'USA'
    GROUP BY t.acctid, l.state
New Q1:
    SELECT a.acctid, l.state, SUM(a.cnt) as cnt
    FROM AST1 a, LOCl
    WHERE a.locid = l.id AND l.country = 'USA'
    GROUP BY a.acctid, l.state
```

Figure 7A:
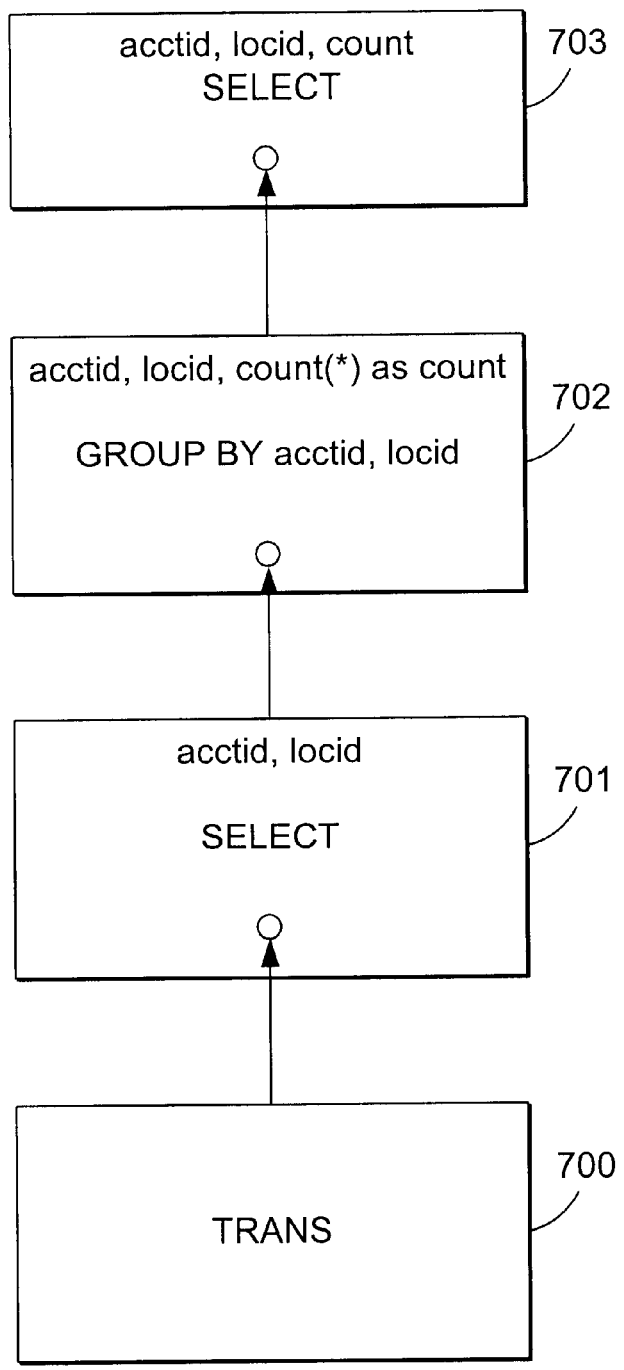
FIGS. 7A, 7B, 7C, and 7D are block diagrams of Query Graph Model representations that illustrate various SQL statements.
Figure 7B:
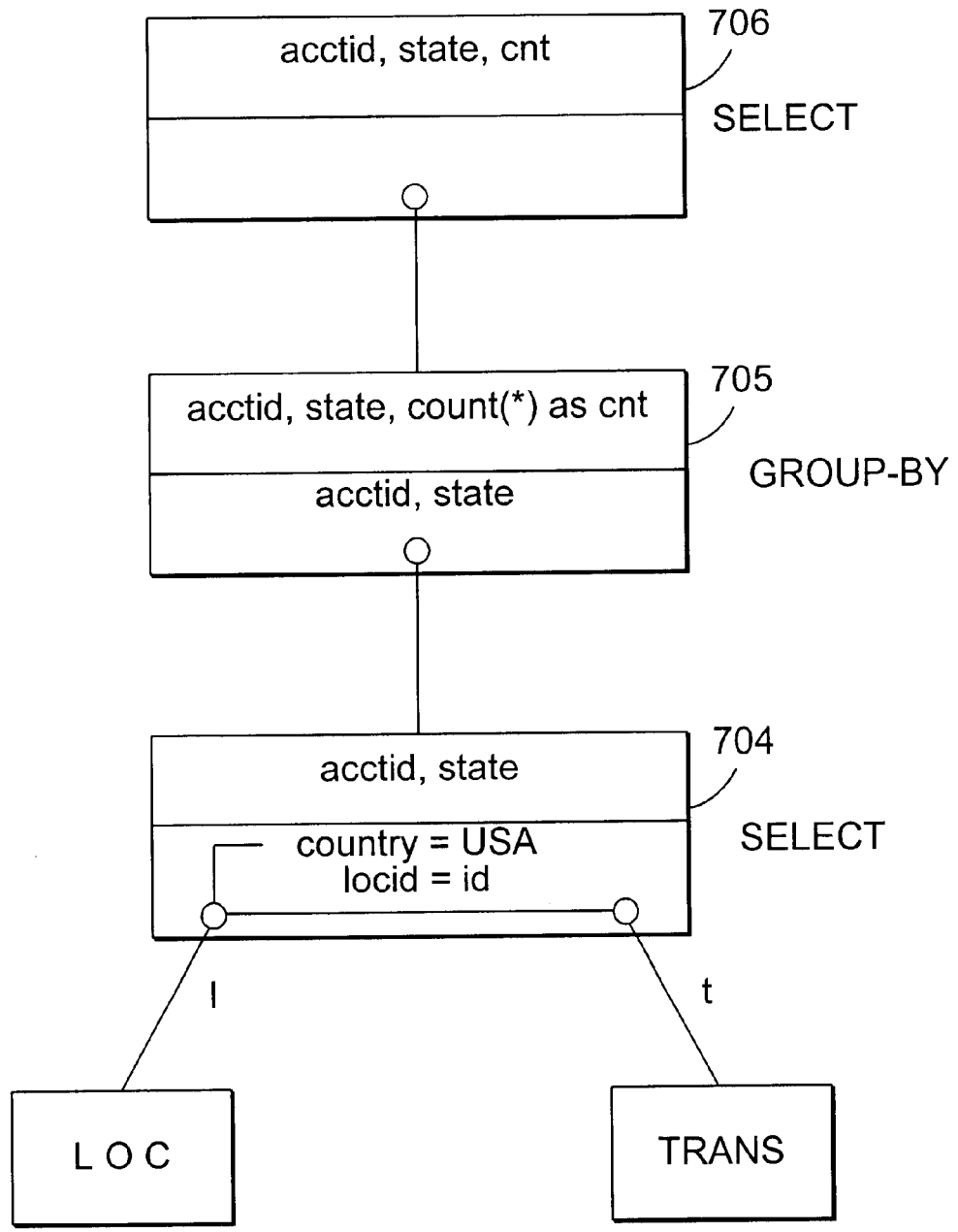
Figure 7C:
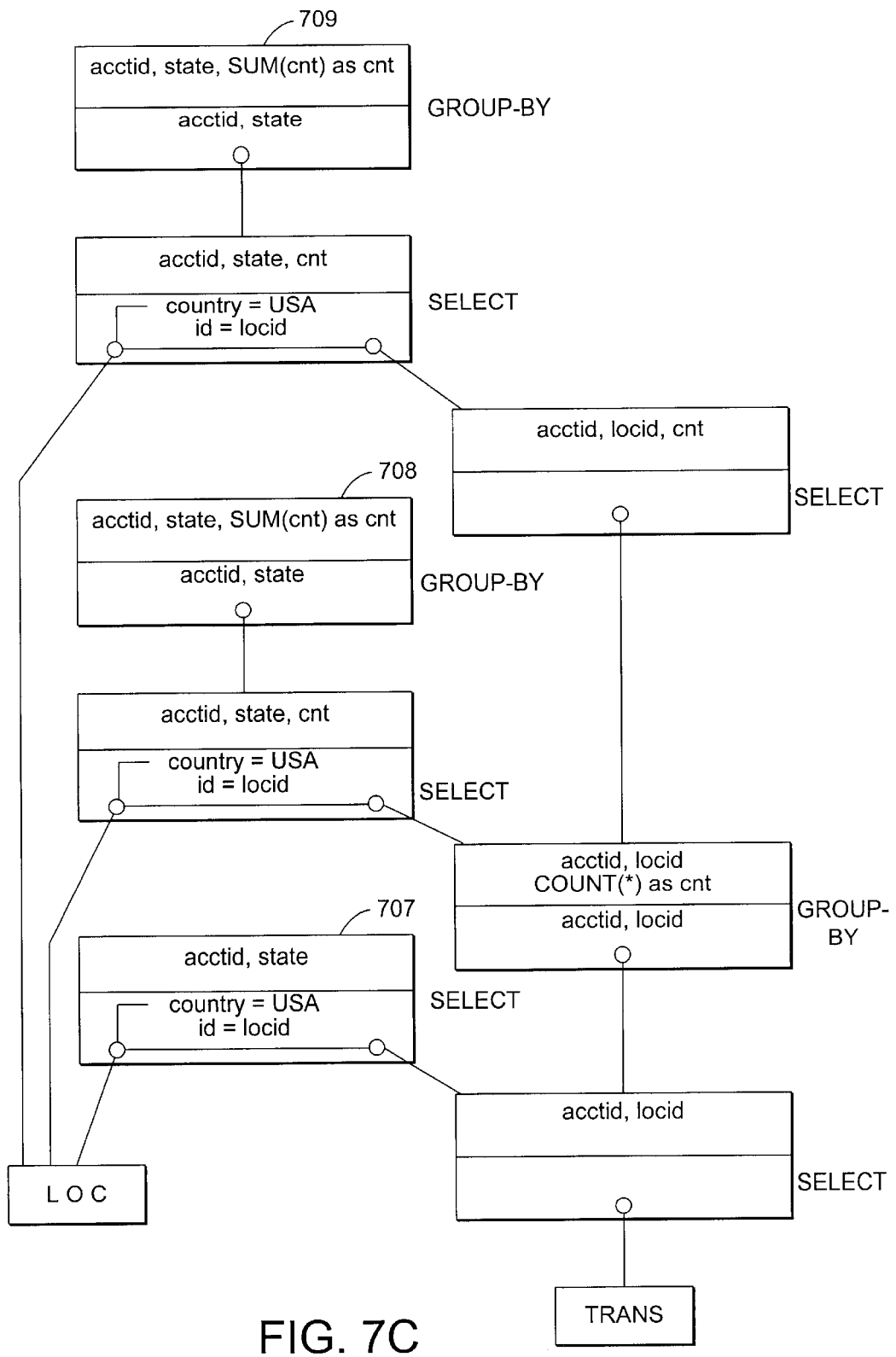
Figure 7D:
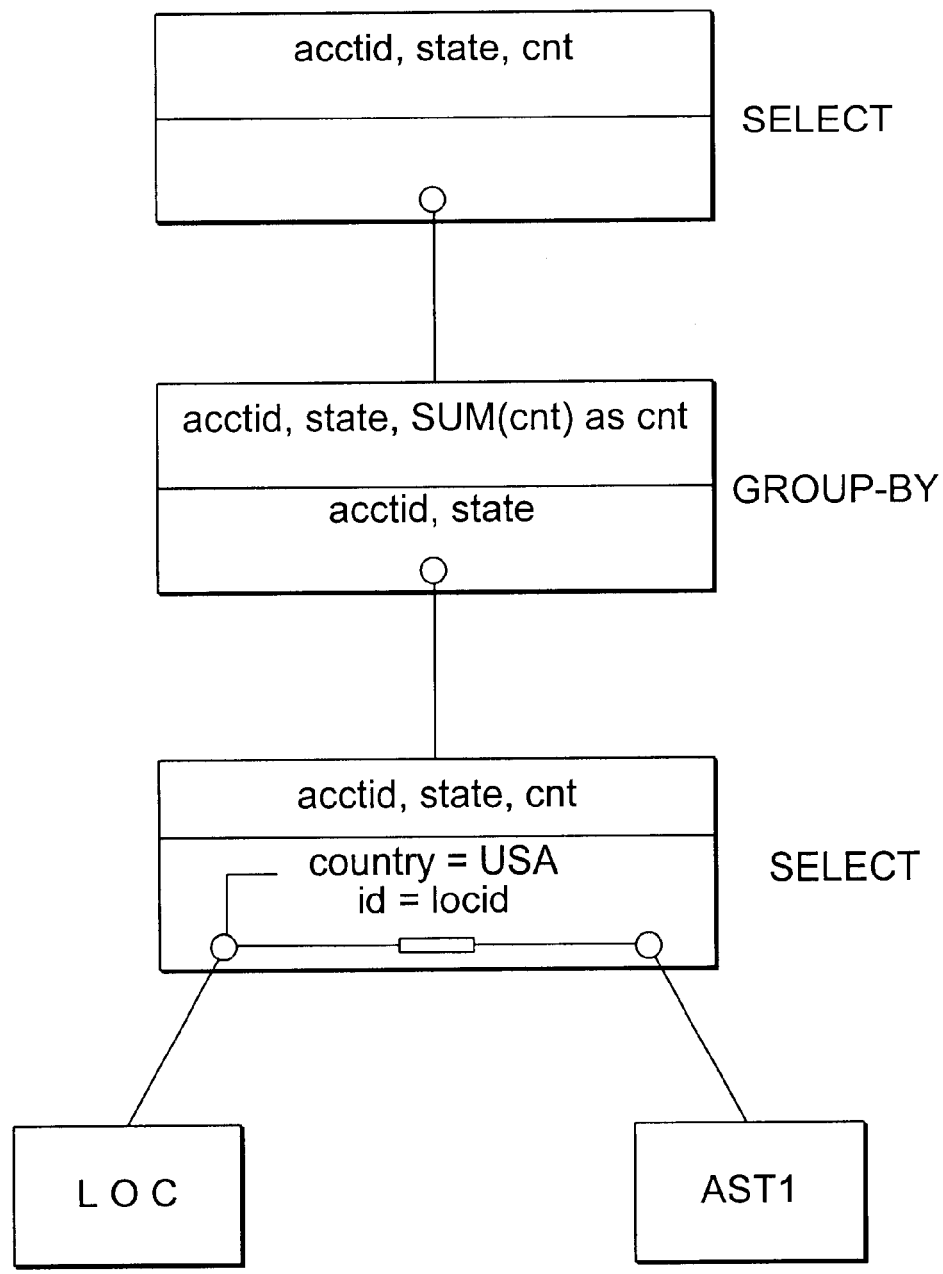

FIGS. 7A (boxes 700–703) and 7B (boxes 704–706) show the QGM graphs for AST1 and Q1 respectively. In this example, the following matches can be established: box 704 with 701, box 705 with 702, and box 706 with 703. FIG. 7C (boxes 707–709) shows the AST1 graph again together with the compensations for these matches. By the match definition above, boxes 707, 708, and 709 are semantically equivalent (i.e., always produce the same output) as boxes 704, 705, and 706 respectively. Finally, FIG. 7D shows the rewritten query.

C. The Matching Algorithm—Overview

To determine if a query and an AST match, a bottom-up algorithm is applied, which tries to establish matches between query and AST boxes, until it reaches the top AST box. This algorithm consists of two components. The first component implements the "match" function, which takes as input two QGM boxes (that is, a candidate subsumee/ subsumer pair), and returns information on whether the given subsumee matches with the given subsumer. If a match exists, then the match function also returns information that describes the compensation for the match. During each invocation, the match function assumes that the children of the subsumee and the subsumer have been matched already, i.e., that the match function has been invoked on each pair-wise combination of subsumee and subsumer children. This pre-condition is enforced by the second component of the algorithm, which is called the "navigator". The navigator is responsible for identifying potential subsumee/subsumer pairs and for invoking the match function on such pairs in an order such that the above pre-condition is satisfied. In the context of using ASTs to optimize queries, the candidate subsumee usually belongs to the query QGM graph and the candidate subsumer usually belongs to the AST QGM graph; however, the match function can be used to determine if a match exists between any two QGM boxes, no matter what QGM graphs the two boxes belong to (the box may even belong to the same QGM graph).

An alternative to the above approach is a recursive, top-down algorithm, where the match function is itself responsible for satisfying its pre-condition. In particular, before trying to match the given subsumee and subsumer boxes, the match function calls itself recursively, trying to match the children of the given boxes. In this approach, there is no separate navigator.

D. The Match Function

Ideally, the match function should implement the definition of the match relationship given above. However, that definition is too general to be of practical use. In reality, the match function tries to approximate the match definition. It does so by considering only certain simple, but general graph "patterns". Such patterns consist of the given subsumee and subsumer boxes, as well as the compensation boxes for the matches between the children of the given subsumee and subsumer. By limiting the match function to such well-understood patterns, it becomes easy to prove its correctness. At the same time, given the bottomup application of the match function and the fact that these patterns are the ones that arise most often in real-world queries, it is able to handle very complex queries and ASTs. Overall, the algorithmic framework, which consists of the bottom-up navigator, the match function, and the specific patterns has proved to be very modular, extensible and easy to implement.

Before proceeding to describe each pattern in detail, below are listed the two minimum conditions that must be satisfied in every case:

1. There must be at least one subsumee child that matches with some subsumer child.
2. The subsumee and the subsumer must be of the same operation type (i.e., both SELECT boxes or both GROUP-BY boxes).

Although these conditions are stated as necessary conditions, they are in fact sufficient only conditions. That is, it may be possible for two boxes to match without satisfying either conditions 1 or 2 above. Of course, it is hard to imagine any realistic examples where the first condition is violated, as the purpose of this condition is to make sure that there is some minimum overlap between the candidate subsumee and subsumer (and hence, it make sense, from a performance point of view to attempt a match).

The second condition, however, is more strict. For example, a SELECT DISTINCT box, which is a SELECT box that performs duplicate-row elimination on its output, may match with a GROUP BY box that groups by all of its columns. Nevertheless, condition 2 precludes such a match. To allow a match between SELECT DISTINCT and GROUP BY without violating condition 2, each SELECT DISTINCT box is split into a GROUP-BY box that performs the duplicate elimination and a SELECT box that in the same as the original SELECT box but without the DISTINCT property.

Finally, a couple of points to keep in mind regarding QGM boxes and their children. First, GROUP-BY boxes always have one child only. SELECT boxes have, in general, multiple children, which can be represent join operands, or existential subqueries, or universal subqueries. In the case of a SELECT subsumee/subsumer pair, a subsumee child that does not match with any of the subsumer's children, is called a "rejoin" child, whereas a subsumer child that has no matching subsumee child is called an "extra" child. A join between an extra child and the rest of the subsumer is called an "extra join".

E. Patterns

What follows is a list of patterns currently handled by the match function. The organization of this list also reflects the design approach, i.e., start with the simplest patterns and use them as building steps for other more elaborate (but still relatively simple and well formulated) patterns.

1. Exact Child Matches

Here, it is assumed that any matches that exist among the children of the given candidate subsumee/subsumer pair are exact matches.

1.1 SELECT Boxes with One-To-One Child Matches

Here, it is assumed that the subsumee and subsumer are SELECT boxes and that (a) each subsumee child matches with at most one subsumer child, and (b) no two subsumee children match to the same subsumer child.

Under these assumptions, a match is established if the following conditions are satisfied:

1. Each subsumer predicate that is not an extra join predicate matches, i.e., is semantically equivalent, with some subsumee predicate.
2. Any extra join is a loss-less join, i.e., a join that does not eliminate or duplicate any rows of the subsumer.
3. Any subsumee predicate that does not have a matching subsumer predicate is derivable from the subsumer's output columns and/or the rejoin columns.
4. Each subsumee output column is derivable from the subsumer's output columns and/or the rejoin columns.

Note that a subsumee expression (predicate or output column) is derivable from the subsumer and/or the rejoin columns if it can be expressed as a deterministic function of those columns.

The compensation for such a match is a SELECT box that (a) joins back all the rejoin children among themselves and with the subsumer, (b) contains all the subsumee predicates that do not appear in the subsumer, and (c) recomputes the subsumee output columns from the subsumer output columns and/or the rejoin columns.

Consider the following example:

```
AST2:
CREATE TABLE AST2 AS (
SELECT ti.id, ti.transid, ti.pgid, ti.quantity, ti.price, ti.discount_rate,
l.country,
    ti.quantity * ti.price AS total_value
FROM TRANSITEM ti, TRANS t, LOC l
WHERE ti.transid = t.id AND t.locid = l.id AND ti.discount_rate > 10)
Q2:
SELECT ti.id, t.id, (ti.quantity * ti.price) * (1 - ti.discount_rate)
As total_discount
FROM TRANSITEM ti, TRANS t, PGROUP g
WHERE ti.transid = t.id AND ti.pgid = g.id AND
    ti.discount_rate > 10 AND ti.price > 1000 AND
    g.name = 'electronics'
```

Figure 8A:
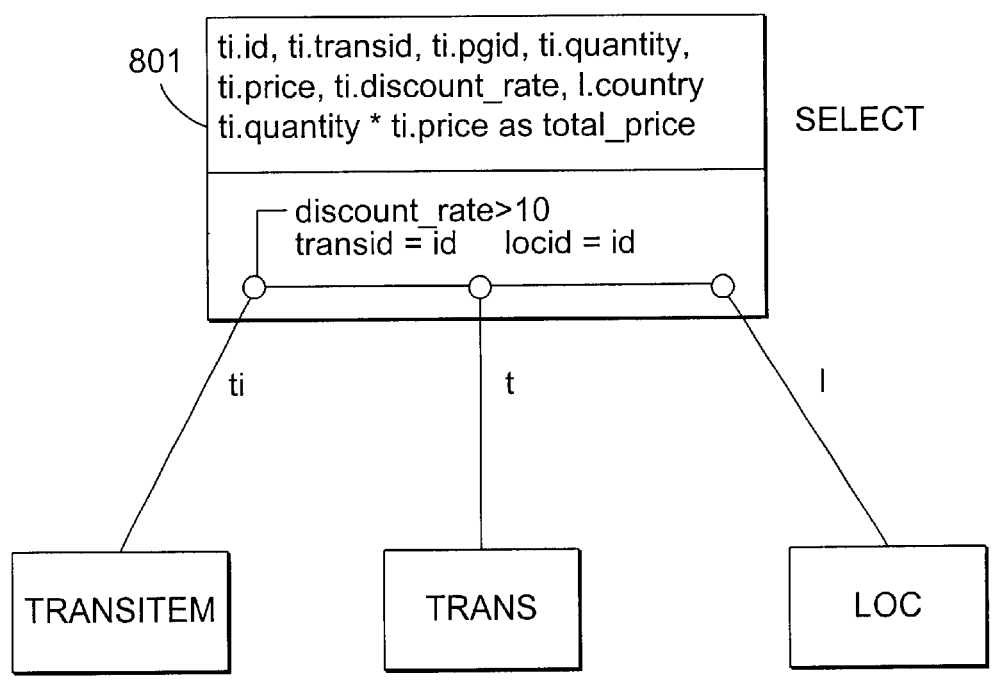
FIGS. 8A, 8B, and 8C are block diagrams of Query Graph Model representations that illustrate various SQL statements.
Figure 8B:
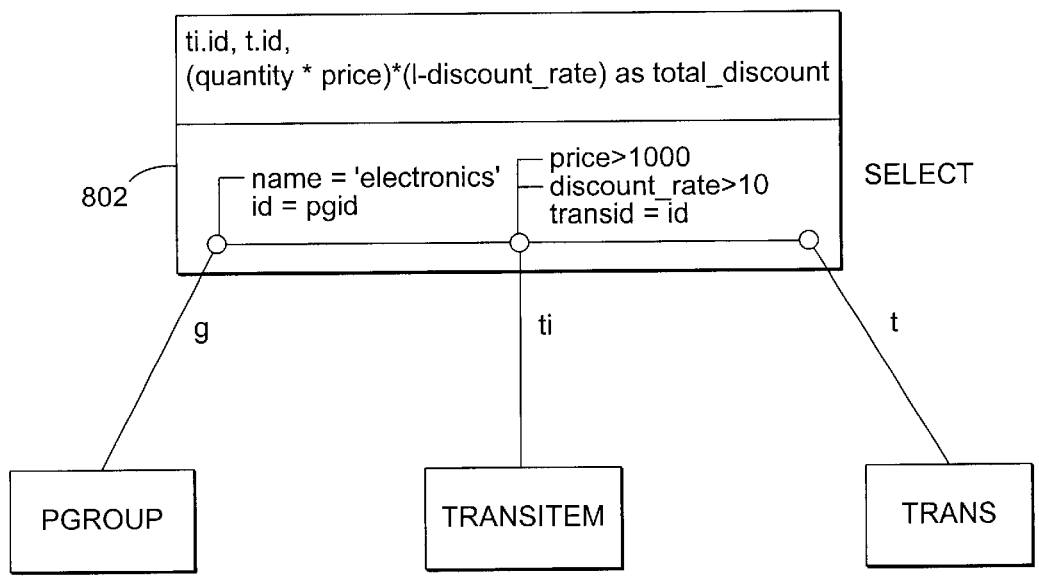

FIGS. 8A (box 801) and 8B (box 802) show the AST and query QGM graphs respectively. As explained below, the two SELECT boxes of this example (boxes 801 and 802) satisfy all of the above conditions, and hence a match can be established.

Figure 8C:
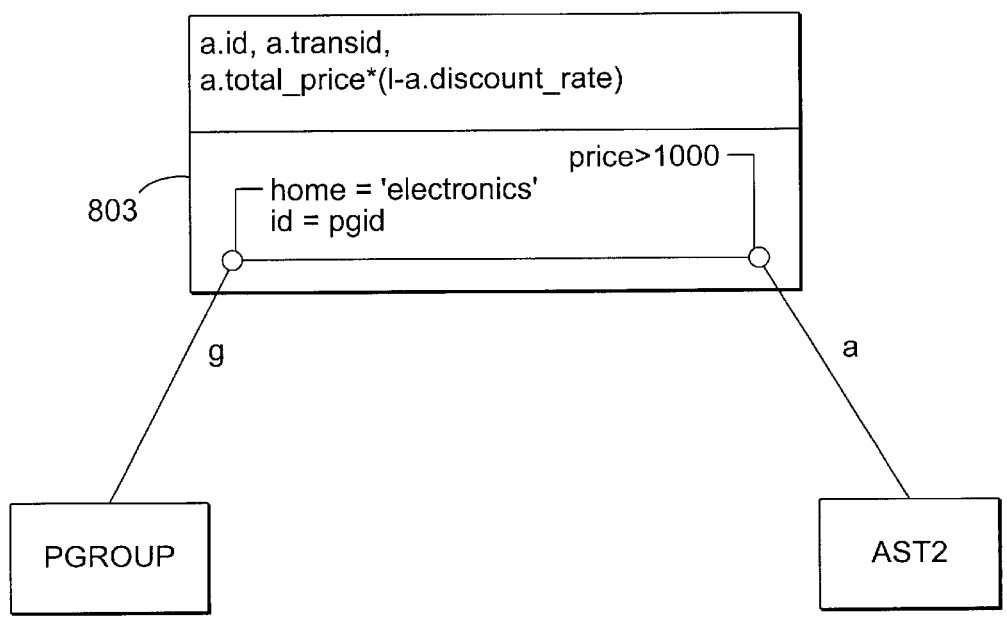

FIG. 8C (box 803) shows the compensation. The rewritten query is:

```
NewQ2:
SELECT a.id, a.tranid, a.total_value * (1 - a.discount_rate) As total_
discount
FROM AST2 a, PGROUP g
WHERE a.pgid = g.id AND a.price > 1000 AND g.name = 'electronics'
```

For condition 1, the relevant subsumer predicates are "ti.transid=t.id" and "ti.discount_rate>1000", both of which appear in the subsumee as well, and hence condition 1 is satisfied. For condition 3, the relevant subsumee predicates are "ti.price>1000", "g.name=electronics", and "g.id= ti.pg.id", all of which satisfy the condition; wherein the first one references a column that is also produced by the subsumer, and the second one references a rejoin-table column, and the third one references a rejoin column (g.id) and an AST column (ti.pg.id). Condition 2 is also satisfied, as the referential integrity constraint that exists between the TRANS.locid and LOC.id columns makes the join between TRANS and LOC in the subsumer loss-less. With respect to column derivability (condition 4) two things are worth observing. First, the t.id column in the query is derived from the ti.transid column in the subsumer. Although these two columns belong to different base tables (TRANS and TRANSITEM respectively), they are in fact equivalent because of the "ti.transid=t.id" predicate. The algorithm is able to recognize this "column transitivity" and thus derive t.id from ti.transid. Second, the total_discount column can be derived in 2 different ways: either using the individual ti.quantity, ti.price, and ti.discount_rate columns, or using the ti.discount_rate and the total_value columns. In general, whenever there are alternative ways to derive a subsumee expression from the subsumer columns, the system chooses to use the minimum number of columns ("maximal (sub) expression matching").

1.2 Self Joins

The assumptions at the beginning of (E.1.1) are not always true. The most common situations where these assumptions are violated are when self-joins are involved.

This is illustrated in the following example:

```
CREATE TABLE T (c1 int, c2 int, c3 int);
AST3:
CREATE TABLE AST3 As (
SELECT *
FROM T
WHERE c1 > 10)
Q3:
SELECT T1.c1
FROM T as T1, T as T2
WHERE T1.c1 = T2.c2 AND T2.c1 > 10
```

In this example the query has two children, T1 and T2, both of which match with the AST's single child T (i.e., condition (b) is violated). To handle this case, the match function takes only one of these matches into account and considers the other child of the query as a rejoin child. If the match function takes the (T1, T) match into account, then the match will fail because the AST predicate is not semantically equivalent with the query predicate: the c1 column in the AST is equivalent to T1.c1, but the query predicate refers to T2.c1. The match function, however, will not give up immediately, it remembers that it also has the option of matching T2 with T, and it will try that option, thus succeeding eventually. So Q3 will be rewritten as follows:

```
NewQ3:
SELECT T1.c1
FROM T as T1, AST3 as A
WHERE T1.c1 = A.c2
```

In general, if condition (a) is violated, i.e., if a subsumee child, say E1, matches with more than one subsumer children, say R1 and R2, then the match function will initially consider only one of these matches, say E1 with R1, and "forget" the other one. If, however, this choice does not lead to a match, then the match function will backtrack, consider the (E1, R2) match, and then try again.

Similarly, if condition (b) is violated, i.e., if two subsumee children, say E1 and E2, match with the same subsumer child, say R1, then the match function will initially take only one of these matches into account, say E1 with R1, and it will consider E2 as a rejoin child (or if E2 matches with some other subsumer child as well, say R3, then it may choose to pair E2 with R3 instead). If the match fails, then the (E2, R1) child match will be considered instead.

Therefore, it can be seen that when alternative child matches exist, the match function first enforces conditions (a) and (b) by picking some of the alternatives and disregarding others. If its choices turn out to be unsuccessful, the match function backtracks and picks some other combination of child matches, until it reaches success or exhausts all of its alternatives. Given this approach, it can be assumed in the rest of this document that conditions (a) and (b) of E.1.1 are always true.

1.3 GROUP-BY Boxes

The conditions for the subsumee to match with the subsumer are:

1. Every subsumee grouping column must be semantically equivalent with some subsumer grouping column. In other words, the subsumee's grouping items must be a subset, not necessarily proper, of the subsumer's grouping items.
2. If the subsumee and subsumer grouping sets are the same, then each subsumee aggregate output column must be semantically equivalent with some subsumer aggregate output column. Otherwise, each subsumee aggregate output column must be derivable from the subsumer's output columns.

Compensation is necessary only if the subsumee's grouping set is a proper subset of the subsumer's grouping set. In this case, the compensation consists of a GROUP-BY box that has the same grouping set as the subsumee, and derives the subsumee's output columns from the subsumer's output columns. The appropriate derivations for aggregate functions are listed below. Throughout this list, it is assumed that x and y are subsumee and subsumer input columns, respectively, and that x and y are semantically equivalent.

COUNT(*)→SUM(cnt), where "cnt" is the COUNT(*) column of the subsumer, or "cnt" is the COUNT(z) column of the subsumer and z is any non-nullable column used in the subsumer.

COUNT(x)→SUM(cnt), where "cnt" is the COUNT(y) column of the subsumer, or "cnt" is the COUNT(x) column of the subsumer if x is non-nullable.

SUM(x)→SUM(sm), where "sm" is the SUM(y) column of the subsumer.

SUM(x)→SUM(y*cnt), where x is non-nullable, y is a subsumer grouping column, and "cnt" is the subsumer COUNT(*) output column.

AVG(x)→SUM(sm)/SUM(cnt), where "sm" is the SUM(y) column of the subsumer, and "cnt" is the COUNT(y) column of the subsumer or the COUNT(*) column of the subsumer if the x column is non-nullable.

MAX(x)→MAX(mx), where "mx" is the MAX(y) column of the subsumer or MAX(y), where y is in the subsumer's grouping set.

MIN(x) same as MAX.

COUNT(distinct x)→COUNT(y), where y is in the subsumer's grouping set.

SUM(distinct x)→SUM(y), where y is in the subsumer's grouping set.

VARIANCE(x) same as $AVG(x^2)-AVG(x)^2$.

STDDE V(x) same as sqrt(VARIANCE(x)).

Any other aggregate function that is an algebraic expression of the above aggregate functions can also be derived. Consider the following example:

---

AST4:
CREATE TABLE AST4 AS (
SELECT year(t.pdate) AS year, month(t.pdate) AS month,
COUNT(*) AS cnt, SUM(quantity*price) AS value
FROM TRANSITEM ti, TRANS t
WHERE ti.transid = t.id
GROUP BY year(t.pdate), month(t.pdate));
Q4:
SELECT year(t.pdate) AS year, COUNT(*) AS cnt,
SUM(quantity*price) AS value
FROM TRANSITEM ti, TRANS t
WHERE ti.transid = t.id
GROUP BY year(t.pdate);

---

Figure 9A:
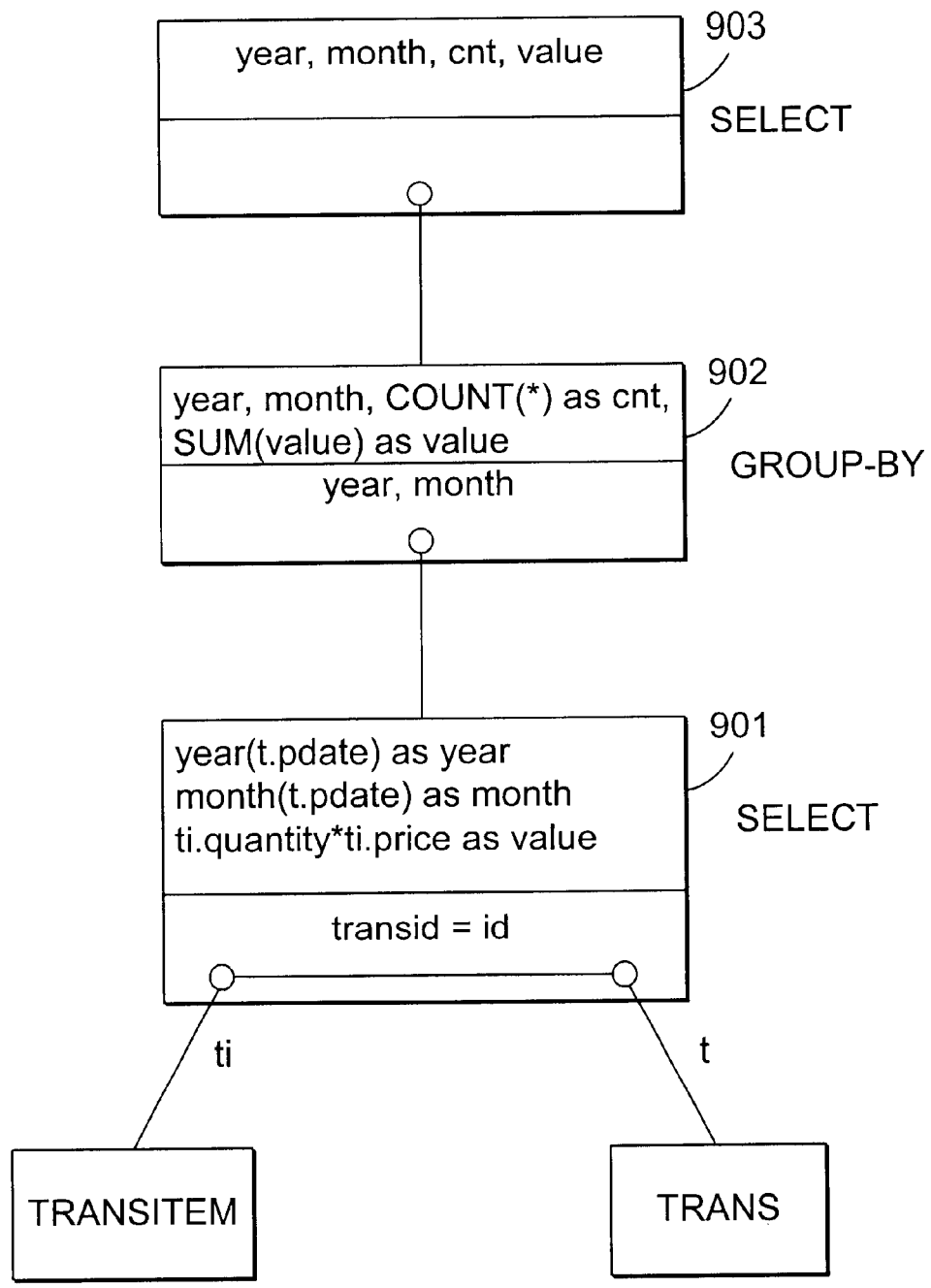
FIGS. 9A, 9B, and 9C are block diagrams of Query Graph Model representations that illustrate various SQL statements.
Figure 9B:
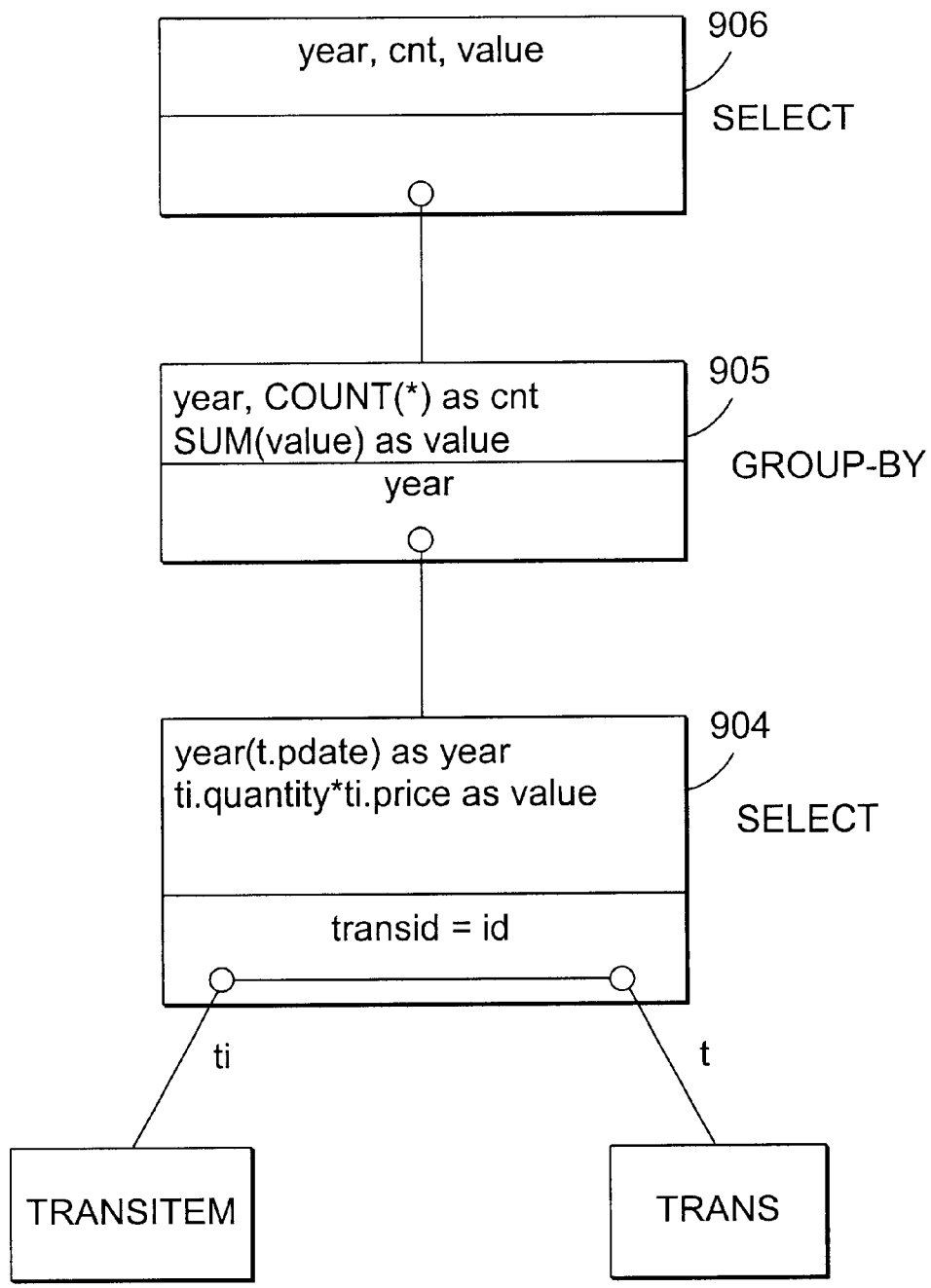
Figure 9C:
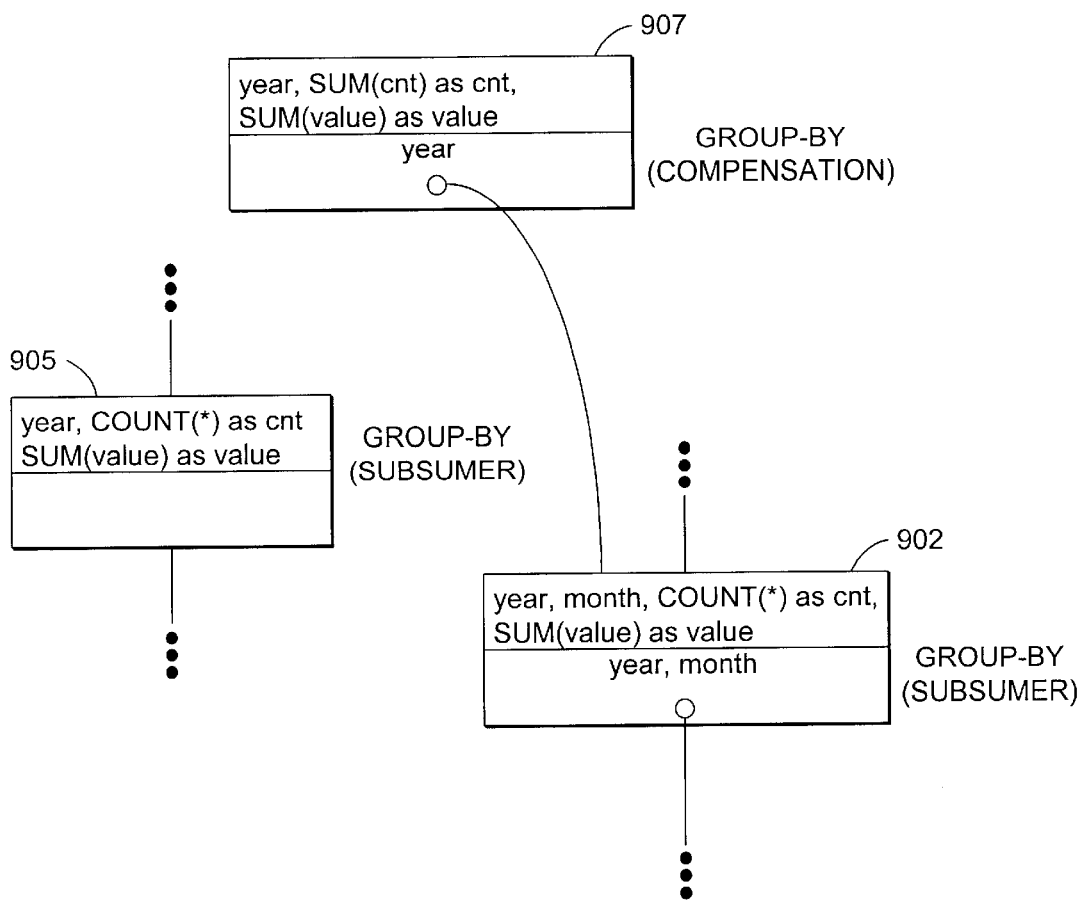

FIGS. 9A (boxes 901–903) and 9B (boxes 904–906) show the QGM graphs for the AST and the query respectively. FIG. 9C (boxes 902, 905, 907) shows the compensation (box 907) required to match the two GROUP BY boxes. The rewritten query is:

---

New Q4:
SELECT year, SUM(cnt) As cnt, SUM(value) As value
FROM AST4
GROUP BY year;

---

2. Non-exact Child Matches

Matching boxes whose children match exactly is relatively easy, as the system has to look inside the two involved boxes only (their operations, predicates, and output columns). When, however, children do not match exactly, then the system also has to consider the boxes that comprise the compensations for the non-exact child matches. Usually, these child compensation boxes have to be included in the new compensation that is required for the current match. This is called "pulling up" the child compensation boxes. For this pullup to be possible, the following minimum condition is required:

General Pullup Condition:

The columns referenced by expressions inside a child compensation must be either rejoin columns or be derivable from the subsumer's output columns.

2.1 GROUP-BY Boxes with SELECT-Only Child Compensation

Here, the case where the child compensation consists of a single SELECT box is considered. Note that the child-compensation SELECT box may perform one or more rejoins as well. This SELECT box must be pulled up above the subsumer GROUP-BY box, and as a result, the general pullup condition must be satisfied. The matching conditions here are as follows:

1. Every subsumee grouping column must be derivable from the subsumer grouping columns and/or the rejoin columns (if any).
2. Each subsumee output column that is an aggregate function must be derivable from the subsumer's output columns.

The compensation includes the pulled up SELECT box, which maybe followed by a GROUP BY box: if the SELECT box does not perform any rejoins, then the GROUP BY compensation is necessary only if the subsumee's grouping set is a proper subset of the subsumer's grouping set (this is the same as in E.1.3); otherwise regrouping is required in the compensation only if the rejoin changes the duplicity of the rows (for example when the rejoin is not 1:N between the rejoin table and the non-rejoin table). The aggregate-function derivation rules from E.1.3 apply here as well.

The following is an example with no rejoins. For an example with rejoins, see AST1, Q1, and the associated FIGS. 7A–C.

---

AST5:
(Same as AST4)
Q5:
SELECT year(t.pdate) % 100 AS year, COUNT(*) AS cnt,
SUM(quantity*price) AS value
FROM transitem ti, trans t
WHERE ti.transid = t.id AND year(t.pdate) > 1990
GROUP BY year(t.pdate) % 100;

---

Figure 10A:
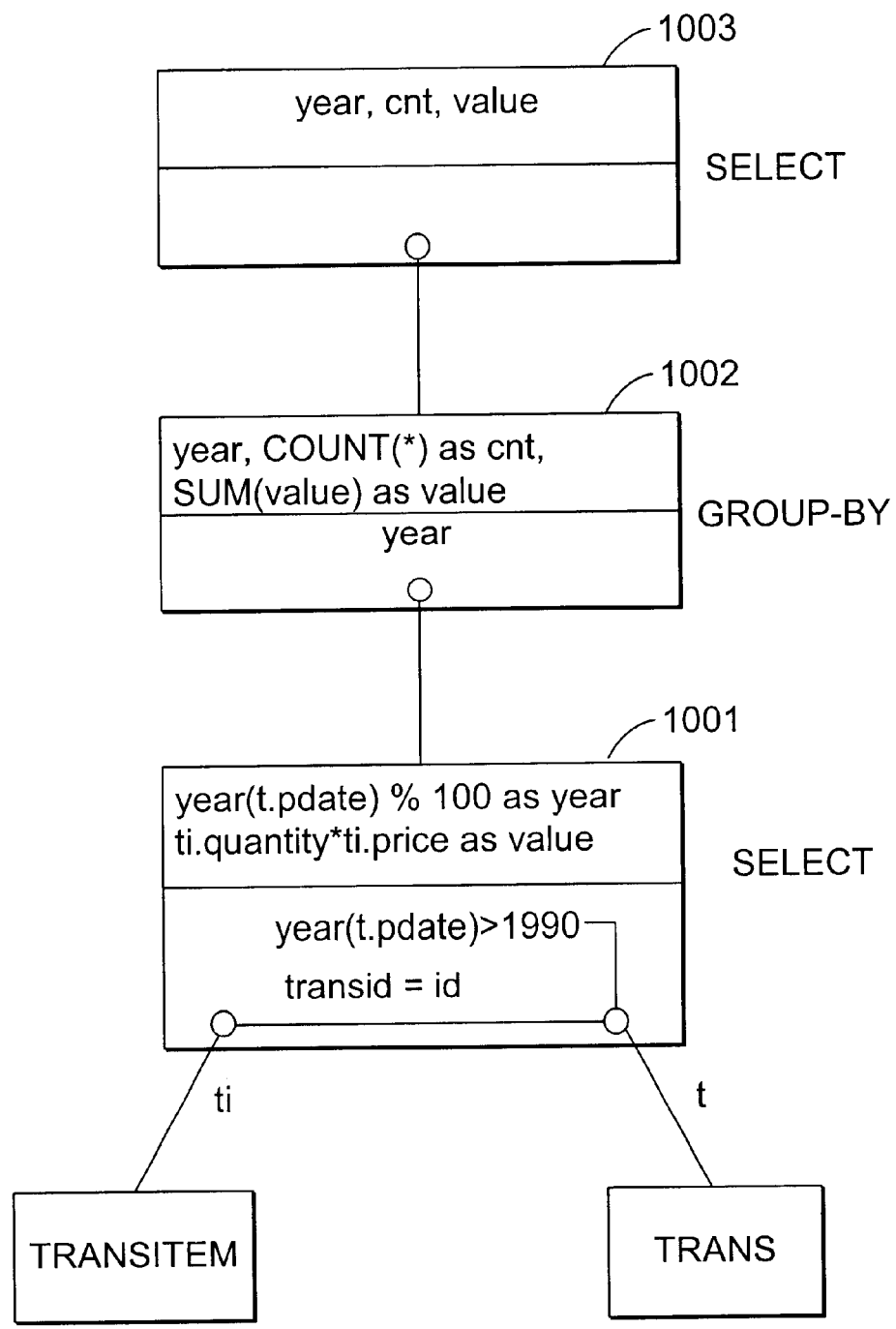
FIGS. 10A and 10B are block diagrams of Query Graph Model representations that illustrate various SQL statements.
Figure 10B:
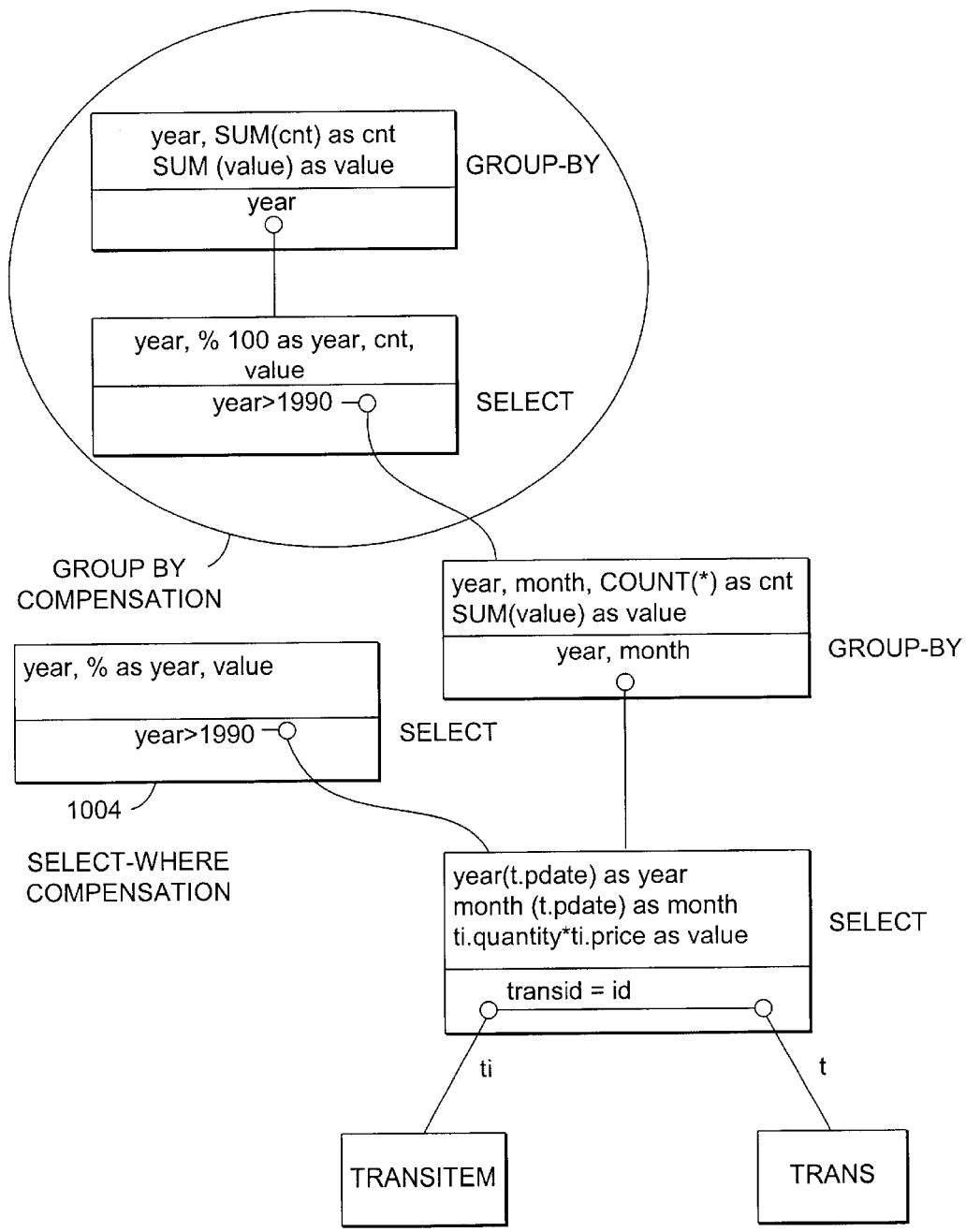

FIG. 10A (boxes 1001–1003) shows the QGM graph for the query. Q5 is the same as Q4 except for the additional "year(t.pdate)>1990" predicate. This predicate creates compensation between the two SELECT-WHERE boxes (901 and 1001), which needs to be pulled up when the two GROUP BY boxes (902 and 1002) are matched. The compensations are shown in FIG. 10B (box 1004).

The rewritten query is:

```
New Q5:
SELECT year % 100 as year, SUM(cnt) As cnt, SUM(value) AS value
FROM AST4
WHERE year > 1990
GROUP BY year % 100;
```

2.2 GROUP BY Boxes With GROUP BY Child Compensation

Figure 11:
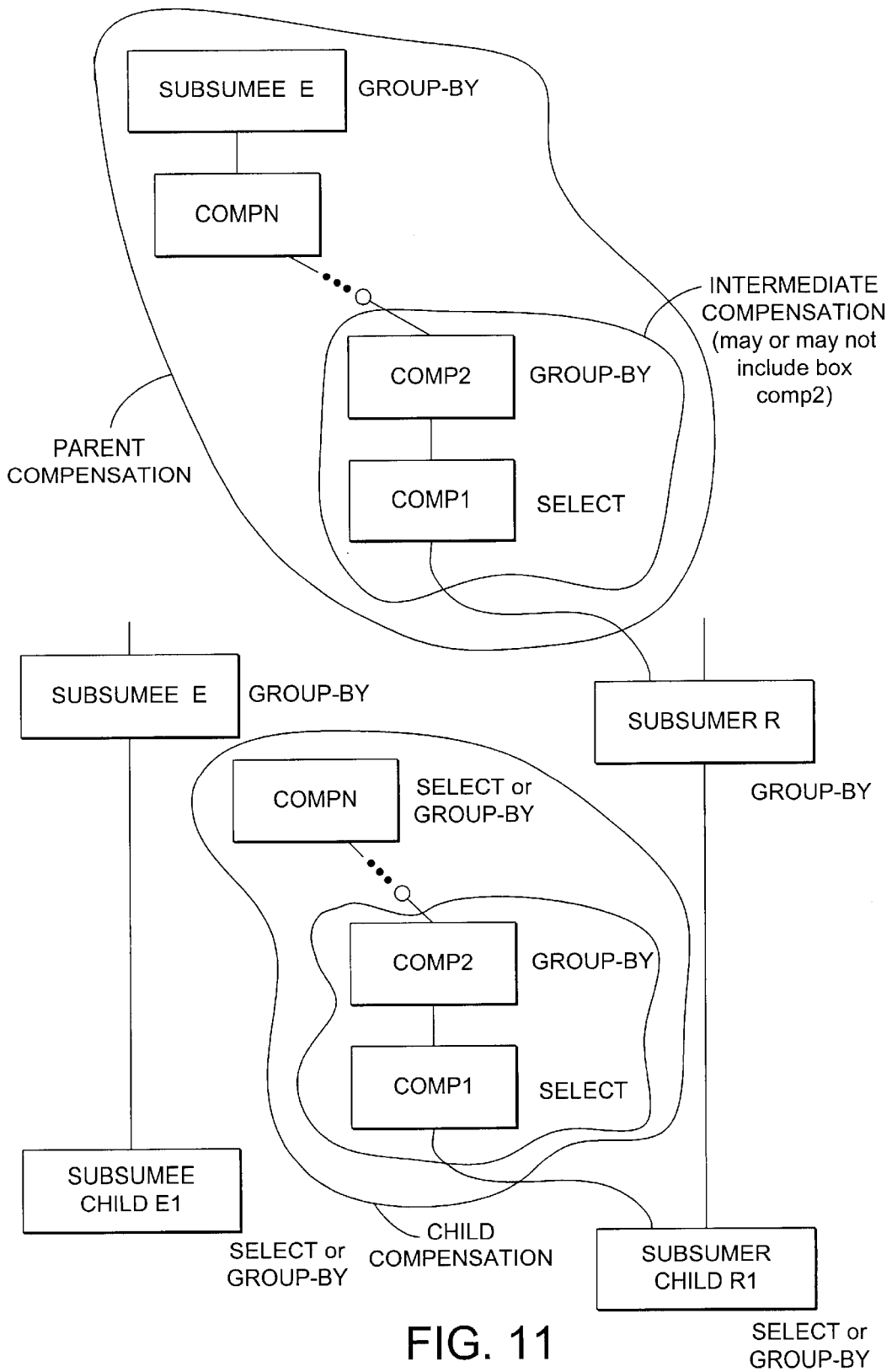
FIG. 11 is a block diagram of Query Graph Model representations that illustrate various SQL statements.

Now, consider the case where the child compensation contains at least one GROUP BY box and a number (possibly zero) of SELECT boxes. The general form for this pattern is shown in FIG. 11, where COMP2 is the lowest GROUP BY box in the child compensation stack (the COMP1 SELECT box may or may not be present in the child compensation). To handle this pattern, the match function calls itself recursively, trying to match the COMP2 box with the original subsumer R. This recursive invocation of the match function conforms with pattern E.2.1 above: COMP2 plays the role of the subsumee, R is again the subsumer, and the COMP1 SELECT box, if present, is the child compensation. If this intermediate match succeeds, then the original match will succeed as well, because the output of the COMP2 box in the child compensation is (by definition) equivalent with the output of the COMP2 box in the intermediate compensation (see FIG. 11). Hence, all that has to be done to complete the original match is copy the subsumee E and all the boxes above COMP2 in the child compensation on top of the intermediate compensation in the parent compensation.

Consider the following example:

```
AST6:
CREATE TABLE AST6 AS (
SELECT country, pgid, value, SUM(value) AS total_value,
COUNT(*) AS cnt,
FROM (SELECT l.country, l.state, ti.pgid, SUM(ti.quantity * ti.price)
as value
    FROM TRANSITEM AS ti, TRANS AS t, LOC AS l
    WHERE ti.transid = t.transid AND t.locid = l.locid
    GROUP BY l.country, l.state, ti.pgid) AS dt(country, state,
    pgid, value)
GROUP BY country, pgid, value);
Q6:
SELECT pgid, value, COUNT(*) as cnt,
FROM (SELECT l.country, ti.pgid, SUM(ti.quantity * ti.price) as value
    FROM TRANSITEM AS ti, TRANS AS t, LOC AS l
    WHERE ti.transid = t.transid AND t.locid = l.locid
    GROUP BY l.country, ti.pgid) AS dt(country, pgid, value),
PGROUP g
WHERE g.id = dt.pgid AND g.name = 'electronics'
GROUP BY pgid, value;
```

Figure 12A:
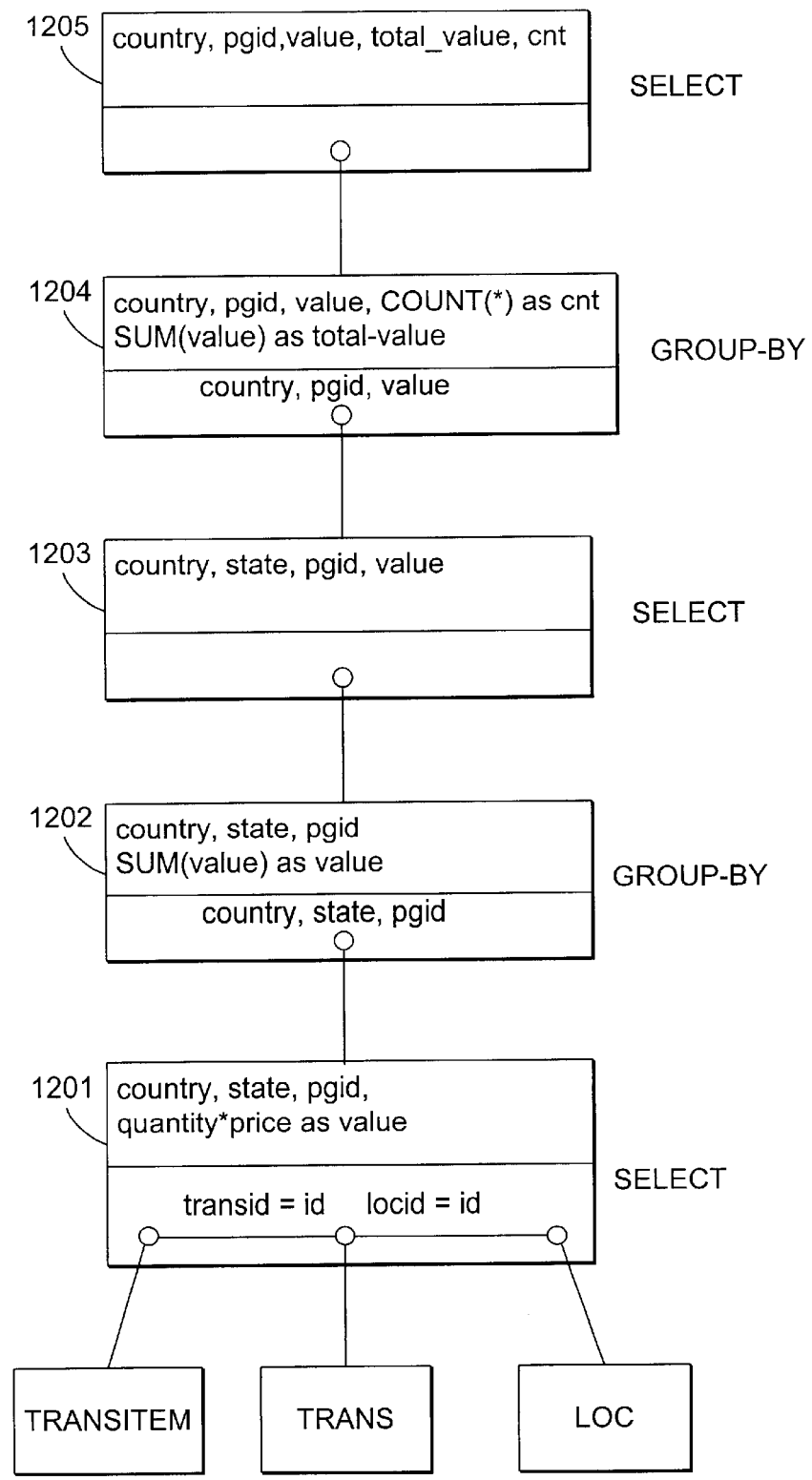
FIGS. 12A, 12B, 12C, and 12D are block diagrams of Query Graph Model representations that illustrate various SQL statements.
Figure 12B:
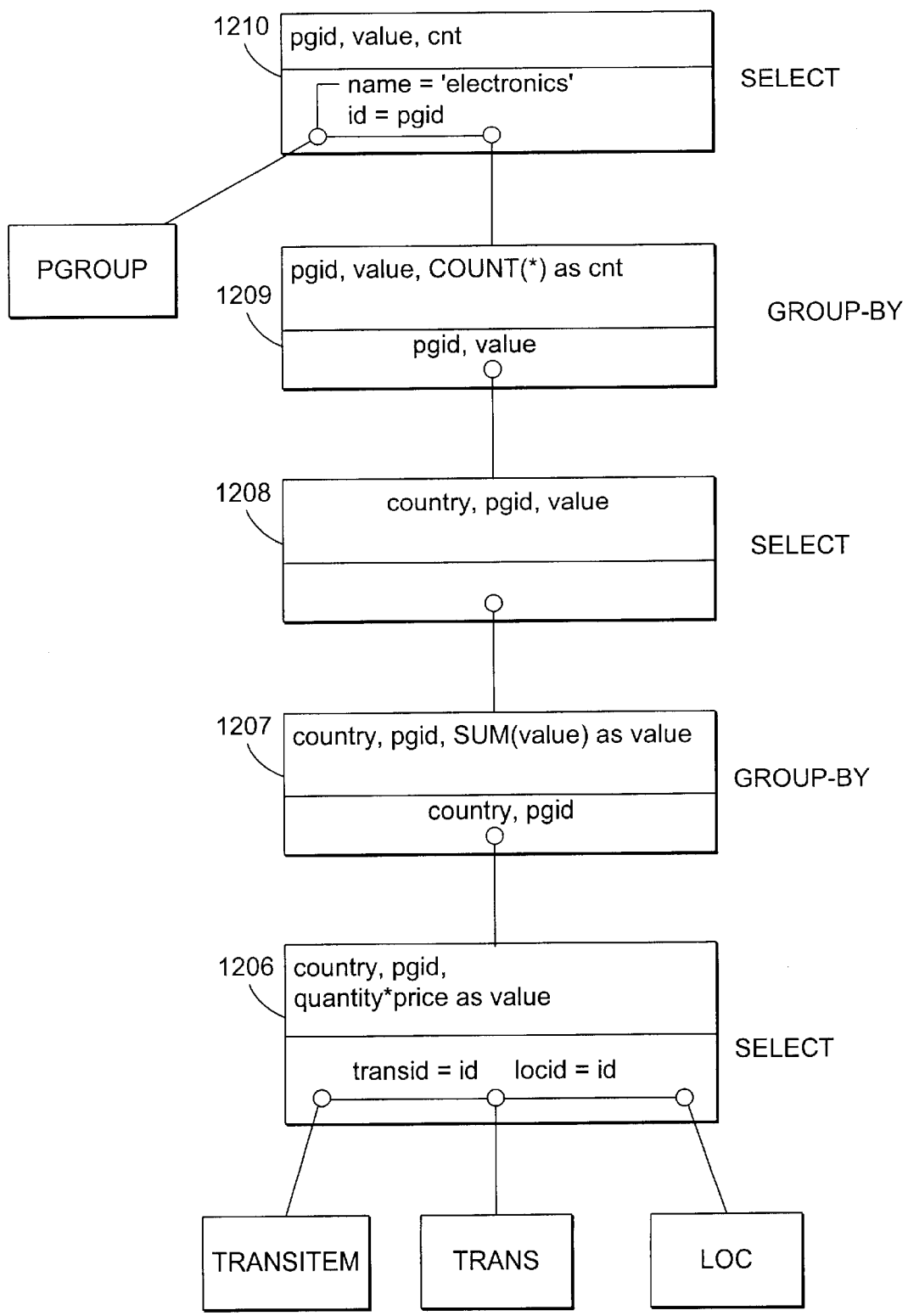
Figure 12C:
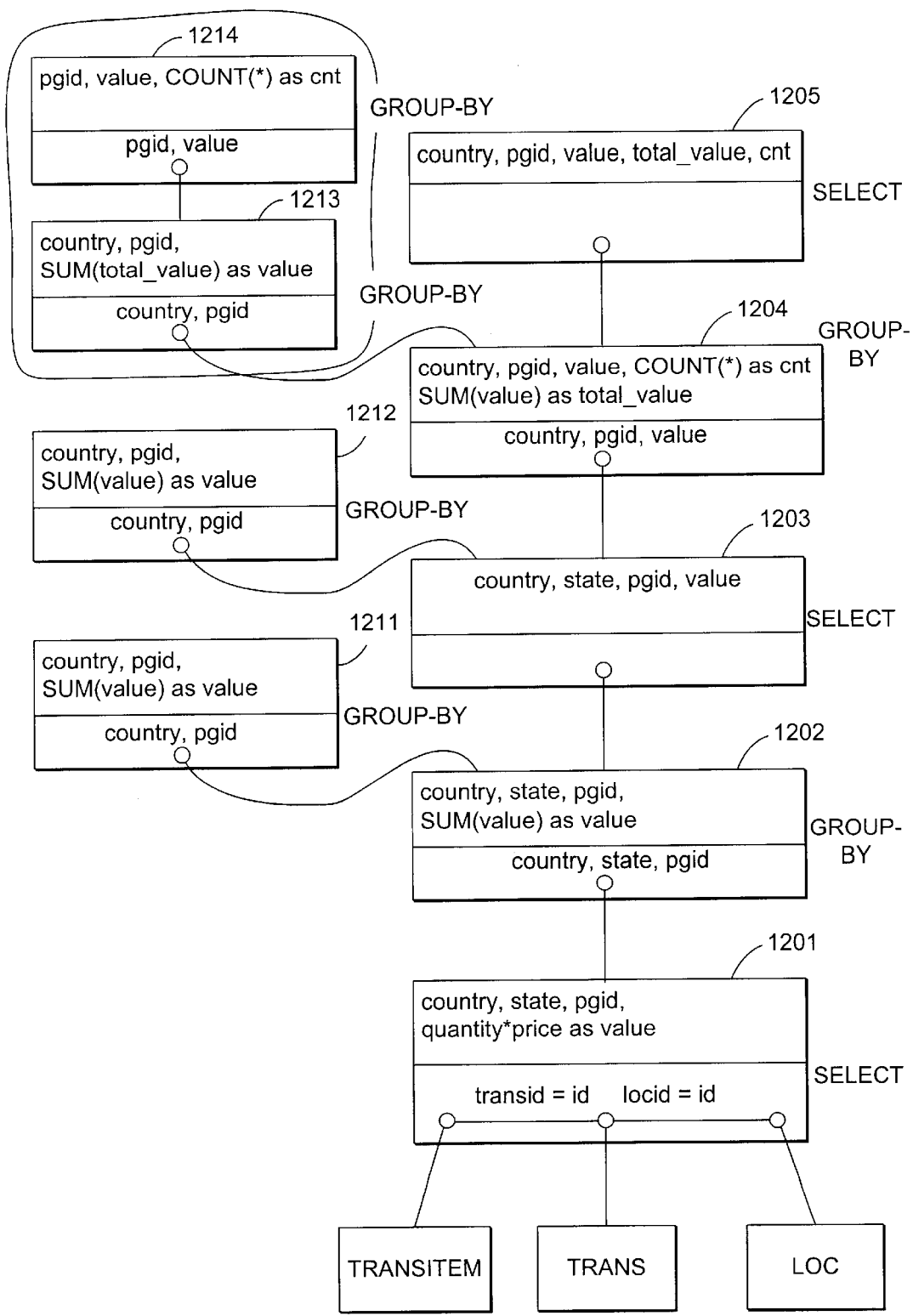
Figure 12D:
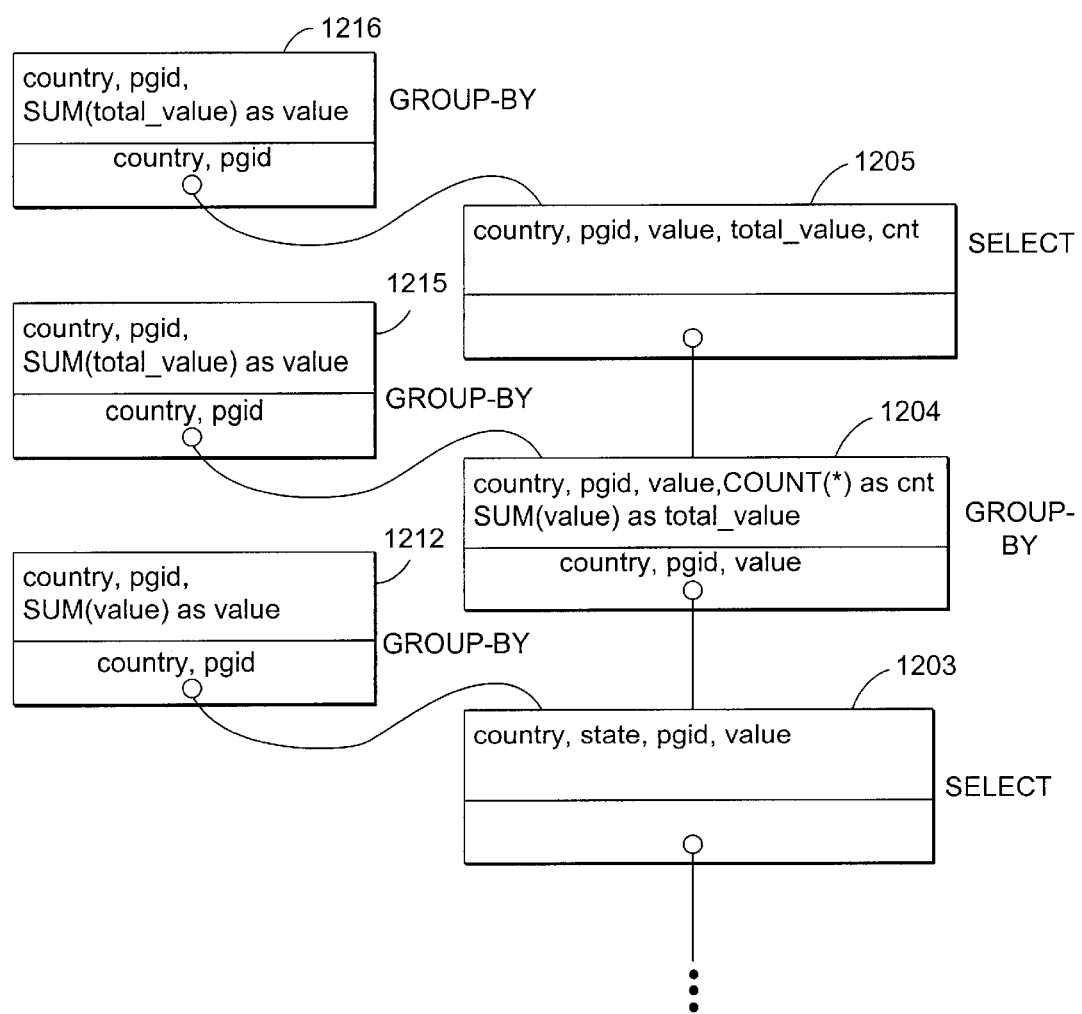

FIGS. 12A (boxes 1201–1205) and 12B (boxes 1206–1210) how the QGM graphs for the AST and the query respectively. FIG. 12C (boxes 1201–1205 and 1211–1214) shows the compensation (boxes 1214 and 1213) for the match between the two upper GROUP BY boxes (boxes 1209 and 1204). FIG. 12D is described later.

2.3 SELECT Boxes With SELECT-Only Child Compensation

The conditions here are essentially the same as in E.1.1, but adjustments have to be made in order to include the child compensation boxes. In particular, conditions 1 and 3 need to be adjusted as follows:

1. Each subsumer predicate that does not reference any extra-child columns matches, i.e., is semantically equivalent, with some predicate that appears either in the subsumee or in one of the child compensation boxes.
3. Any subsumee or child-compensation predicate that does not have a matching subsumer predicate is derivable from the subsumer's output columns and/or the rejoin columns.

The compensation needs to be adjusted as well to include any predicates that appear in child compensation boxes but not in the subsumer.

Consider the following example:

```
AST7:
CREATE TABLE AST7 AS (
SELECT a1, a2, b1, b2, GA.cnt AS GA_cnt, GB.cnt AS GB_cnt
FROM (SELECT a1, a2, COUNT(*) AS cnt
    FROM A
    GROUP BY a1, a2, AS GA(a1, a2, cnt),
    (SELECT b1, b2, COUNT(*) AS cnt
    FROM B
    GROUP BY b1, b2) AS GB(b1, b2, cnt)
WHERE a2 = b1)
Q7:
SELECT a1, a2, b1, b2, GA.cnt, GB.cnt
FROM (SELECT a1, a2, COUNT(*) AS cnt
    FROM A, C
    WHERE a1 = c1 AND c2 = 10
    GROUP BY a1, a2) AS GA(a1, a2, cnt),
    (SELECT b1, b2, COUNT(*) AS cnt
    FROM B
    GROUP BY b1, b2
    HAVING COUNT(*) >1) AS GB(b1, b2, cnt)
WHERE a2 = b1
```

Figure 13A:
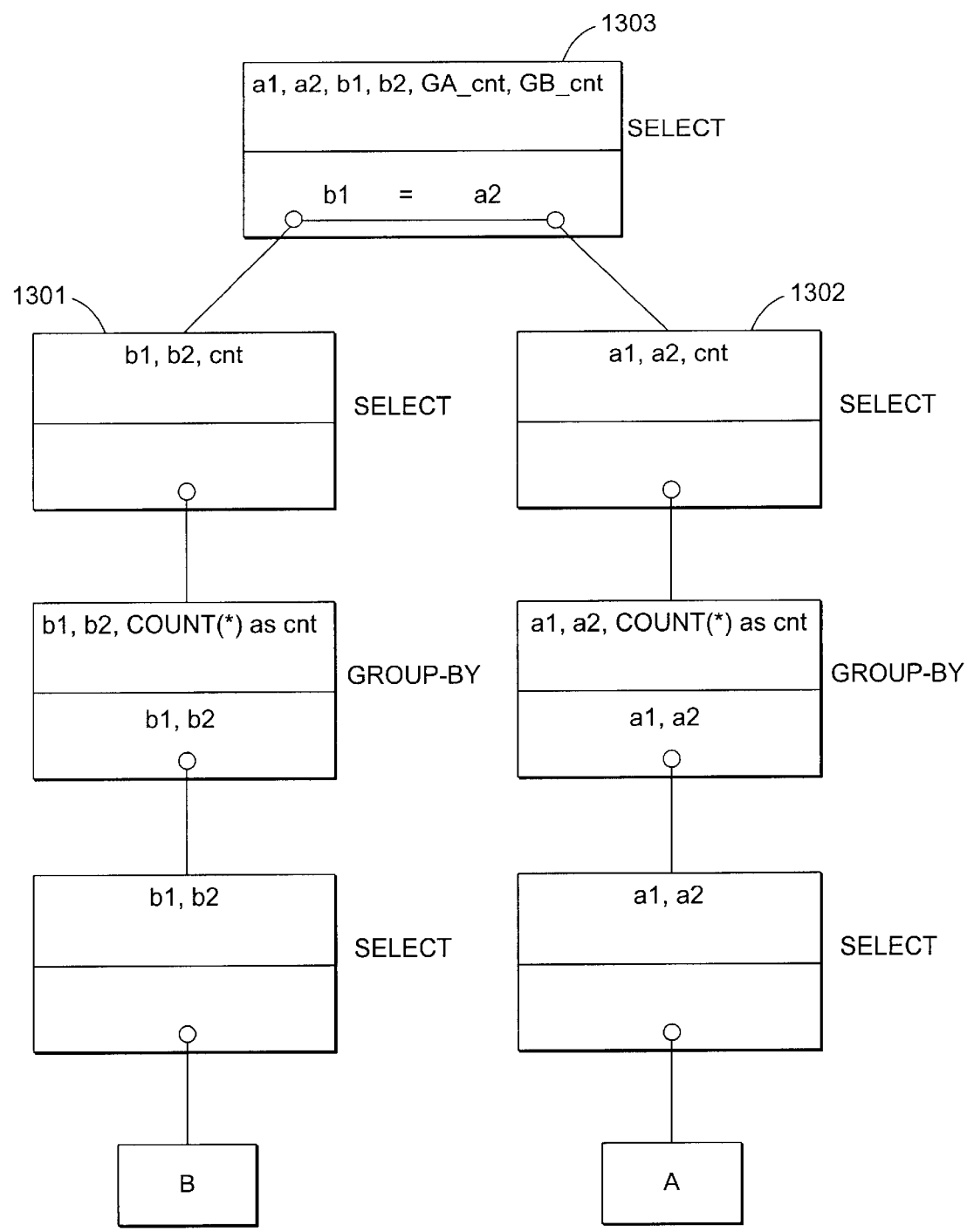
FIGS. 13A, 13B, and 13C are block diagrams of Query Graph Model representations that illustrate various SQL statements.
Figure 13B:
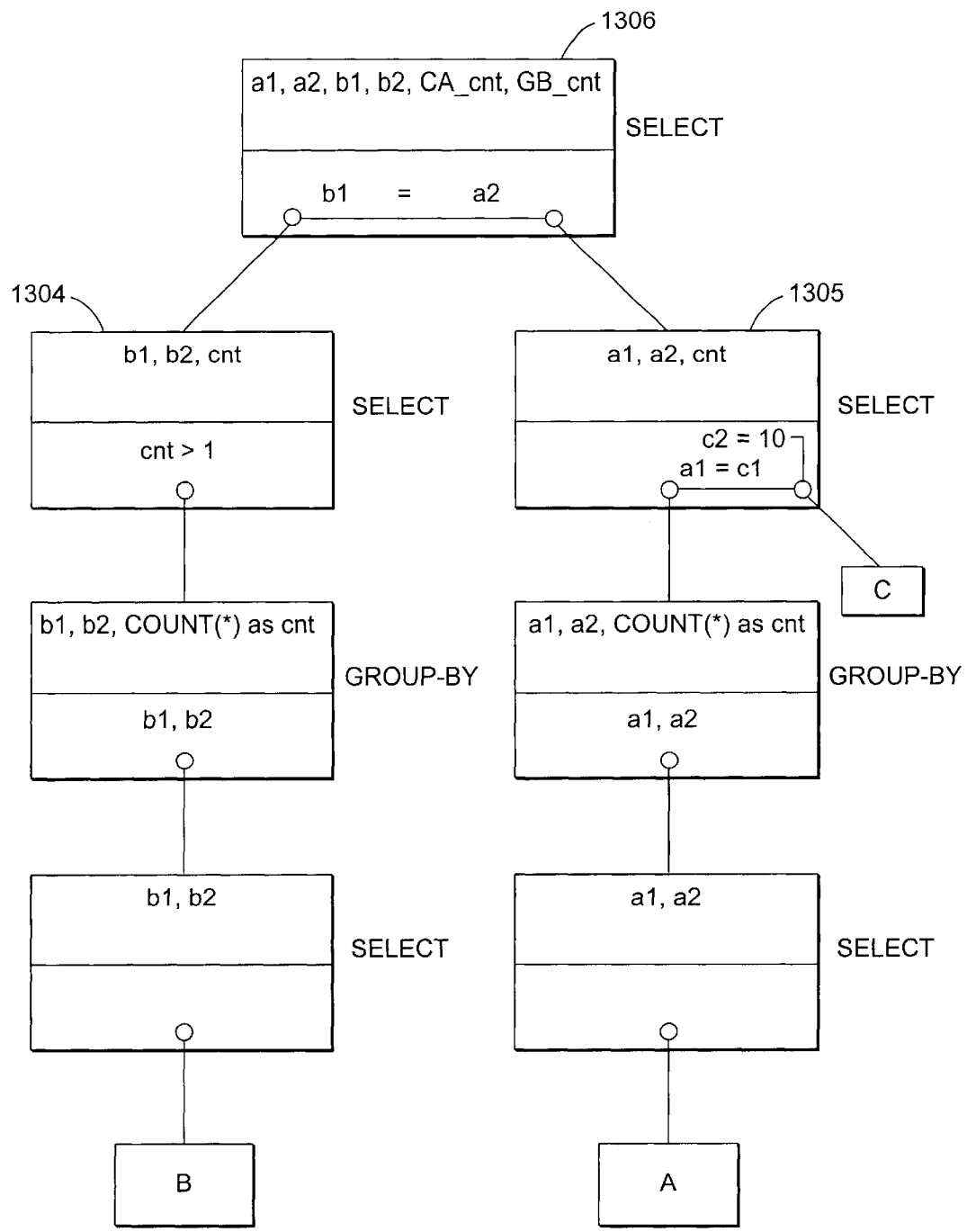
Figure 13C:
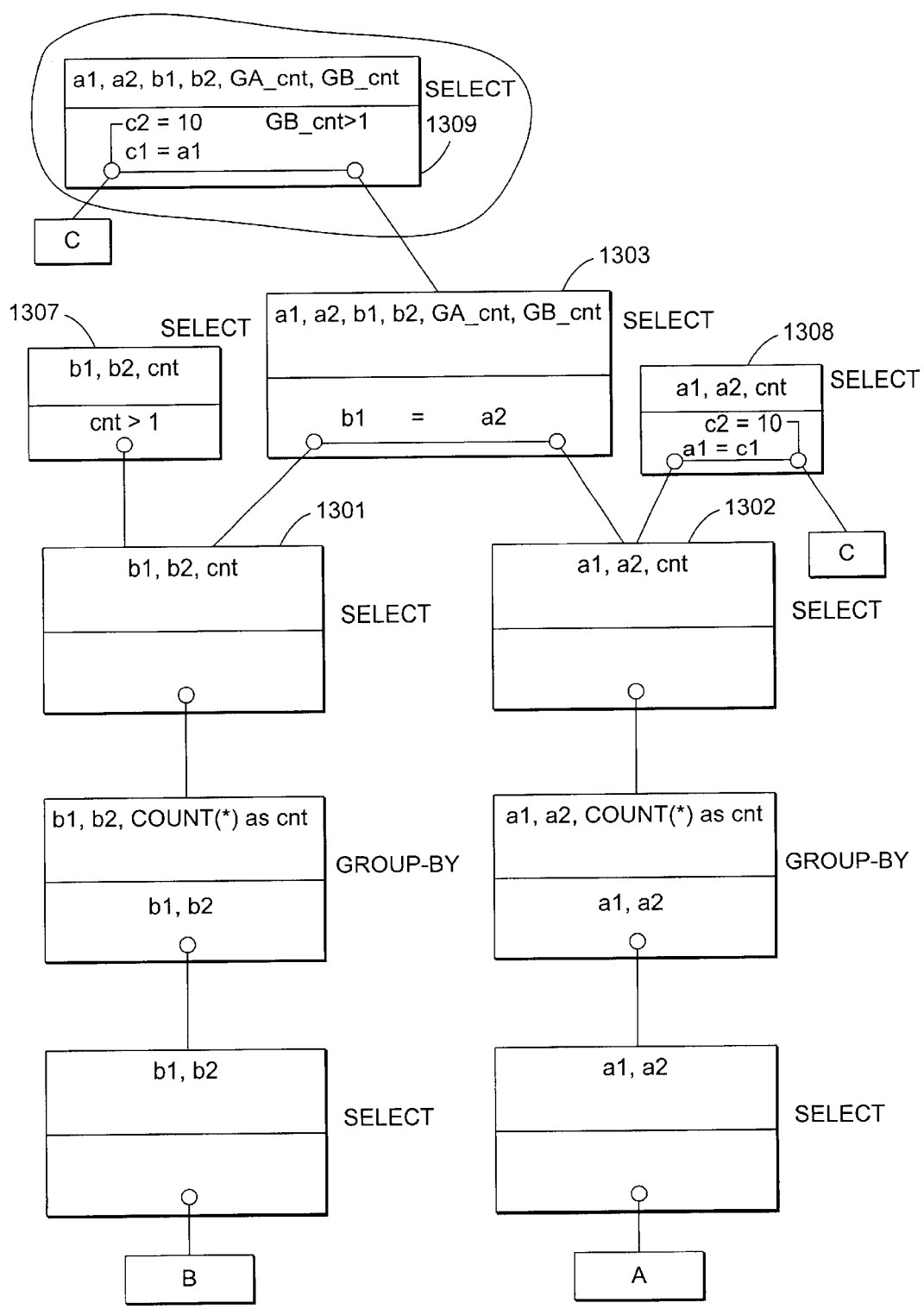

FIGS. 13A (boxes 1301–1303) and 13B (boxes 1304–1306) show the QGM graphs for the AST and the query respectively. FIG. 13C (boxes 1301–1303 and 1307–1309) shows the compensations (boxes 1307 and 1308) for the two subquery matches, i.e., for the matches between boxes 1301, 1304 and 1302, 1305. These compensations are pulled up to form the compensation (box 1309) for the final match between the two top SELECT boxes (boxes 1303 and 1306). The rewritten query is:

```
NewQ7:
SELECT a1, a2, b1, b2, GA_cnt, GB_cnt
FROM AS17, C
WHERE a1 = c1 AND c2 = 10 AND GB_cnt > 1
```

2.4 SELECT Boxes with Single Child Match A GROUP BY Child Compensation

Here, it is assumed that only one of the subsumee's children, say E1, matches with one of the subsumer's children, say R1; all the rest of the subsumee children (if any are rejoin children. Furthermore, the compensation for the (E1, R1) match contains at least one GROUP BY box and any number of SELECT boxes. The conditions for a match here are the same as in E.2.2.1), with the addition of the general pullup condition for the GROUP by boxes in the child compensation, that is, any grouping column in the child-compensation GROUP BY boxes must be derivable from the subsumer's output columns.

Consider the following example, which uses the example of AST6 and Q6 from (E.2.2). The QGM graphs for the AST and the query are shown in FIGS. 12A and 12B respectively.

Figure 14:
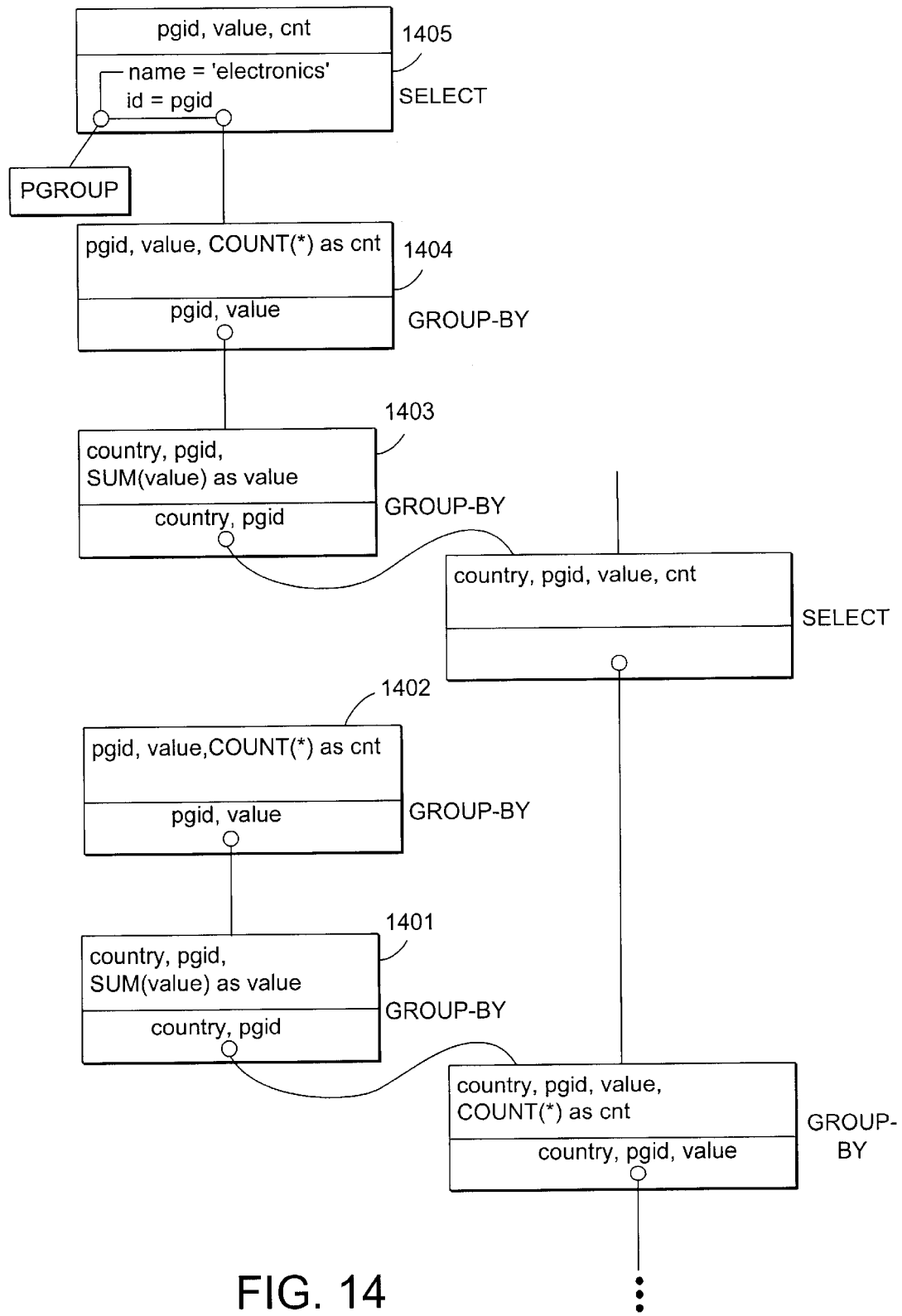
FIG. 14 is a block diagram of Query Graph Model representations that illustrate various SQL statements.

FIG. 14 (boxes 1401–1405) shows the compensation (boxes 1403, 1404, and 1405) for the match between the two top SELECT boxes. This compensation consists of the two pulled up GROUP BY boxes from the child compensation (boxes 1401 and 1402) plus an additional SELECT box (1405) that performs the rejoin with the PGROUP table and applies the "name=electronics" predicate.

F. Matching/Compensating Expressions

In the discussion so far, it has often been required that some subsumee expression (predicate or output column) be semantically equivalent with some subsumer expression. A method is, therefore, required to test for expression equivalence.

To devise such a method, first notice that expressions are represented as trees, whose internal nodes are operators and the leaf nodes are constants and columns. In general, the columns used in an expression are generated by the children of the box that contains the expression. Given this tree representation, testing for equivalence is straightforward when the two expressions are inside the same box: for the expressions to be equivalent, the system requires that their trees are identical. But what if the expressions are in different boxes? In particular, assume that the system needs to test semantic equivalence between a subsumee expression E_exp and a subsumer expression R_exp. The trees of E_exp and R_exp can never be identical because they use different columns; E_exp uses columns generated by the subsumee's children and R_exp uses columns generated by the subsumer's children. The approach then is to try to translate E_exp into an equivalent expression E'_exp that is valid within the subsumer's context, i.e., uses columns that are generated by the subsumer's children. Then, E'_exp can be compared with R_exp by comparing their trees. If E'_exp and R_exp are equivalent, then E_exp and R_exp are also equivalent.

First, consider the case where the subsumee and subsumer children match exactly. In this case, translating E_exp to E'_exp is easy, as for each column that is produced by a (non-rejoin) subsumee child, there is an equivalent column that is produced by the subsumer's matching child. Therefore, each column in E_exp can be replaced with its equivalent subsumer column, and the result will be the E'_exp expression.

Translating E_exp is somewhat more complicated when the subsumee and subsumer children do not match exactly. This is best illustrated by the following example:

```
AST8:
CREATE TABLE AST8 AS (
SELECT acctid, year(pdate), month(pdate), COUNT(*) AS cnt
FROM TRANS
GROUP BY acctid, year(pdate), month(pdate)
HAVING 2*COUNT(*) >4)
Q8:
SELECT acctid, year(pdate), COUNT(*) AS cnt
FROM TRANS
GROUP BY acctid, year(pdate)
HAVING 2*COUNT(*) >4
```

Figure 15A:
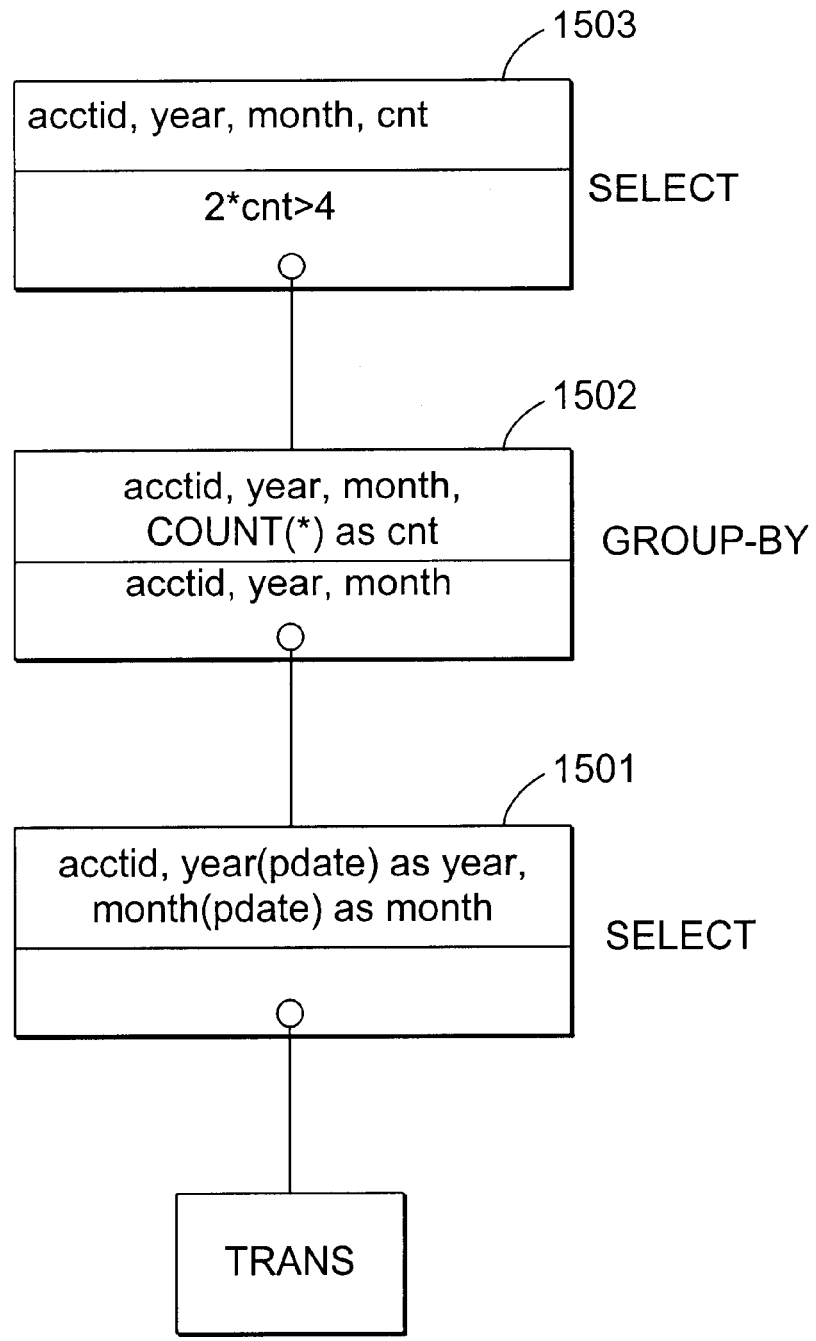
FIGS. 15A, 15B, and 15C are block diagrams of Query Graph Model representations that illustrate various SQL statements.
Figure 15B:
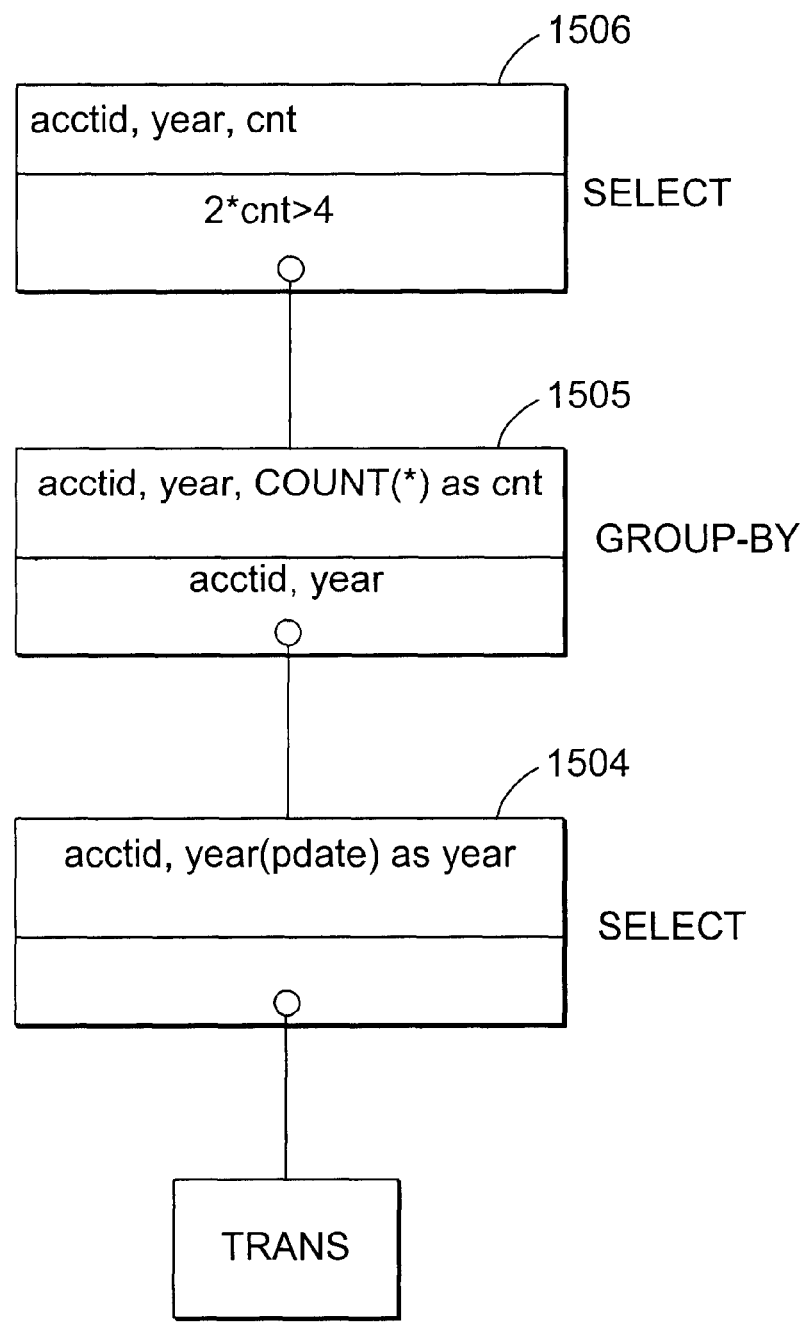
Figure 15C:
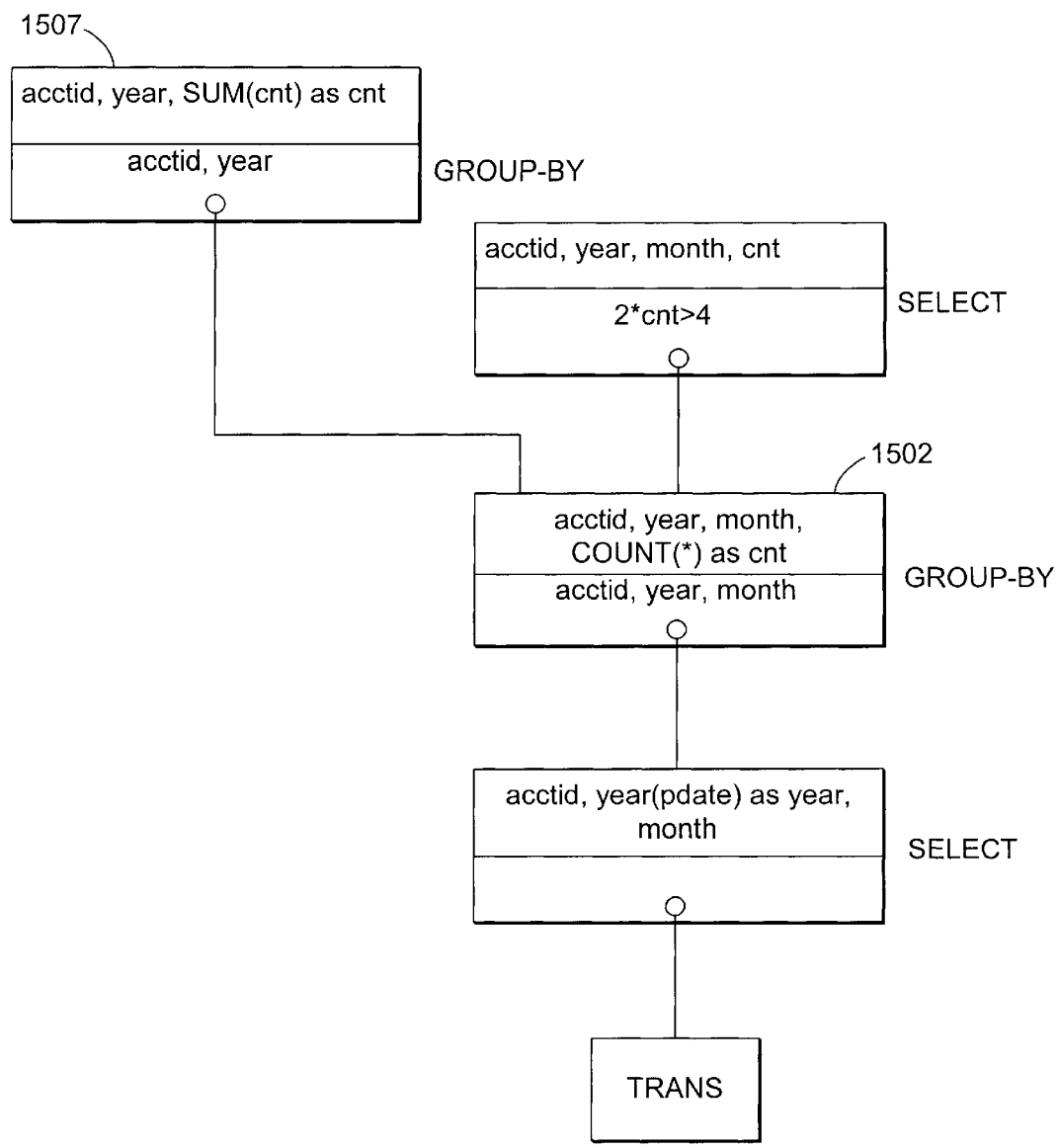

The QGM graphs for the AST and the query are shown in FIGS. 15A (boxes 1501–1503) and 15B (boxes 1504–1506), respectively. FIG. 15C (boxes 1502–1507) shows the compensation (box 1507) required for the match between the two GROUP BY boxes. There is, however, no match between the two top SELECT boxes. The problem is that, although the predicates that appear inside the two top SELECT boxes are syntactically equivalent, they are not semantically equivalent. The aggregate value of COUNT in the AST is the number of tuples in each unique grouping of acctid, year(pdate), and month(pdate), whereas the aggregate value of COUNT in the query is the number of tuples in each unique grouping of acctid and year(pdate). Given the following values for acctid, year(pdate) and month(pdate):

| Acctid | year(pdate) | month(pdate) |
|---|---|---|
| 1 | 1990 | 1 |
| 1 | 1990 | 1 |
| 1 | 1990 | 1 |
| 1 | 1990 | 2 |

Therefore, the summary table AST8 contains the following tupple:

| Acctid | Year | month | cnt |
|---|---|---|---|
| 1 | 1990 | 1 | 3 | whereas the query Q8 contains the following tuple:

| Acctid | Year | cnt |
|---|---|---|
| 1 | 1990 | 4 |

Looking at this scenario, it can be seen that the predicate "2*cnt>4" is applied after the grouping has been applied. Hence, the aggregate cnt is semantically not equivalent in the query and the AST. This causes the AST to lose information; specifically, the grouping (acctid=1, year=1, month=2), which is necessary to produce the correct query result, cnt=4, is lost. Therefore, the AST definition does not subsume the query because the query results can never be derived from the contents of the AST.

Figure 16A:
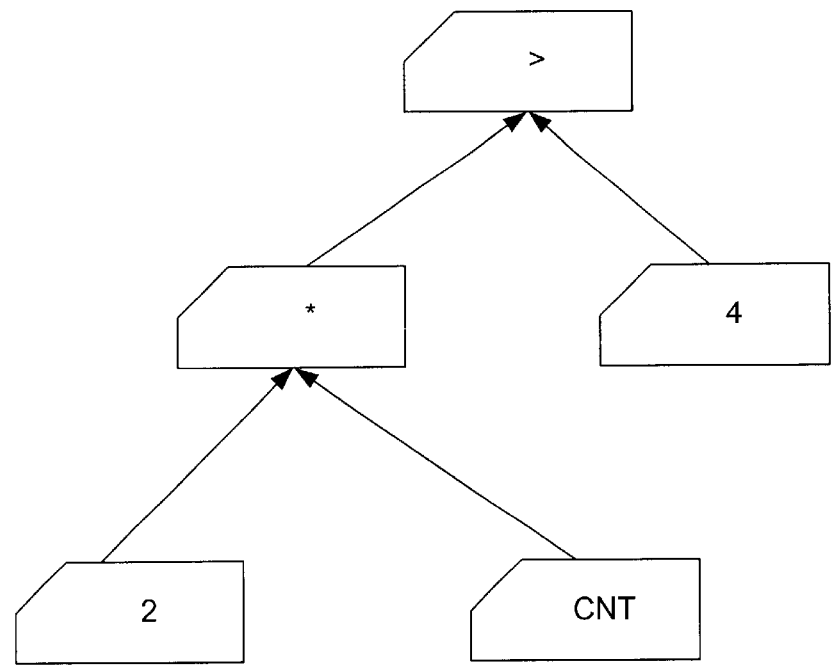
FIGS. 16A and 16B and 17A, 17B, and 17C are block diagrams that represent internal tree representations that illustrate various SQL statements.
Figure 16B:
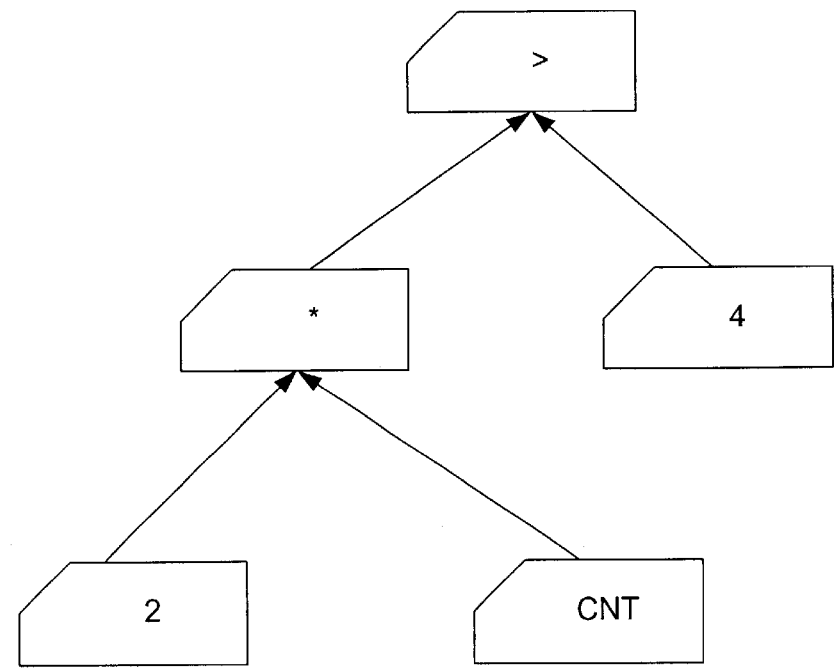

Now, it can be shown how the method actually detects the semantic inequivalence between the two HAVING predicates. FIGS. 16A and 16B are tree representations of these predicates, wherein FIG. 16A represents the subsumee expression and FIG. 16B represents the subsumer expression.

The translation of the subsumee expression begins by replicating its internal tree nodes and the constant leaves. Then, the cnt column is translated. To translate a column, the method first finds out the child box that produces the column; in the example, the "cnt" column is produced by the GROUP BY box in FIG. 15B (box 1505). The "cnt" column can then be tagged with the id of the box that produces the column.

Figure 17A:
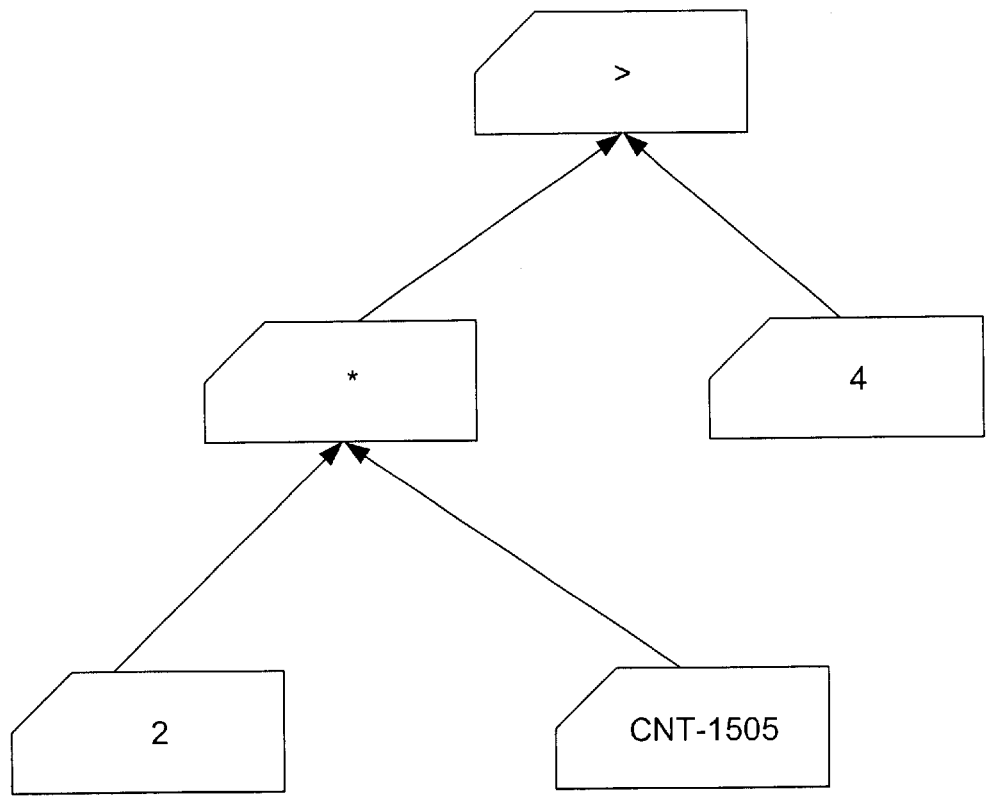
Figure 17B:
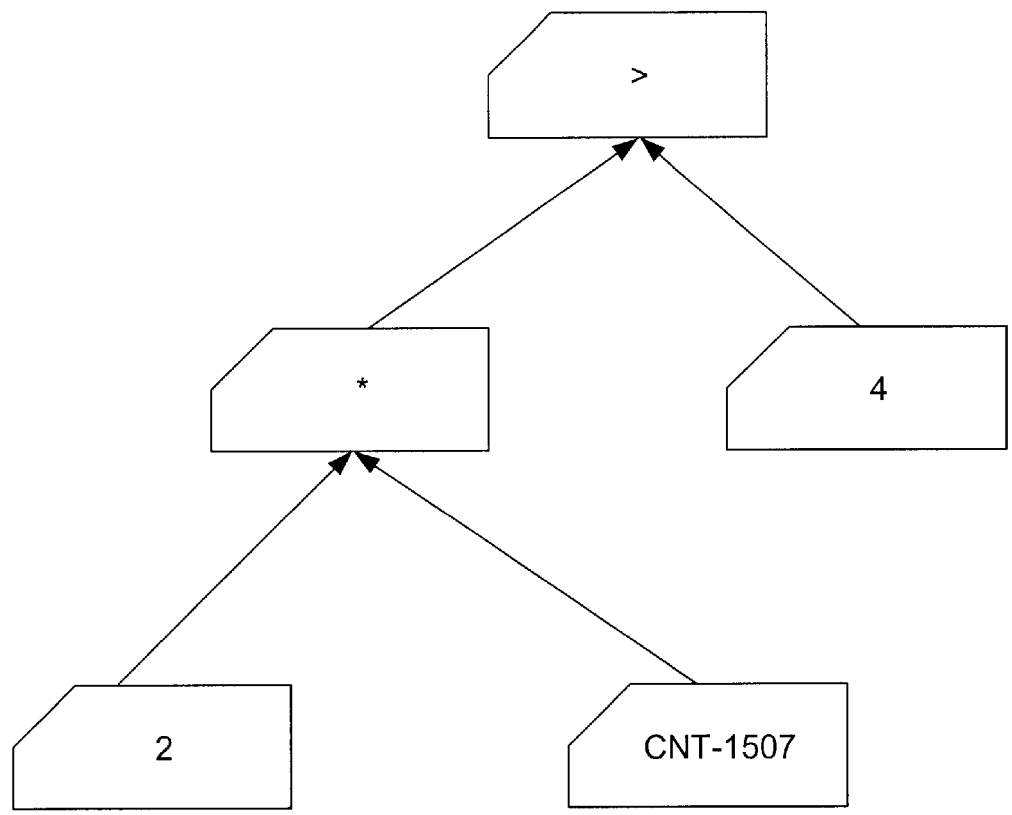
Figure 17C:
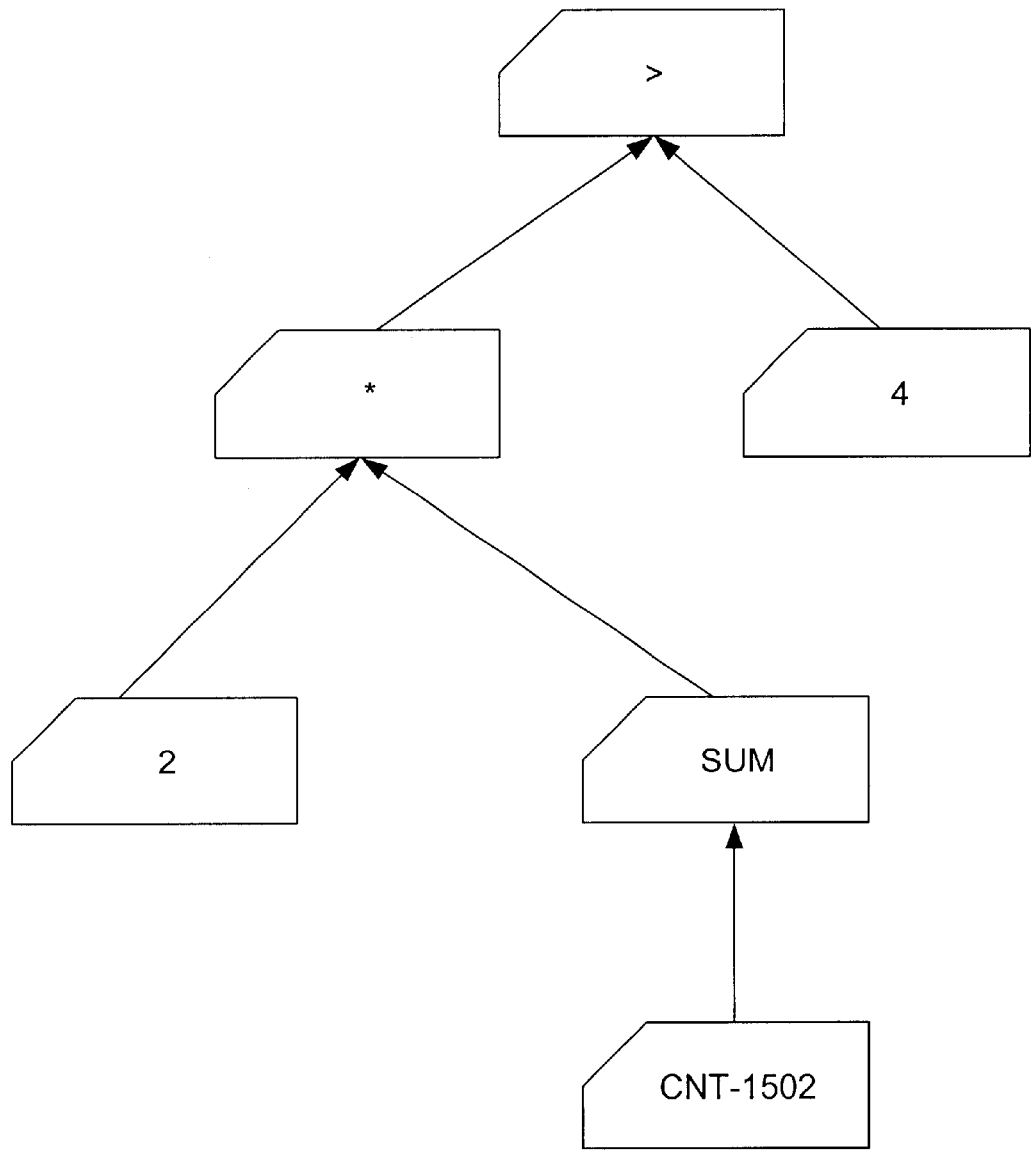

FIGS. 17A, 17B, and 17C are tree representations of these translation steps, wherein FIG. 17A represents translation step 1.

Next, the method notices that box 1505 is equivalent to box 1507 in FIG. 15C, and as a result, the "cnt-1505" column is equivalent to the "cnt" column of box 1507. FIG. 17B represents translation step 2.

However, "cnt-1507" is produced by the expression "SLM(cnt)", where the "cnt" column inside the SLUM is produced by box 1502. So, "cnt-1507" can be replaced with the expression "SLM(cnt-1502)". FIG. 17C represents translation step 3.

Finally, the method notices that the above expression is indeed the desired translation of the original subsumee expression. This is because box 1502 is a child of the subsumer, and as a result, the above expression is valid within the context of the subsumer. It is obvious that the above tree is not identical to the tree of the subsumer expression. Hence, the original subsumee expression is not semantically equivalent with the subsumer expression, and the match between the two top SELECT boxes fails as a result.

In general, to translate a column that appears within a subsumee expression, the method follows the derivation of the column from the subsumee to the subsumee child that produces the column, then the method jumps to the equivalent column inside the top box of the corresponding child compensation, and follows the derivation of the compensation column down the compensation stack until we reach the matching subsumer child. This way, a subsumee column is translated to an expression that uses the columns of some subsumer child, that is, an expression that is valid within the context of the subsumer.

The same kind of expression translation is also used to compensate predicates and to derive subsumee expressions out of the subsumer output columns.

G. Predicate Subsumption

In condition 1 in (E. 1.1), it was required that each subsumer predicate (except from the extra-join predicates) be semantically equivalent with some subsumee predicate. This condition is more restrictive than what is necessary for correctness. Instead, it is sufficient to require that each subsumer predicate "subsumes" some subsumee predicate. In general, a predicate p1 subsumes another predicate p2 if the set of rows that satisfy p2 is a subset of the set of rows that satisfy p1. There are many forms of predicate subsumption. For example, the predicate "x<100" subsumes the predicate "x<90" and the in-list predicate "x IN (1, 2, 4, 5)" subsumes the predicate "x=2".

This algorithm is able to recognize such predicate subsumptions, and condition 1 has been modified to require predicate subsumption rather than predicate equivalence. The compensation needs to be modified as well: A subsumee predicate that is properly subsumed by a subsumer predicate must be included in the compensation (whereas, if the two predicates are equivalent, then the subsumee predicate does not need to be compensated for).

H. Date Predicates

Consider the following AST and query pair:

---
AST9:
CREATE TABLE AST6 AS (
SELECT t.id, l.country, year(t.pdate), month(t.pdate)
FROM TRANS t, LOC l
WHERE t.locid = l.id
Q9:
SELECT t.id, l.country, year(t.pdate), month(t.pdate)
FROM TRANS t, LOC l
WHERE t.locid = l.id AND t.pdate >= '05/01/1992'
---

The AST and the query are the same except from the additional date predicate that appears in the query. However, a match is not directly possible, as condition 3 from (E.1.1.1) is violated: the subsumer does not preserve the date column at its output, and as a result, the query predicate cannot be compensated for. It can be observed, however, that the date predicate is on a month boundary, and as such it can be transformed into the following predicate:

"year($t$.pdate)>=1992 AND (year($t$.pdate)>1992 OR month($t$.pdate)>=5)"

Now, given that the subsumer does produce the year and month values out of the date column, the original date predicate can be compensated using its transformed version.

Given the frequency and importance of date predicates in decision support queries, the algorithm has been extended to recognize date predicates that are on a year or month boundary and, if necessary, compensate such predicates using the year and/or month columns produced by the subsumer.

I. Handling Structural Inequivalence

Consider AST6 from (E.2.2) again, together with the following query.

---
Q10:
SELECT loc.country, loc.state, ti.pgid,
SUM(ti.quantity * ti.price) as value
FROM TRANSITEM As ti,
TRANS As t,
LOC AS l
WHERE ti.transid = t.transid AND t.locid = l.locid
GROUP BY l.country, ti.pgid
---

Q10 is identical to the inner block of Q6. Therefore, its QGM graph is the same as the one in FIG. 12B, but without the two top boxes (1210 and 1209). The problem with Q10 is that, given the discussion so far, it cannot match with the AST; even though its top SELECT box (box 1208 in FIG. 12B) matches with the middle SELECT box of the AST (box 1203 in FIG. 12C), we need a match with the top AST box (box 1205 in FIG. 12C) in order to be able to rewrite the query. Notice, however, that, as discussed in (E.2.2), the GROUP BY box (box 1212) that forms the compensation between Q10's top SELECT box and the AST's middle SELECT box can itself be matched with the AST's top GROUP BY box (box 1204 in FIG. 12C). In other words, box 1212 can be pulled up through box 1204 without the "help" of any subsumee box from the query. This is shown in FIG. 12D (boxes 1203–1205, 1212, 1215, and 1216), where box 1212 has been pulled up to become box 1215. Now, given that Q10's top SELECT box (box 1208) is equivalent with box 1212, and box 1212 is equivalent with box 1215, one can conclude that box 1212 is equivalent with box 1215, which implies that box 1212 matches with box 1204 of the AST with box 1215 being the compensation. Next, observe that box 1215 can be pulled up further through the AST's top SELECT box (box 1205), as this SELECT box is an empty one (doesn't perform any additional operations). Again, this is shown in FIG. 12D, where box 1215 has been pulled up to become box 1216. Then, by the same argument as before, one can conclude that Q10's top SELECT box matches with the AST's top SELECT box, with box 1216 being the compensation. As a result the query can be rewritten as follows:

---
NewQ10:
SELECT country; pgid, SUM(total_value) AS value
FROM AST6
GROUP BY country, pgid
---

In general, to handle such cases of "structural inequivalence" between the AST and the query, the navigator is modified as follows: First, assume that a match is formed between a subsumee E in the query and a subsumer R in the AST. Let COMP be the compensation for this match and COMPN be the top box of this compensation. After the formation of this match, the navigator tries to pullup the compensation as high as possible, without the "help" of the subsumee E; that is, the navigator tries to match the COMPN box with the ancestors of the original subsumer R, using the rest of the boxes in COMP as child compensation for the new matches. However, since COMPN is equivalent with the original subsumee E, any match formed between COMPN and an ancestor Ri of R is also a match between E and Ri. Thus, E gets matched with AST boxes that are at a higher level than E. Furthermore, if E' is a parent of E and Ri' is a parent of Ri, then a match between E' and Ri' can be considered, as the match function pre-condition is satisfied, i.e., the children of E' and Ri' have been matched.

Conclusion

This concludes the description of the preferred embodiment of the invention. The following describes some alternative embodiments for accomplishing the present invention. For example, any type of computer, such as a mainframe, minicomputer, or personal computer, could be used with the present invention. In addition, any software program adhering (either partially or entirely) to the SQL language could benefit from the present invention.

In summary, the present invention discloses a method, apparatus, and article of manufacture for optimizing database queries using a derived summary table, wherein a definition of the summary table is based on a full select statement, including, but not limited to, a derived table involving nested GROUP BY operations and complex HAVING clauses with subqueries or joins, that is materialized in the table and describes how the summary table was derived. A query is analyzed using matching/compensation tests between the query and the definition of the summary table (that is, a query by itself) to determine whether expressions occurring anywhere in the query, but not in the summary table, can be derived using either the content in the summary table alone, or after combining (through some relational operator) the content of the summary table with other base tables, and hence the query is subsumed by or overlaps with the summary table definition.

The foregoing description of the preferred embodiment of the invention has been presented for the purposes of illustration and description. It is not intended to be exhaustive or to limit the invention to the precise form disclosed. Many modifications and variations are possible in light of the above teaching.

What is claimed is:

1. A method of optimizing a query in a computer system, the query being performed by the computer system to retrieve data from a database stored on the computer system, the method comprising the steps of:
   (a) analyzing the query using math and compensation between the query and one or more automatic summary tables to determine whether expressions occurring in the query, but not in the automatic summary table, can be derived using the automatic summary table, wherein the automatic sum table is generated using a full SELECT statement involving one or more nested GROUP BY operations and HAVING clauses; and
   (b) rewriting the query to use the automatic summary table when the expressions occurring in the query, but not in the automatic summary, can be derived using the automatic summary table.

2. The method of claim 1, wherein the query and the statement that generates the automatic summary tables include complex scalar expressions.

3. The method of claim 1, wherein the query and the statement that generates the automatic summary tables include subqueries.

4. The method of claim 1, wherein the analyzing step comprises the step of analyzing the query using compensation tests between the query and the automatic summary table to determine whether expressions occurring anywhere in the query, but not in the automatic summary table, can be derived after combining the automatic summary table with one or more other base tables through relational operators.

5. The method of claim 1, wherein the analyzing step comprises the step of determining whether there is a match between the query and the automatic summary table using a bottom-up traversal of boxes in query graph models (QGMs) for the query and the automatic summary table that tries to establish matches between query and automatic summary table, until it reaches a top of the QGM for the automatic summary table.

6. The method of claim 5, wherein the data determining step further comprises the steps of:
   performing a navigator function to identify candidate subsumee and subsumer pairs from the QGMs for the query and the automatic summary table in an order such that the bottom-up traversal of the QGMs for the query and the automatic summary table is satisfied; and
   performing a match function that takes as input the candidate subsumee and subsumer pair from the QGMs for the query and the automatic summary table, and runs information on whether the subsumee matches with the subsumer.

7. The method of claim 6, wherein the match function returns information that describes a compensation for the match, if a match exists.

8. The method of claim 6, wherein the match function assumes that children of the subsumee and the subsumer have been matched already.

9. The method of claim 6, wherein the analyzing step comprises the step of determining whether there is a match between the query and the automatic summary table using a top-down recursive traversal of the QGMs for the query and the automatic summary table that tries to establish matches between query and automatic summary table.

10. The method of claim 9, wherein the determining step further comprises the step of:
    performing a match function that takes as input at least one candidate subsumee and subsumer pair from the QGMs for the query and the automatic summary table, and returns information on whether the subsumee matches with the subsumer.

11. The method of claim 10, wherein the match function returns information that describes a compensation for the match, if a match exists.

12. The method of claim 10, wherein the match function recursively invokes itself using as input children of the candidate subsumee and subsumer pair from the QGMs for the query and the automatic summary table to attempt to match the children of candidate subsumee and subsumer pair before matching the candidate subsumee and subsumer pair.

13. The method of claim 12, wherein the match function considers patterns of subsumee and subsumer in the QGMs, as well as compensation for the matches between the children of the candidate subsumee and subsumer.

14. The method of claim 13, wherein a rejoin child is a subsumee child that does not match with any subsumer child.

15. The method of claim 13, wherein an extra child is a subsumer child that does not match with any subsumee child.

16. The method of claim 13, wherein an extra join is a join between an extra child and the rest of the subsumer.

17. The method of claim 13, wherein the match function must satisfy the following conditions:
(1) there must be at least one subsumee child that matches with some subsumer child, and
(2) the subsumee and the subsumer must be of a same operation type.

18. The method of claim 17, wherein the patterns are selected from a group of patterns comprising:
(1) exact child matches, including:
(1.1) SELECT boxes with one to-one child matches,
(1.2) self joins, and
(1.3) GROUP-BY boxes,
(2) non-exact child marches, including:
(2.1) GROUP-BY boxes with SELECT-only child compensation,
(2.2) GROUP BY boxes with GROUP BY child compensation,
(2.3) SELECT boxes with SELECT-only child compensation, and
(2.4) SELECT boxes with a single child matching a GROUP BY child compensation.

19. The method of claim 18, wherein the exact child matches comprises the step of assuming that any matches that exist among the children of the candidate subsumee and subsumer pair are exact matches.

20. The method of claim 18, wherein the SELECT boxes with one-to-one child matches require that the candidate subsumee and subsumer arc SELECT boxes, and that (i) each child of the subsumee matches with at most one child of the subsumer, and (ii) no two children of the subsumee match to a same child of the subsumer.

21. The method of claim 20, wherein a match is established when the following conditions are satisfied:
(1) each subsumer predicate that is not an extra join predicate is semantically equivalent with, some subsumee predicate;
(2) any join between an extra and a non-extra child in the subsumer is a loss-less join;
(3) any subsumee predicate that does not have a matching subsumer predicate is derivable from the subsumer's output columns and/or the rejoin columns; and
(4) each subsumee output column is derivable from the subsumer's output columns and/or the rejoin columns.

22. The method of claim 20, wherein the compensation for such a match is a SELECT box that (i) joins back all rejoin children among themselves and with the subsumer, (ii) contains all the subsumee predicates that do not appear in the subsumer, and (iii) recomputes the subsumee output columns from the subsumer output columns and/or the rejoin columns.

23. The method of claim 20, wherein the candidate subsumee and subsumer are SELECT boxes and the conditions (i) and/or (ii) of claim 20 are not satisfied.

24. The method of claim 23, wherein the match function invokes itself multiple times trying to establish a match between the candidate subsumee and subsumer.

25. The method of claim 24, where the match function satisfies conditions (i) and (ii) of claim 20 every time it invokes itself.

26. The method of claim 25, wherein the match function satisfies conditions (i) and (ii) of claim 20 by taking into account some of the alternative child matches and disregarding others.

27. The method of claim 18, wherein the candidate subsumee and subsumer are GROUP-BY boxes.

28. The method of claim 27, wherein a match is established when the following conditions are satisfied:
(1) every subsumee grouping column must be semantically equivalent with some subsumer grouping column;
(2) if the subsumee and subsumer grouping sets are the same, then each subsumee aggregate output column must be semantically equivalent with some subsumer aggregate output column; and
(3) if the subsumee and subsumer grouping sets are not the same, then each subsumee aggregate output column must be derivable from the subsumer's output columns.

29. The method of claim 28, wherein compensation is necessary only if the subsumee's grouping items are a proper subset of the subsumer's grouping items.

30. The method of claim 29, wherein the compensation comprises a GROUP-BY box that has a set of same grouping items as the subsumee, and derives the subsumee's output columns from the subsumer's output columns.

31. The method of claim 27, wherein derivations for aggregate functions are selected from a group comprising:
(1) COUNT(*)>SUM(cnt), where "cnt" is the COUNT(*) column of the subsumer,
(2) COUNT(*)>SUM(cnt), where "cnt" is the COUNT(z) column of the subsumer and z is any non-nullable column used in the subsumer,
(3) COUNT(x)>SUM(cnt), where "cnt" is the COUNT(y) column of the subsumer,
(4) COUNT(x)>SUM(cnt), where "cnt" is the COUNT(*) column of the subsumer if x is non-nullable,
(5) SUM(x)>SUM(sm), where "sm" is the SUM(y) column of the subsumer,
(6) SUM(x)>SUM(y*cnt), where x is non-nullable, y is in the subsumer's grouping set and "cnt" is the COUNT(*) column of the subsumer,
(7) AVG(x)>SUM(sm)/SUM(cnt), where "sm" is the SUM(y) column of the subsumer, and "cnt" is the COUNT(y) column of the subsumer or the COUNT(*) column of the subsumer if the x column is non-nullable,
(8) MAX(x)>MAX(mx), where "mx" is the MAX(y) column of the subsumer or MAX(y), where y is in the subsumer's grouping set,
(9) MIN(x)>MIN(mn), where "mn" is the MIN(y) column of the subsumer, or MIN(y), where y is in the subsumer's grouping set,
(10) COUNT(distinct x)>COUNT(y), where y is in the subsumer's grouping set,
(11) SUM(distinct x)>SUM(y), where y is in the subsumer's grouping set,
(12) VARIANCE(x), which is $AVG(x^2)-AVG(x)^2$, and
(13) STDDEV(x), which is sqrt(VARIANCE(x)).

32. The method of claim 31, wherein x is a column used in the subsumee, y is a column used in the subsumer, and that x and y are semantically equivalent.

33. The method of claim 18, wherein the non-exact child matches further comprise the step of matching boxes in the QGMs whose children do not match exactly, by considering the boxes in the QGMs that comprise the compensations for the non-exact could matches.

34. The method of claim 33, wherein child compensation boxes in the QGMs are included in a compensation that is required for the match.

35. The method of claim 34, further comprising the step of pulling up the child compensation boxes in the QGMs.

36. The method of claim 35, wherein the pulling up step requires that the following condition is met:

a general pullup condition, wherein the columns referenced by expressions inside a child compensation must be either rejoin columns or be derivable from the subsumer's output columns.

37. The method of claim 18, wherein the subsumee and subsumer are GROUP-BY boxes and the child compensation comprises a single SELECT box, and the SELECT box must be pulled up above the subsumer GROUP-BY box, and the general pullup condition must be satisfied.

38. The method of claim 37, wherein the child compensation may perform rejoins.

39. The method of claim 38, wherein a match is established when the following conditions are satisfied:
   (1) each grouping item in the subsumee must be derivable from the subsumer's grouping items and/or the rejoin columns; and
   (2) each subsumee output column that is an aggregate function must be derivable from the subsumer's output columns.

40. The method of claim 37, wherein the compensation includes the pulled up SELECT box, which may be followed by a GROUP BY box.

41. The method of claim 40, wherein, if the SELECT box does not perform any rejoins, the GROUP BY compensation is necessary only if the subsumee's grouping set is not the same as the subsumer's grouping set.

42. The method of claim 40, wherein, if the SELECT box performs any rejoins, then regrouping is required in the compensation only if the subsumee's grouping set is not the same as the subsumer's grouping set, or the rejoin changes the duplicity of the non-rejoin rows.

43. The method of claim 18, wherein the subsumee and subsumer are GROUP BY boxes and the child compensation contains at least one GROUP BY box and a zero or more SELECT boxes.

44. The method of claim 43, wherein a match is established when the following condition is satisfied:
   the lowest GROUP-BY box in the child compensation matches with the subsumer.

45. The method of claim 44, wherein the match between the lowest GROUP-BY box in the child compensation and the subsumer comprises the steps of claims 37 through 42.

46. The method of claim 43, wherein the compensation includes (i) the compensation for the match between the lowest GROUP-BY box in the child compensation and the subsumer (ii) a copy of each child-compensation box above the lowest GROUP-BY box in the child compensation, and (iii) a copy of the subsumee.

47. The method of claim 18, wherein the subsumee and subsumer are SELECT boxes and the child compensation comprises a single SELECT box that may perform rejoins.

48. The method of claim 47, wherein a match is established when the following conditions are satisfied:
   (1) conditions 2 and 4 of claim 21 must be satisfied,
   (2) each subsumer predicate that is not an extra join predicate must be semantically equivalent with some predicate that appears either in the subsumee or in one of the child compensation boxes, and
   (3) any subsumee or child-compensation predicate that does not have a matching subsumer predicate is derivable from the subsumer's output columns and/or the rejoin columns.

49. The method of claim 47, wherein the compensation includes any predicates that appear in the subsumee and the child compensation boxes but not in the subsumer.

50. The method of claim 18, wherein the subsumee and subsumer are SELECT boxes and only one of the subsumee's children matches with one of the subumer's children and all the rest of the subsumee children are rejoin children.

51. The method of claim 50, wherein the compensation for the single child match contains at least one GROUP BY box and any number of SELECT boxes.

52. The method of claim 51, wherein the conditions for a match are the same as SELECT boxes with SELECT-only child compensation, with the addition of the general pullup condition for the GROUP by boxes in the child compensation, such that any grouping column in the child-compensation GROUP BY boxes must be derivable from the subsumer's output columns.

53. The method of claim 18, wherein the matching or compensation expressions further comprise the step of testing for expression equivalence.

54. The method of claim 53, wherein the testing step further comprises the step of testing for semantic equivalence between a subsumee expression and a subsumer expression.

55. The method of claim 54, wherein the testing step further comprises the step of translating the subsumee expression into an equivalent expression that is valid within a context of the subsumer.

56. The method of claim 55, wherein the translated subsumee expression uses columns that are generated by the subsumer's children.

57. The method of claim 56, wherein when the subsumee and subsumer children match exactly, then for each column that is produced by a non-rejoin subsumee child, there is an equivalent column that is produced by the subsumer's matching child, and replacing each column in the subsumee expression with its equivalent subsumer column.

58. The method of claim 56, wherein when the subsumee and subsumer children do not match exactly, translating a column that appears within a subsumee expression.

59. The method of claim 58, further comprising following a derivation of the column from the subsumee to the subsumee child that produces the column, and then jumping to an equivalent column inside a top box of the corresponding child compensation, and following a derivation of a compensation column down the compensation stack until the matching subsumer child is reached, so that a subsumee column is translated to an expression that uses the columns of some subsumer children, and the expression is valid within the context of the subsumer.

60. The method of claim 56, further comprising the step of using the expression translation to compensate predicates and to derive subsumee expressions out of the subsumer output columns.

61. The method of claim 18, wherein predicate subsumption requires that each subsumer predicate "subsumes" some subsumee predicate.

62. The method of claim 61, wherein a first predicate subsumes a second predicate if the set of rows that satisfy the second predicate is a subset of the set of rows that satisfy the first predicate.

63. The method of claim 62, wherein a subsumee predicate that is properly subsumed by a subsumer predicate must be included in the compensation.

64. The method of claim 62, wherein if the two predicates are equivalent, then the subsumee predicate does not need to be compensated for.

65. The method of claim 18, wherein the date predicates further comprise the step of recognizing date predicates that are on a year or month boundary and, if necessary, compensating such predicates using the year and month columns produced by the subsumer.

66. The method of claim 18, further comprising the step of handling structural inequivalence between the automatic summary table and the query in the navigator.

67. A computer-implemented apparatus for optimizing a query, comprising:
(a) a computer system;
(b) logic, performed by the computer system for
(1) analyzing the query using matching and compensation between the query and one or more automatic summary tables to determine whether expressions occurring in the query, but not in the automatic summary table, can be derived using the automatic summary table, wherein the automatic summary table is generated using a fill SELECT statement involving one or more nested GROUP BY operations and HAVING clauses; and
(2) rewriting the query to use the automatic summary table when the expressions occurring in the query, but not in the automatic summary table, can be derived using the automatic summary table.

68. The apparatus of claim 67, wherein the query and the statement that generates the automatic summary tables include complex scalar expressions.

69. The apparatus of claim 67, wherein the query and the statement that generates the automatic summary tables include subqueries.

70. The apparatus of claim 67, wherein the analyzing logic comprises logic for analyzing the query using compensation tests between the query and the automatic summary cable to determine whether expressions occurring anywhere in the query, but not in the automatic summary table, can be derived after combining the automatic summary table with one or more other base tables through relational operators.

71. The apparatus of claim 67, wherein the analyzing logic comprises logic for determining whether there is a match between the query and the automatic summary table using a bottom-up traversal of boxes in query graph models (QGMs) for the query and the automatic summary table that tries to establish matches between query and automatic summary table, until it reaches a top of the QGM for the automatic summary table.

72. The apparatus of claim 71, wherein the determining logic further comprises logic for:
performing a navigator function to identify candidate subsumee and subsumer pairs from the QGMs for the query and the automatic summary table in an order such that the bottom-up traversal of the QGMs for the query and the automatic summary table is satisfied; and
performing a match function that takes as input the candidate subsumee and subsumer pair from the QGMs for the query and the automatic summary table, and returns information on whether the subsumee matches with the subsumer.

73. The apparatus of claim 72, wherein the match function returns information that describes a compensation for the match, if a match exists.

74. The apparatus of claim 72, wherein the match function assumes that children of the subsumee and the subsumer have been matched already.

75. The apparatus of claim 72, wherein the analyzing logic comprises logic for determining whether there is a match between the query and the automatic summary table using a top-down recursive traversal of the QGMs for the query and the automatic summary table that tries to establish matches between query and automatic summary table.

76. The apparatus of claim 75, wherein the determining logic further comprises logic for:
performing a match function that takes as input at least one candidate subsumee and subsumer pair from the QGMs for the query and the automatic summary table, and returns information on whether the subsumee matches with the subsumer.

77. The apparatus of claim 76, wherein the match function returns information that describes a compensation for the match, if a match exists.

78. The apparatus of claim 76, wherein the match function recursively invokes itself using as input children of the candidate subsumee and subsumer pair from the QGMs for the query and the automatic summary table to attempt to match the children of candidate subsumee and subsumer pair before matching the candidate subsumee and subsumer pair.

79. The apparatus of claim 78, wherein the match function considers patterns of subsumee and subsumer in the QGMs, as well as compensation for the matches between the children of the candidate subsumee and subsumer.

80. The apparatus of claim 79, wherein a rejoin child is a subsumee child that does not match with any subsumer child.

81. The apparatus of claim 79, wherein an extra child is a subsumer child that does not match with any subsumee child.

82. The apparatus of claim 79, wherein an extra join is a join between an extra child and the rest of the subsumer.

83. The apparatus of claim 79, wherein the match function must satisfy the following conditions:
(1) there must be at least one subsumee child that matches with some subsumer child, and
(2) the subsumee and the subsumer must be of a same operation type.

84. The apparatus of claim 83, wherein the patterns are selected from a group of patterns comprising:
(1) exact child matches, including:
(1.1) SELECT boxes with one-to-one child matches,
(1.2) self joins, and
(1.3) GROUP-BY boxes,
(2) non-exact child matches, including:
(2.1) GROUP-BY boxes with SELECT-only child compensation,
(2.2) GROUP BY boxes with GROUP BY child compensation,
(2.3) SELECT boxes with SELECT-only child compensation, and
(2.4) SELECT boxes with a single child matching a GROUP BY child compensation.

85. The apparatus of claim 84, wherein the exact child matches comprises logic for assuming that any matches that exist among the children of the candidate subsumee and subsumer pair are exact matches.

86. The apparatus of clam 84, wherein the SELECT boxes with one-to-one child matches require that the candidate subsumee and subsumer are SELECT boxes, and that (i) each child of the subsumee matches with at most one child of the subsumer, and (ii) no two children of the subsumee match to a same child of the subsumer.

87. The apparatus of claim 86, wherein a match is established when the following conditions are satisfied:
(1) each subsumer predicate that is not an extra join predicate is semantically equivalent with some subsumee predicate;
(2) any join between an extra and a non-extra child in the subsumer is a loss-less join;
(3) any subsumee predicate that does not have a matching subsumer predicate is derivable from the subsumer's output columns and/or the rejoin columns; and (4) each subsumee output column is derivable from the subsumer's output columns and/or the rejoin columns.

88. The apparatus of claim 86, wherein the compensation for such a match is a SELECT box that (i) joins back all rejoin children among themselves and with the subsumer (ii) contains all the subsumee predicates that do not appear in the subsumer, and (iii) recomputes the subsumee output column from the subsumer output columns and/or the rejoin columns.

89. The apparatus of claim 86, wherein the candidate subsumee and subsumer are SELECT boxes and the conditions (i) and/or (ii) of claim 86 are not satisfied.

90. The apparatus of claim 89, wherein the match function invokes itself multiple times trying to establish a match between the candidate subsumee and subsumer.

91. The apparatus of claim 90, wherein the match function satisfies conditions (i) and (ii) of claim 86 every time it invokes itself.

92. The apparatus of claim 91, wherein the match function satisfies conditions (i) and (ii) of claim 86 by taking into account some of die alternative child matches and disregarding others.

93. The apparatus of claim 84, wherein the candidate subsumee and subsumer are GROUP-BY boxes.

94. The apparatus of claim 93, wherein a match is established when the following conditions are satisfied:
(1) every subsumee grouping column must be semantically equivalent with some subsumer grouping column;
(2) if the subsumee and subsumer grouping sets are the same, then each subsumee aggregate output column must be semantically equivalent with some subsumer aggregate output column; and
(3) if the subsumee and subsumer grouping sets are not the same, then each subsumee aggregate output column must be derivable from the subsumer's output columns.

95. The apparatus of claim 94, wherein compensation is necessary only if the subsumee's grouping items are a proper subset of the subsumer's grouping items.

96. The apparatus of claim 95, wherein the compensation comprises a GROUP-BY box that has a set of same grouping items as the subsumee, and derives the subsumee's output columns from the subsumer's output columns.

97. The apparatus of claim 93, wherein derivations for aggregate functions are selected from a group comprising:
(1) COUNT(*)>SUM(cnt), where "cnt" is the COUNT(*) column of the subsumer,
(2) COUNT(*)>SUM(cnt), where "cnt" is the COUNT(z) column of the subsumer and z is any non-nullable column used in the subsumer,
(3) COUNT(x)>SUM(cnt), where "cnt" is the COUNT(y) column of the subsumer,
(4) COUNT(x)>SUM(cnt), where "cnt" is the COUNT(*) column of the subsumer if x is non-nullable,
(5) SUM(x)>SUM(sm), where "sm" is the SUM(y) column of the subsumer,
(6) SUM(x)>SUM(y*cnt), where x is non-nullable, y is in the subsumer's grouping set and "cnt" is the COUNT(*) column of the subsumer,
(7) AVG(x)>SUM(sm)/SUM(cnt), where "sm" is the SUM(y) column of the subsumer, and "cnt" is the COUNT(y) column of the subsumer or the COUNT(*) column of the subsumer if the x column is non-nullable,
(8) MAX(x)>MAX(mx), where "mx" is the MAX(y) column of the subsumer or MAX(y), where y is in the subsumer's grouping set,
(9) MIN(x)>MIN(mn), where "mn" is the MIN(y) column of the subsumer, or MIN(y), where y is in the subsumer's grouping set,
(10) COUNT(distinct x)>COUNT(y), where y is in the subsumer's grouping set,
(11) SUM(distinct x)>SUM(y), where y is in the subsumer's grouping set,
(12) VARIANCE(x), which is $AVG(x^2)-AVG(x)^2$, and
(13) STDDEV(x), which is sqrt(VARIANCE(x)).

98. The apparatus of claim 97, wherein x is a column used in the subsumee, y is a column used in the subsumer, and that x and y are semantically equivalent.

99. The apparatus of claim 84, wherein the non-exact child matches further comprise the logic of matching boxes in the QGMs whose children do not match exactly, by considering the boxes in the QGMs that comprise the compensations for the non-exact child matches.

100. The apparatus of claim 99, wherein child compensation boxes in the QGMs are included in a compensation that is required for the match.

101. The apparatus of claim 100, further comprising logic for pulling up the child compensation boxes in the QGMs.

102. The apparatus of claim 101, wherein the pulling up logic requires that the following condition is met:
a general pullup condition, wherein the columns referenced by expressions inside a child compensation must be either rejoin columns or be derivable from the subsumer's output columns.

103. The apparatus of claim 84, wherein the subsumee and subsumer are GROUP-BY boxes and the child compensation comprises a single SELECT box, and the SELECT box must be pulled up above the subsumer GROUP-BY box, and the general pullup condition must be satisfied.

104. The apparatus of claim 103, wherein the child compensation may perform rejoins.

105. The apparatus of claim 104, wherein a match is established when the following conditions are satisfied:
(1) each grouping item in the subsumee must be derivable from the subsumer's grouping items and/or the rejoin columns; and
(2) each subsumee output column that is an aggregate function must be derivable from the subsumer's output columns.

106. The apparatus of claim 103, wherein the compensation includes the pulled up SELECT box, which may be followed by a GROUP BY box.

107. The apparatus of claim 106, wherein, if the SELECT box does not perform any rejoins, the GROUP BY compensation is necessary only if the subsumee's grouping set is not the same as the subsumer's grouping set.

108. The apparatus of claim 106, wherein, if the SELECT box perform any rejoins, then regrouping is required in the compensation only if the subsumee's grouping set is not the same as the subsumer's grouping set, or the rejoin changes the duplicity of the non-rejoin rows.

109. The apparatus of claim 84, wherein the subsumee and subsumer are GROUP BY boxes and t child compensation contains at least one GROUP BY box and a zero or more SELECT boxes.

110. The apparatus of claim 109, wherein a match is established when the following condition is satisfied:
the lowest GROUP-BY box in the child compensation matches with the subsumer.

111. The apparatus of claim 110, wherein the match between the lowest GROUP-BY box in the child compensation and the subsumer comprises logic for claims 103 through 108.

112. The apparatus of claim 109, wherein the compensation includes (i) the compensation for the match between the lowest GROUP-BY box in the child compensation and the subsumer, (ii) a copy of each child-compensation box above the lowest GROUP-BY box in the child compensation, and (iii) a copy of the subsumee.

113. The apparatus of claim 84, wherein the subsumee and subsumer are SELECT boxes and the child compensation comprises a single SELECT box that may perform rejoins.

114. The apparatus of claim 113, wherein a match is established when the following conditions are satisfied:
   (1) conditions 2 and 4 of claim 87 must be satisfied,
   (2) each subsumer predicate that is not an extra join predicate must be semantically equivalent with some predicate that appears either in the subsumee or in one of the child compensation boxes, and
   (3) any subsumee or child-compensation predicate that does not have a matching subsumer predicate is derivable from the subsumer's output columns and/or the rejoin columns.

115. The apparatus of claim 113, wherein the compensation includes any predicates that appear in the subsumee and the child compensation boxes but not in the subsumer.

116. The apparatus of claim 84, wherein the subsumee and subsumer are SELECT boxes and only one of the subsumee's children matches with one of the subsumer's children and all the rest of the subsumee children are rejoin children.

117. The apparatus of claim 116, wherein the compensation for the single child match contains at least one GROUP BY box and any number of SELECT boxes.

118. The apparatus of claim 117, wherein the conditions for a match are the same as SELECT boxes with SELECT-only child compensation, with the addition of the general pullup condition for the GROUP by boxes in the child compensation, such that any grouping column in the child-compensation GROUP BY boxes must be derivable from the subsumer's output columns.

119. The apparatus of claim 84, wherein the matching or compensation expressions further comprise logic for testing for expression equivalence.

120. The apparatus of claim 119, where the resting logic further comprises logic for testing for semantic equivalence between a subsumee expression and a subsumer expression.

121. The apparatus of claim 120, wherein the testing logic further comprises logic for translating the subsumee expression into an equivalent expression that is valid within a context of the subsumer.

122. The apparatus of claim 121, wherein the translated subsumee expression uses columns that are generated by the subsumer's children.

123. The apparatus of claim 122, wherein when the subsumee and subsumer children match exactly, then for each column that is produced by a non-rejoin subsumee child, there is an equivalent column that is produced by the subsumer's matching child, and replacing each column in the subsumee expression with its equivalent subsumer column.

124. The apparatus of claim 122, wherein when the subsumee and subsumer children do not match exactly, translating a column that appears within a subsumee expression.

125. The apparatus of claim 124, farther comprising following a derivation of the column from the subsumee to the subsumee child that produces the column, and then jumping to an equivalent column inside a top box of the corresponding child compensation, and following a derivation of a compensation column down the compensation stack until the matching subsumer child is reached, so that a subsumee column is translated to an expression that uses the columns of some subsumer children, and the expression is valid within the context of the subsumer.

126. The apparatus of claim 122, further comprising logic for using the expression translation to compensate predicates and to derive subsumee expressions out of the subsumer output columns.

127. The apparatus of claim 84, wherein predicate subsumption requires that each subsumer predicate "subsumes" some subsumee predicate.

128. The apparatus of claim 127, wherein a first predicated subsumes a second predicate if the set of rows that satisfy the second predicate is a subset of the set of rows that satisfy the first predicate.

129. The apparatus of claim 128, wherein a subsumee predicate that is properly subsumed by a subsumer predicate must be included in the compensation.

130. The apparatus of claim 128, wherein if the two predicates are equivalent, then the subsumee predicate does not need to be compensated for.

131. The apparatus of claim 84, wherein the date predicates further comprise logic for recognizing date predicates that are on a year or month boundary and, if necessary, compensating such predicates using the year and month columns produced by the subsumer.

132. The apparatus of claim 84, further comprising logic for handling structural inequivalence between the automatic summary table and the query in the navigator.

133. An article of manufacture embodying logic for performing method steps for optimizing a query, the query being performed by a computer system to retrieve data from a database stored in a data storage device coupled to the computer system, the method comprising the steps of:
   (a) analyzing the query using matching and compensation between the query and one or more automatic summary tables to determine whether expressions occurring in the query, but not in the automatic summary table, can be derived using the automatic summary table, wherein the automatic summary table is generated using a full SELECT statement involving one or more nested GROUP BY operations and HAVING clauses; and
   (b) rewriting the query to use the automatic summary table when the expressions occurring in the query, but not in the automatic summary table, can be derived using the automatic summary table.

134. The method of claim 133, wherein the query and the statement that generates the automatic summary tables include complex scalar expressions.

135. The method of claim 133, wherein the query and the statement that generates the automatic summary tables include subqueries.

136. The method of claim 133, wherein the analyzing step comprises the step of analyzing the query using compensation tests between the query and the automatic summary table to determine whether expressions occurring anywhere in the query, but not in the automatic summary table, can be derived after combining the automatic summary table with one or more other base tables through relational operators.

137. The method of claim 133, wherein the analyzing step comprises the step of determining whether there is a match between the query and the automatic summary table using a bottom-up traversal of boxes in query graph models (QGMs) for the query and the automatic summary table that tries to establish matches between query and automatic summary table, until it reaches a top of the QGM for the automatic summary table.

138. The method of claim 137, wherein the determining step further comprises the steps of:
performing a navigator function to identify candidate subsumee and subsumer pairs from the QGMS for the query and the automatic summary table in an order such that the bottom-up traversal of the QGMs for the query and the automatic summary table is satisfied; and
performing a match function that takes as input the candidate subsumee and subsumer pair from the QGMs for the query and the automatic summary table, and returns information on whether the subsumee matches with the subsumer.

139. The method of claim 138, wherein the match function returns information that describes a compensation for the match, if a match exists.

140. The method of claim 138, wherein the match function assumes that children of the subsumee and the subsumer have been matched already.

141. The method of claim 138, wherein the analyzing step comprises the step of determining whether there is a match between the query and the automatic summary table using a top-down recursive traversal of the QGMs for the query and the automatic summary table that tries to establish matches between query and automatic summary table.

142. The method of claim 141, wherein the determining step further comprises the step of:
performing a match function that takes as input at least one candidate subsumee and subsumer pair from the QGMs for the query and the automatic summary table, and returns information on whether the subsumee matches with the subsumer.

143. The method of claim 142, wherein the match function returns information that describes a compensation for the match, if a match exists.

144. The method of claim 142, wherein the match function recursively invokes itself using as input children of the candidate subsumee and subsumer pair from the QGMs for the query and the automatic summary table to attempt to match the children of candidate subsumee and subsumer pair before matching the candidate subsumee and subsumer pair.

145. The method of claims 144, wherein the match function considers patterns of subsumee and subsumer in the QGMs, as well as compensation for the matches between the children of the candidate subsumee and subsumer.

146. The method of claim 145, wherein a rejoin child is a subsumee child that does not match with any subsumer child.

147. The method of claim 145, wherein an extra child is a subsumer child that does not match with any subsumee child.

148. The method of claim 145, wherein an extra join is a join between an extra child and the rest of the subsumer.

149. The method of claim 145, wherein the match function must satisfy the following conditions:
(1) there must be at least one subsumee child that matches with some subsumer child, and
(2) the subsumee and the subsumer must be of a same operation type.

150. The method of claim 149, wherein the patterns are selected from a group of patterns comprising:
(1) exact child matches, including:
(1.1) SELECT boxes with one-to-one child matches,
(1.2) self joins, and
(1.3) GROUP-BY boxes,
(2) non-exact child matches, including:
(2.1) GROUP-BY boxes with SELECT-only child compensation,
(2.2) GROUP BY boxes with GROUP BY child compensation,
(2.3) SELECT boxes with SELECT-only child compensation, and
(2.4) SELECT boxes with a single child matching a GROUP BY child compensation.

151. The method of claim 150, wherein the exact child matches comprises the step of assuming that any matches that exist among the children of the candidate subsumee and subsumer pair are exact matches.

152. The method of claim 150, wherein the SELECT boxes with one-to-one child matches require that the candidate subsumee and subsumer are SELECT boxes, and that (i) each child of the subsumee matches with at most one child of the subsumer, and (ii) no two children of the subsumee match to a same child of the subsumer.

153. The method of claim 152, where a match is established when the following conditions are satisfied:
(1) each subsumer predicate that is not an extra join predicate is semantically equivalent with some subsumee predicate;
(2) any join between an extra and a non-extra child in the subsumer is a loss-less join;
(3) any subsumee predicate that does not have a matching subsumer predicate is derivable from the subsumer's output columns and/or the rejoin columns; and
(4) each subsumee output column is derivable from the subsumer's output columns and/or the rejoin columns.

154. The method of claim 152, wherein the compensation for such a match is a SELECT box that (i) joins back all rejoin children among themselves and with the subsumer, (ii) contains all the subsumee predicates that do not appear in the subsumer, and (iii) recomputes the subsumee output columns from the subsumer output columns and/or the rejoin columns.

155. The method of claim 152, wherein the candidate subsumee and subsumer are SELECT boxes and the conditions (i) and/or (ii) of claim 152 are not satisfied.

156. The method of claim 155, wherein the match function invokes itself multiple times trying to establish a match between the candidate subsumee and subsumer.

157. The method of claim 156, wherein the match function satisfies conditions (i) and (ii) of claim 152 every time it invokes itself.

158. The method of claim 157, wherein the match function satisfies conditions (i) and (ii) of claim 152 by taking into account some of the alternative child matches and disregarding others.

159. The method of claim 150, wherein the candidate subsumee and subsumer are GROUP-BY boxes.

160. The method of claim 159, wherein a match is established when the following conditions are satisfied:
(1) every subsumee grouping column must be semantically equivalent with some subsumer grouping column;
(2) if the subsumee and subsumer grouping sets are the same, then each subsumee aggregate output column must be semantically equivalent with some subsumer aggregate output column; and
(3) if the subsumee and subsumer grouping sets are not the same, then each subsumee aggregate output column must be derivable from the subsumer's output columns.

161. The method of claim 160, when compensation is necessary only if the subsumee's grouping items are a proper subset of the subsumer's grouping items.

162. The method of claim 161, wherein the compensation comprises a GROUP-BY box that has a set of same grouping items as the subsumee, and derives the subsumee's output columns from the subsumer's output columns.

163. The method of claim 159, wherein derivations for aggregate functions are selected from a group comprising:
(1) COUNT(*)>SUM(cnt), where "cnt" is the COUNT(*) column of the subsumer,
(2) COUNT(*)>SUM(cnt), where "cnt" is the COUNT(z) column of the subsumer and z is any non-nullable column used in the subsumer,
(3) COUNT(x)>SUM(cnt), where "cnt" is the COUNT(y) column of the subsumer,
(4) COUNT(x)>SUM(cnt), where "cnt" is the COUNT(*) column of the subsumer if x is non-nullable,
(5) SUM(x)>SUM(sm), where "sm" is the SUM(y) column of the subsumer,
(6) SUM(x)>SUM(y*cnt), where x is non-nullable, y is in the subsumer's grouping set and "cnt" is the COUNT(*) column of the subsumer,
(7) AVG(x)>SUM(sm)/SUM(cnt), where "sm" is the SUM(y) column of the subsumer, and "cnt" is the COUNT(y) column of the subsumer or the COUNT(*) column of the subsumer if the x column is non-nullable,
(8) MAX(x)>MAX(mx), where "mx" is the MAX(y) column of the subsumer or MAX(y), where y is in the subsumer's grouping set,
(9) MIN(x)>MIN(mn), where "mn" is the MIN(Y) column of the subsumer, or MIN(y), where y is in the subsumer's grouping set,
(10) COUNT(distinct x)>COUNT(y), where y is in the subsumer's grouping set,
(11) SUM(distinct x)>SUM(y), where y is in the subsumer's grouping set,
(12) VARIANCE(x), which is $AVG(x^2)-AVG(x)^2$, and
(13) STDDEV(x), which is sqrt(VARIANCE(x)).

164. The method of claim 163, wherein x is a column used in the subsumee, y is a column used in the subsumer, and that x and y are semantically equivalent.

165. The method of claim 150, wherein the non-exact child matches further comprise the step of matching boxes in the QGMs whose children do not match exactly, by considering the boxes in the QGMs that comprise the compensations for the non-exact child matches.

166. The method of claim 165, wherein child compensation boxes in the QGMs are included in a compensation that is required for the match.

167. The method of claim 166, further comprising the step of pulling up the child compensation boxes in the QGMs.

168. The method of claim 167, wherein the pulling up step requires that the following condition is met:
a general pullup condition, wherein the columns referenced by expressions inside a child compensation must be either rejoin columns or be derivable from the subsumer's output columns.

169. The method of claim 150, wherein the subsumee and subsumer are GROUP-BY boxes and the child compensation comprises a single SELECT box, and the SELECT box must be pulled up above the subsumer GROUP-BY box, and the general pullup condition must be satisfied.

170. The method of claim 169, wherein the child compensation may perform rejoins.

171. The method of claim 170, wherein a match is established when the following conditions are satisfied:
(1) each grouping item in the subsumee must be derivable from the subsumer's grouping items and/or the rejoin columns; and
(2) each subsumee output column that is an aggregate function must be derivable from the subsumer's output columns.

172. The method of claim 169, wherein the compensation includes the pulled up SELECT box, which may be followed by a GROUP BY box.

173. The method of claim 172, wherein if the SELECT box does not perform any rejoins, the GROUP BY compensation is necessary only if the subsumee's grouping set is not the same as the subsumer's grouping set.

174. The method of claim 172, wherein, if the SELECT box performs any rejoins, then regrouping is required in the compensation only if the subsumee's grouping set is not the same as the subsumer's grouping set, or the rejoin changes the duplicity of the non-rejoin rows.

175. The method of claim 150, wherein the subsumee and subsumer are GROUP BY boxes and the child compensation contains at least one GROUP BY box and a zero or more SELECT boxes.

176. The method of claim 175, wherein a match is established when the following condition is satisfied:
the lowest GROUP-BY box in the child compensation matches with the subsumer.

177. The method of claim 176, wherein the match between the lowest GROUP-BY box in the child compensation and the subsumer comprises the steps of claim 103 through 108.

178. The method of claim 175, wherein the compensation includes (i) the compensation for the match between the lowest GROUP-BY box in the child compensation and the subsumer, (ii) a copy of each child-compensation box above the lowest GROUP-BY box in the child compensation, and (ii) a copy of the subsumee.

179. The method of claim 150, wherein the subsumee and subsumer are SELECT boxes and the child compensation comprises a single SELECT box that may perform rejoins.

180. The method of claim 179, wherein a match is established when the following conditions are satisfied:
(1) conditions 2 and 4 of claim 153 must be satisfied,
(2) each subsumer predicate that is not an extra join predicate must be semantically equivalent with some predicate that appears either in the subsumee or in one of the child compensation boxes, and
(3) any subsumee or child-compensation predicate that does not have a matching subsumer predicate is derivable from the subsumer's output columns and/or the rejoin columns.

181. The method of claim 179, wherein the compensation includes any predicates that appear in the subsumee and the child compensation boxes but not in the subsumer.

182. The method of claim 150, wherein the subsumee and subsumer are SELECT boxes and only one of the subsumee's children matches with one of the subsumer's children and all the rest of the subsumee child are rejoin children.

183. The method of claim 182, wherein the compensation for the single child match contains at least one GROUP BY box and any number of SELECT boxes.

184. The method of claim 183, wherein the conditions for a match are the same as SELECT boxes with SELECT-only child compensation, with the addition of the general pullup condition for the GROUP by boxes in the child compensation, such that any grouping column in the child-compensation GROUP BY boxes must be derivable from the subsumer's output columns.

185. The method of claim 150, wherein the matching or compensation expressions further comprise the step of testing for expression equivalence.

186. The method of claim 185, wherein the testing step further comprises the step of testing for semantic equivalence between a subsumee expression and a subsumer expression.

187. The method of claim 186, wherein the testing step further comprises the step of translating the subsumee expression into an equivalent expression that is valid within a context of the subsumer.

188. The method of claim 187, wherein the translated subsumee expression uses columns that are generated by the subsumer's children.

189. The method of claim 188, wherein when the subsumee and subsumer children match exactly, then for each column that is produced by a non-rejoin subsumee child, there is an equivalent column that is produced by the subsumer's matching child, and replacing each column in the subsumee expression with its equivalent subsumer column.

190. The method of claim 188, wherein when the subsumee and subsumer children do not match exactly, translating a column that appears within a subsumee expression.

191. The method of claim 190, further comprising following a derivation of the column from the subsumee to the subsumee child that produces the column, and then jumping to an equivalent column inside a top box of the corresponding child compensation, and following a derivation of a compensation column down the compensation stack until the matching subsumer child is reached, so that a subsumee column is translated to an expression that uses the columns of some subsumer children, and the expression is valid within the context of the subsumer.

192. The method of claim 188, further comprising the step of using the expression translation to compensate predicates ad to derive subsumee expressions out of the subsumer output columns.

193. The method of claim 150, wherein predicate subsumption requires that each subsumer predicate "subsumes" some subsumee predicate.

194. The method of claim 193, wherein a first predicate subsumes a second predicate if the set of rows that satisfy the second predicate is a subset of the set of rows that satisfy the first predicate.

195. The method of claim 194, wherein a subsumee predicate that is properly subsumed by a subsumer predicate must be included in the compensation.

196. The method of claim 194, wherein if the two predicates are equivalent, then the subsumee predicate does not need to be compensated for.

197. The method of claim 131, wherein the date predicates further comprise the step of recognizing date predicates that are on a year or month boundary and, if necessary, compensating such predicates using the year and month columns produced by the subsumer.

198. The method of claim 132, further comprising the step of handling structural inequivalence between the automatic summary table and the query in the navigator.

\* \* \* \* \*

UNITED STATES PATENT AND TRADEMARK OFFICE
CERTIFICATE OF CORRECTION

PATENT NO. : 6,847,962 B1
DATED : January 25, 2005
INVENTOR(S) : Roberta Jo Cochrane et al.

It is certified that error appears in the above-identified patent and that said Letters Patent is hereby corrected as shown below:

Column 21,
Line 50, "math" should read -- matching --.
Line 55, "sum" should read -- summary --.

Column 22,
Line 16, strike "data".
Line 26, "runs" should read -- returns --.

Column 23,
Line 28, "arc" should read -- are --.
Line 59, "where" should read -- wherein --.

Column 24,
Line 58, "could" should read -- child --.

Column 27,
Line 14, "fill" should read -- full --.
Line 30, "cable" should read -- table --.

Column 28,
Line 52, "clam" should read -- claim --.

Column 29,
Line 8, "column" should read -- columns --.
Line 22, "die" should read -- the --.

Column 30,
Line 58, "t" should read -- the --.

Column 31,
Line 42, "where" should read -- wherein --.
Line 42, "resting" should read -- testing --.
Line 63, "farther" should read -- further --.

Column 34,
Line 17, "where" should read -- wherein --.

UNITED STATES PATENT AND TRADEMARK OFFICE
CERTIFICATE OF CORRECTION

PATENT NO. : 6,847,962 B1
DATED : January 25, 2005
INVENTOR(S) : Roberta Jo Cochrane et al.

It is certified that error appears in the above-identified patent and that said Letters Patent is hereby corrected as shown below:

<u>Column 36,</u>
Line 54, "child" should read -- children --.

<u>Column 38,</u>
Line 5, "ad" should read -- and --.

Signed and Sealed this

Sixth Day of September, 2005

JON W. DUDAS
*Director of the United States Patent and Trademark Office*